United States Patent [19]

Iwamoto

[11] Patent Number: 4,814,831

[45] Date of Patent: Mar. 21, 1989

[54] CONTROL SYSTEM FOR A COPIER

[75] Inventor: Minoru Iwamoto, Yokohama, Japan

[73] Assignee: Ricoh Company, Ltd., Tokyo, Japan

[21] Appl. No.: 114,291

[22] Filed: Oct. 29, 1987

[30] Foreign Application Priority Data

Oct. 30, 1986 [JP] Japan ................................ 61-259379
Oct. 30, 1986 [JP] Japan ................................ 61-259380

[51] Int. Cl.⁴ ........................ G03B 27/52; G03B 27/70

[52] U.S. Cl. .......................................... 355/40; 355/7; 355/14 R; 355/55

[58] Field of Search ........................ 355/40, 55, 7, 3 R, 355/14 R

[56] References Cited

U.S. PATENT DOCUMENTS 4,701,044 10/1987 Horiuchi et al. ........................ 355/7
4,711,557 12/1987 Watanabe ........................... 355/7 X

*Primary Examiner*—Richard A. Wintercorn
*Attorney, Agent, or Firm*—Oblon, Fisher, Spivak, McClelland & Maier

[57] ABSTRACT

A control system for a copier having a monocolor or multicolor printing function, a combining function, a shifting function, a masking function, a continuous printing function, a magnification changing function and others. The control system allows a trimmed image to be automatically laid in a masked area. Further, the control system selectively controls the copier such that the center of a magnification-changed image is brought into register with that of a document image, such that the amount of shift of a magnification-changed image becomes equal to a specified one (absolute value), and such that when a document and a paper are different in size from each other, an image is shifted by a specified distance even if the magnification is 1.

11 Claims, 98 Drawing Sheets

| |
|---|
| Fig. 8E-2a |
| Fig. 8E-2b |
| Fig. 8E-2c |

A-1-5-4

A-1-5-7'
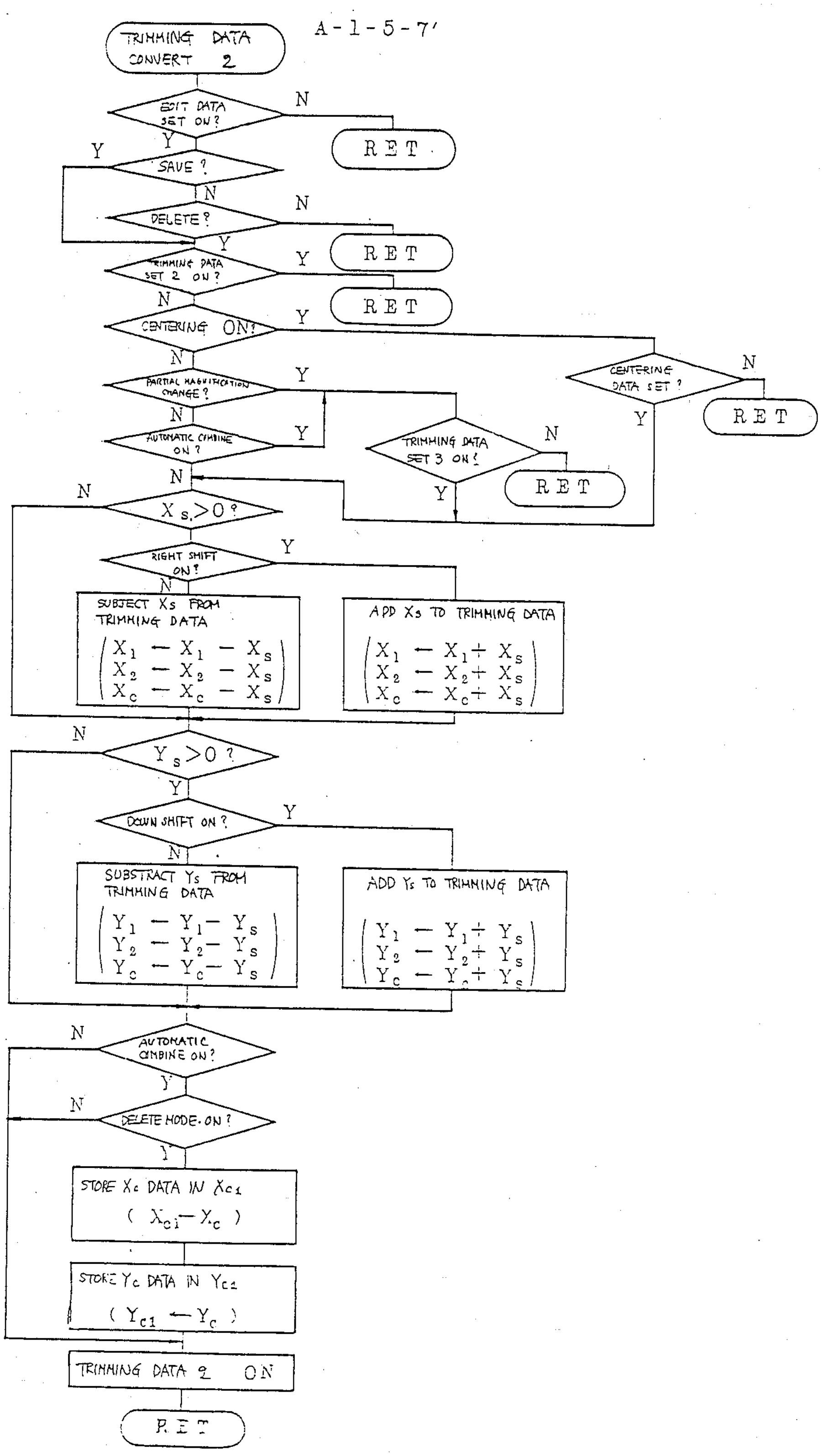

FIG. 8E-8-1-A-1a
FIG. 8E-8-1-A
| FIG. 8E-8-1-A-1a |
| --- |
| FIG. 8E-8-1-A-1b |
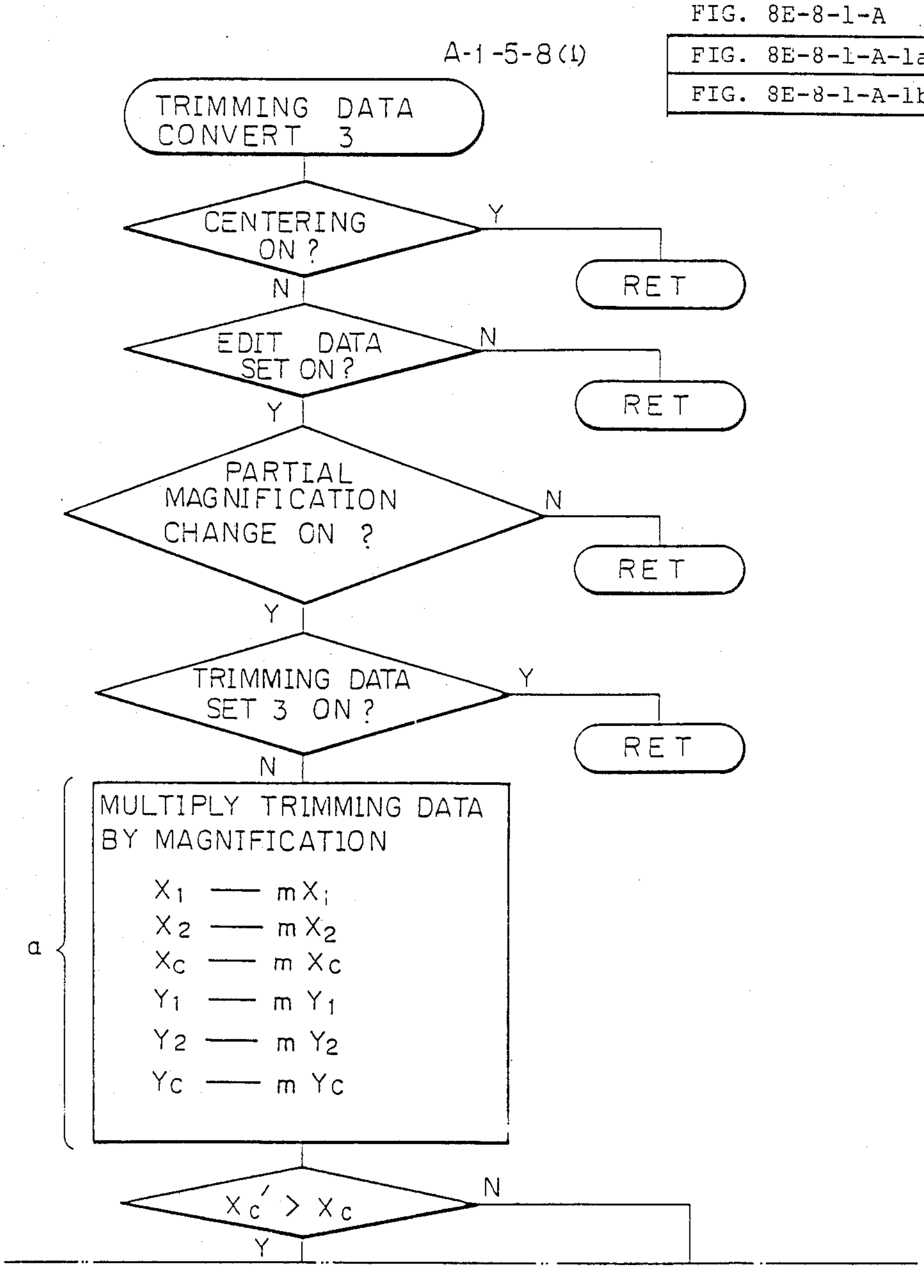

FIG. 8E-8-1-A-1b
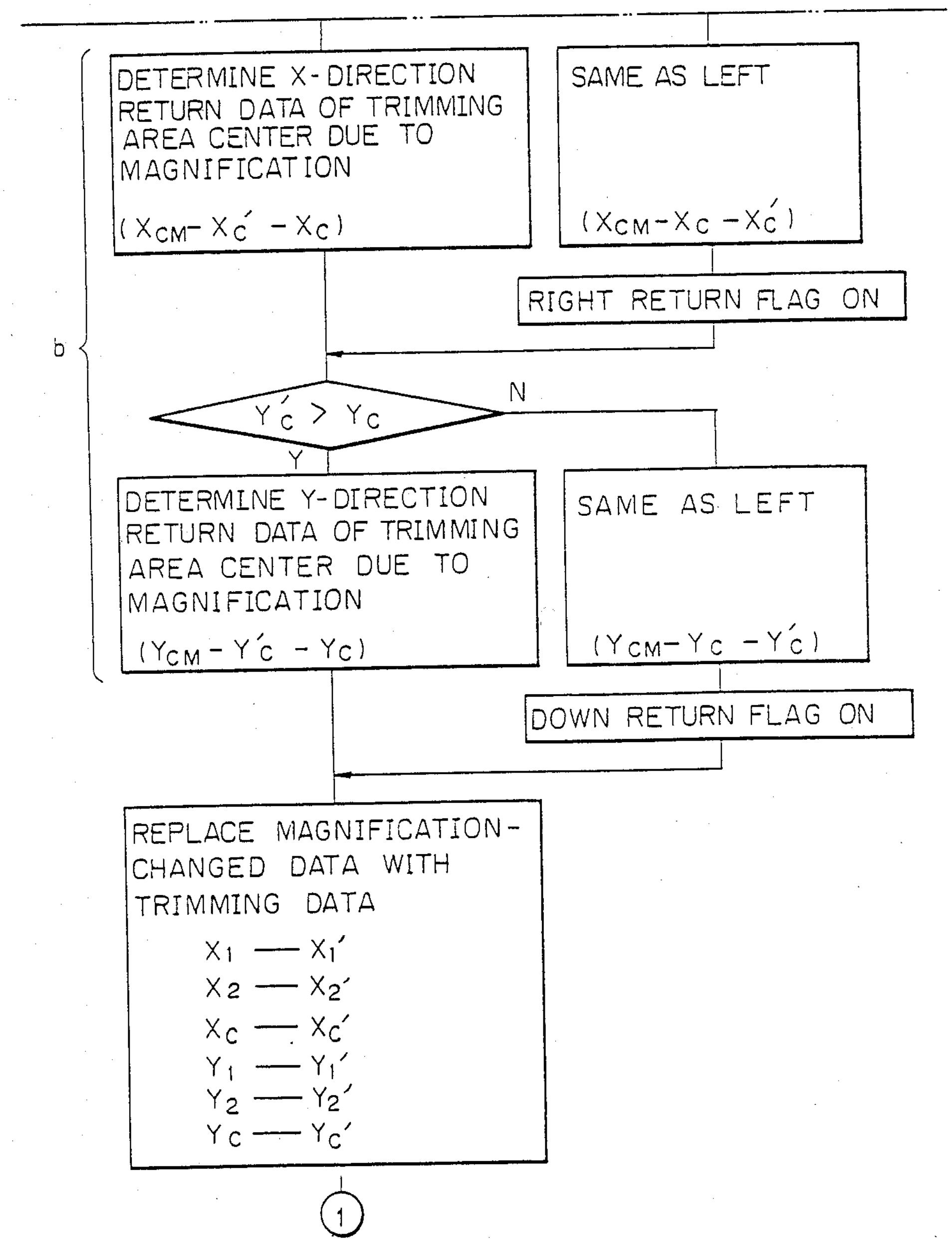

FIG. 8E-8-1-B-2a
FIG. 8E-8-1-B
| FIG. 8E-8-1-B-2a | FIG. 8E-8-1-B-2b |
| --- | --- |
A-1-5-8(2)
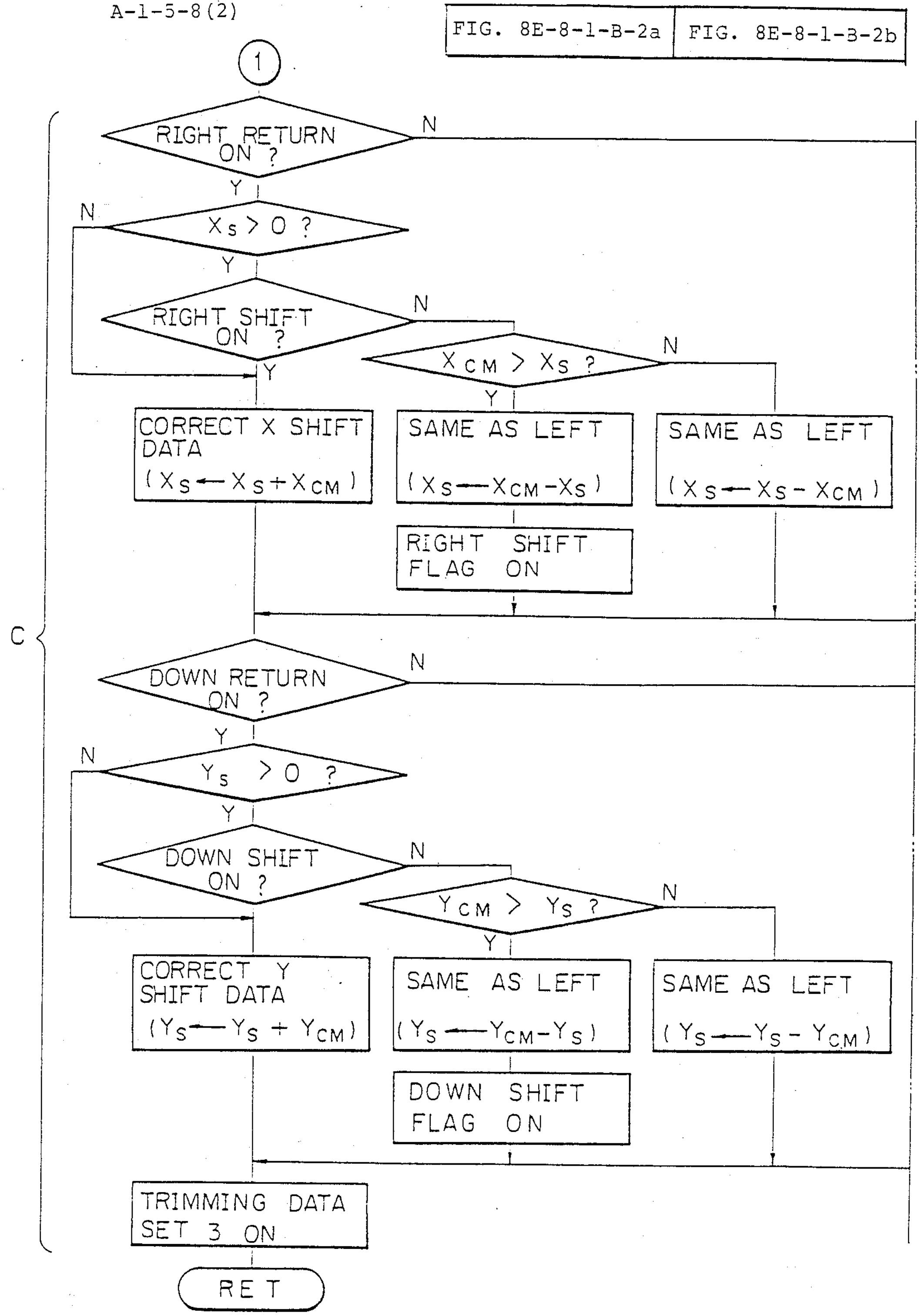

FIG. 8E-8-1-B-2b
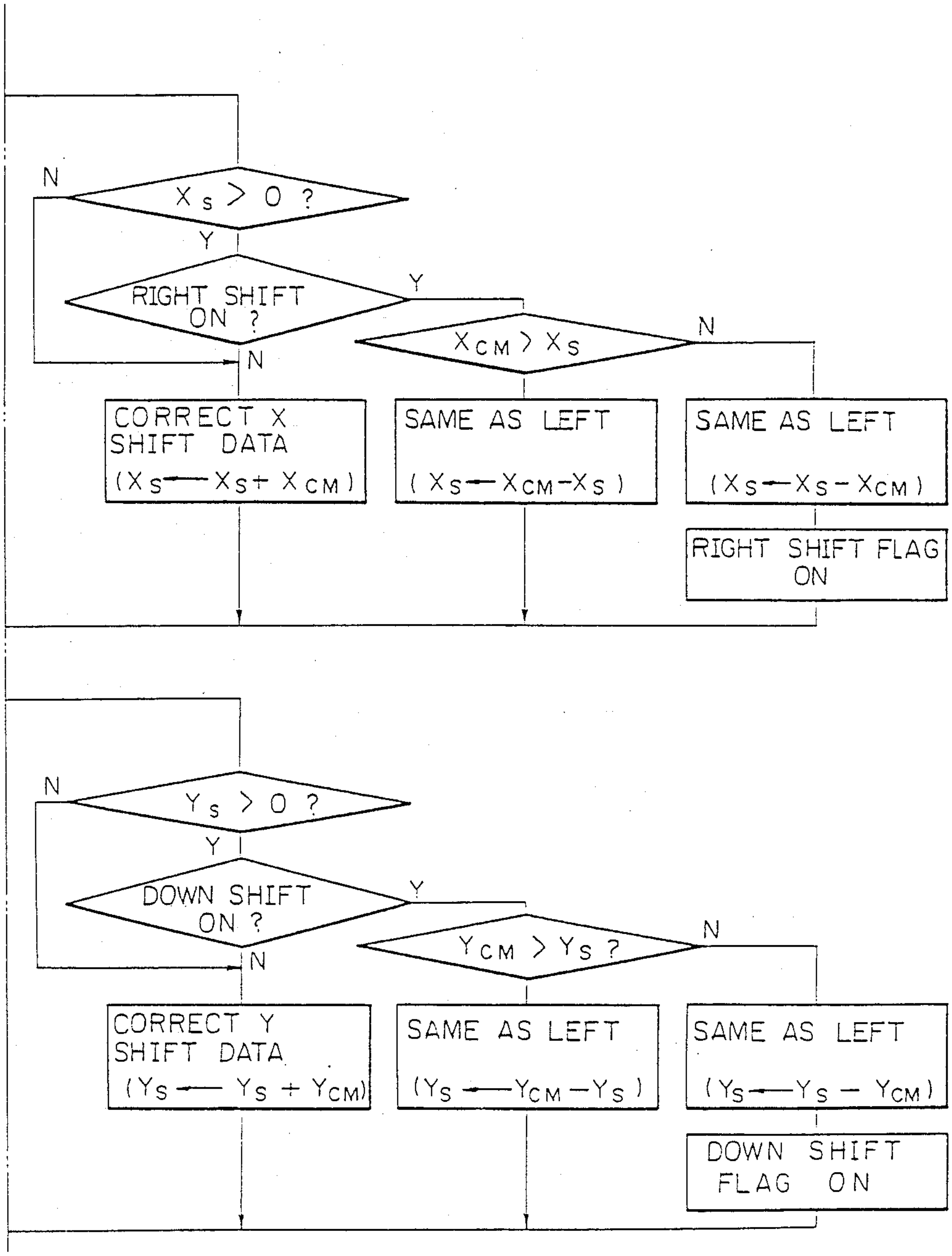

FIG. 8E-3-2-A
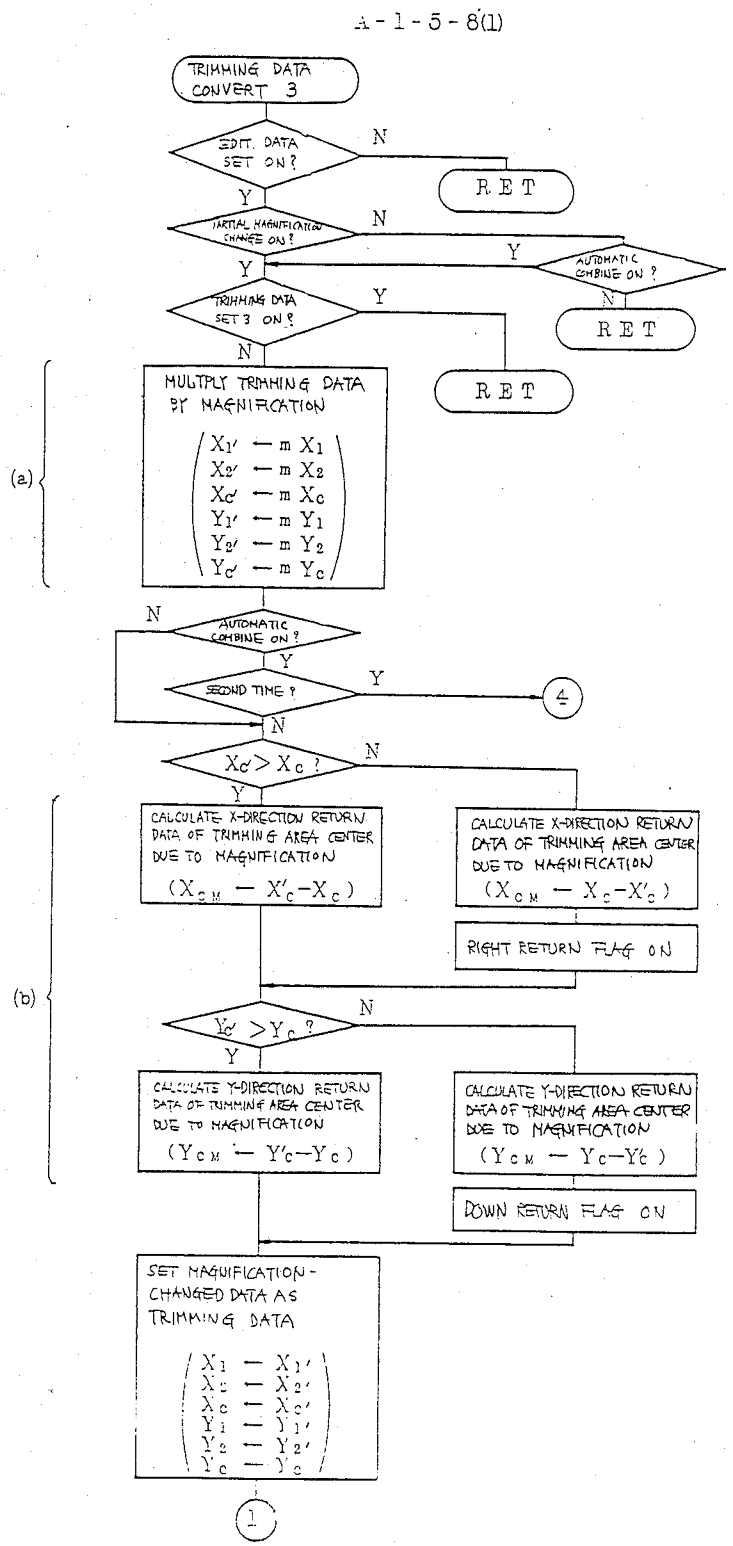

FIG. 8E-8-2-B-2a
FIG. 8E-8-2-B
| FIG. 8E-8-2-B-2a | FIG. 8E-8-2-B-2b |
|---|---|
114291
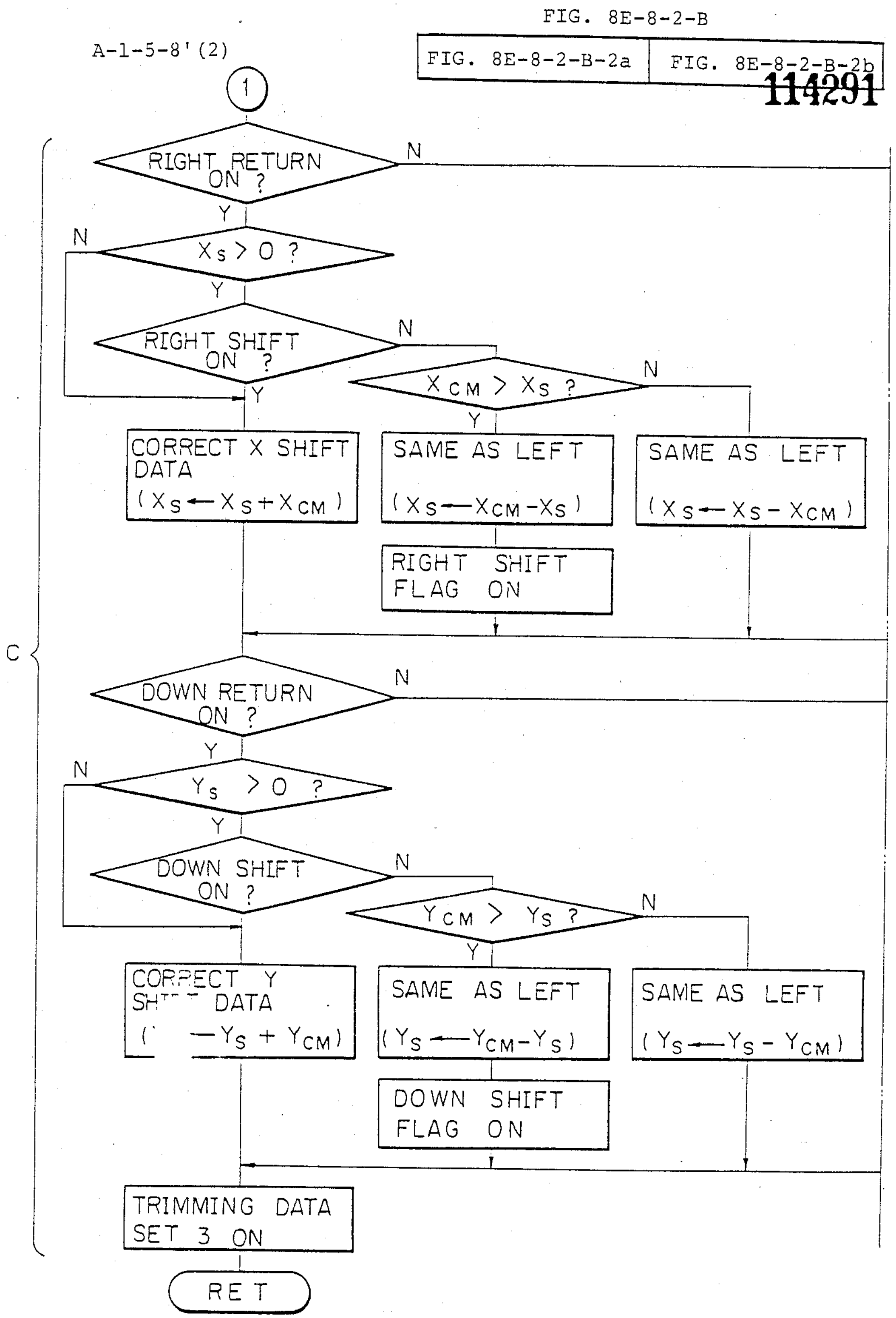

FIG. 8E-8-2-B-2b
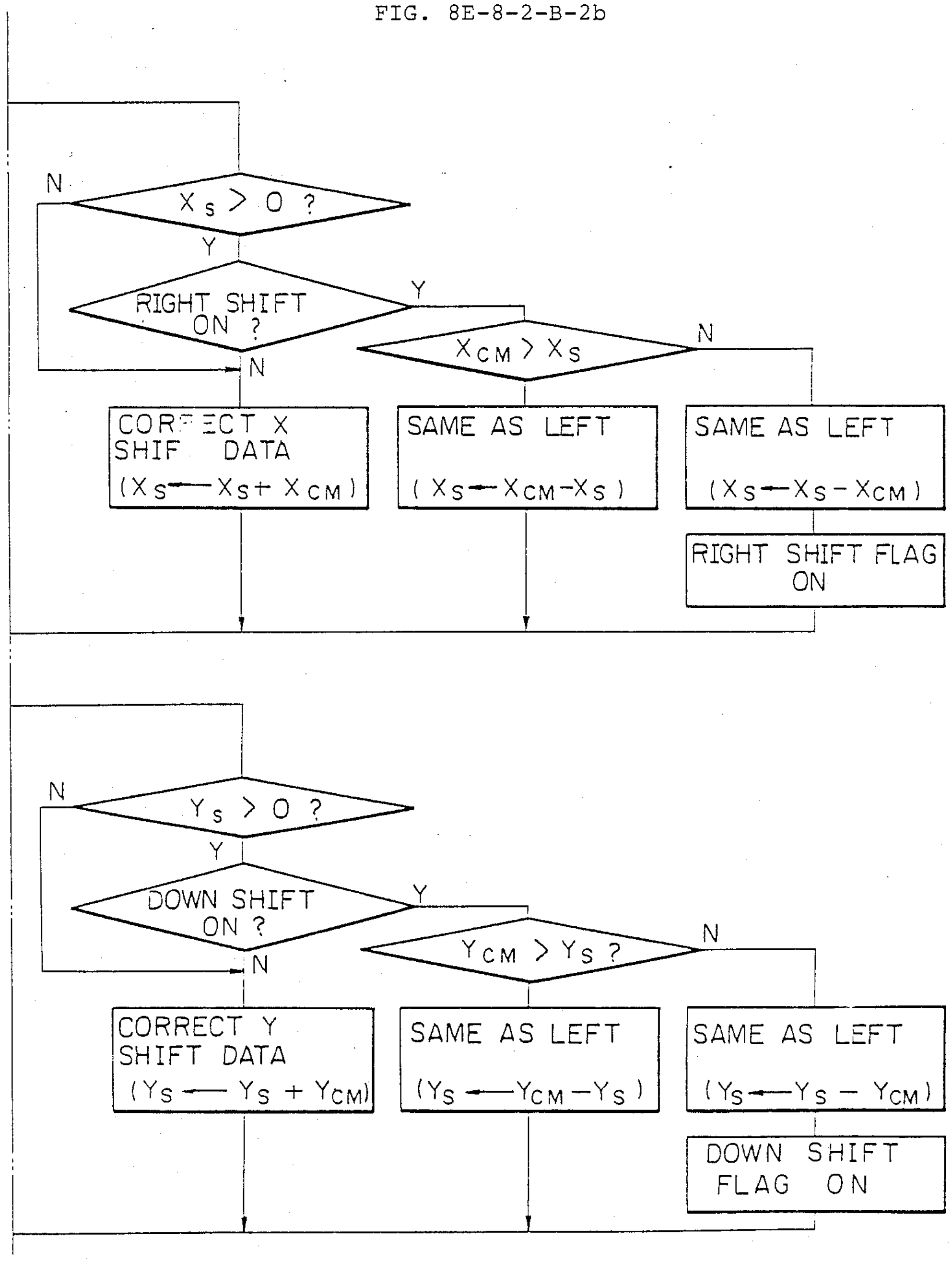

FIG. 8E-8-2-C
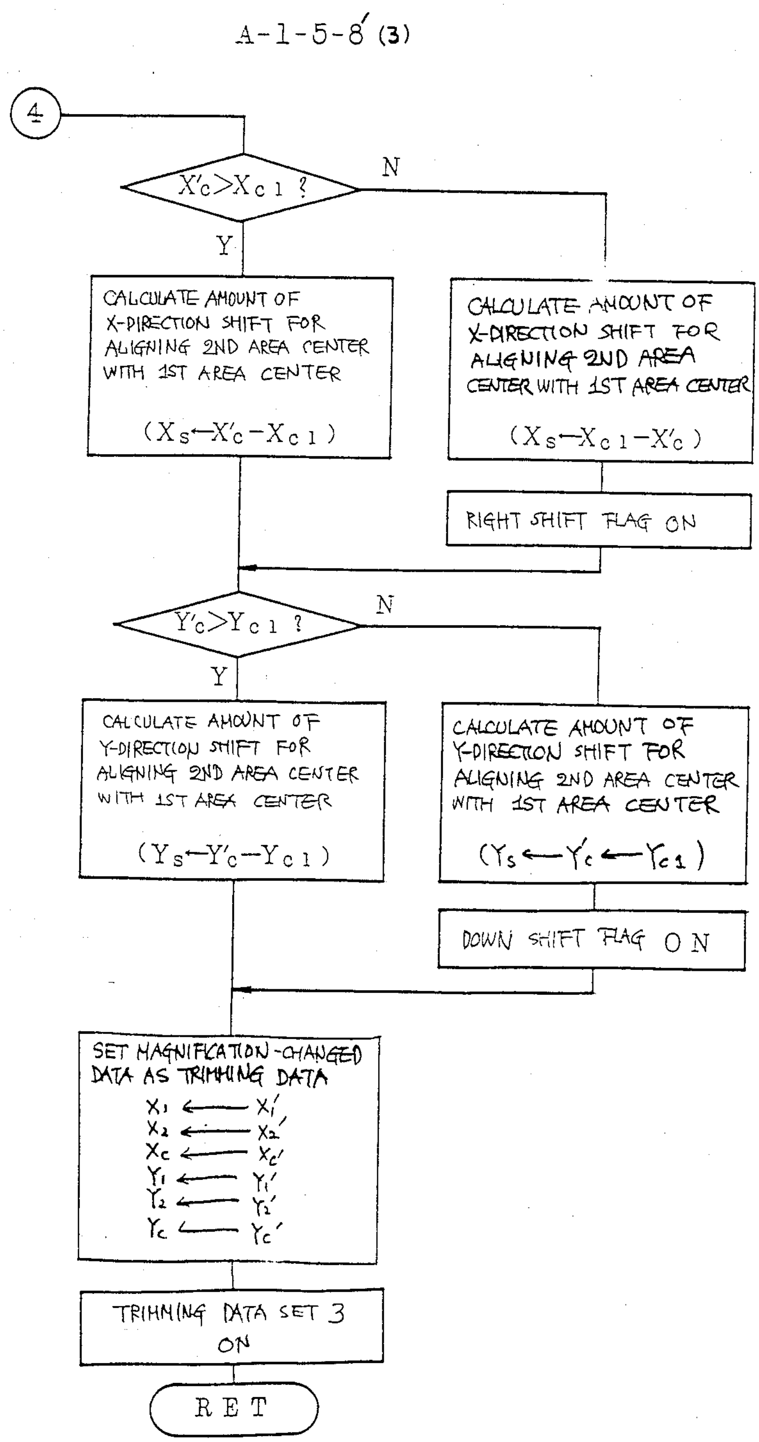

FIG. 8E-8-2-D
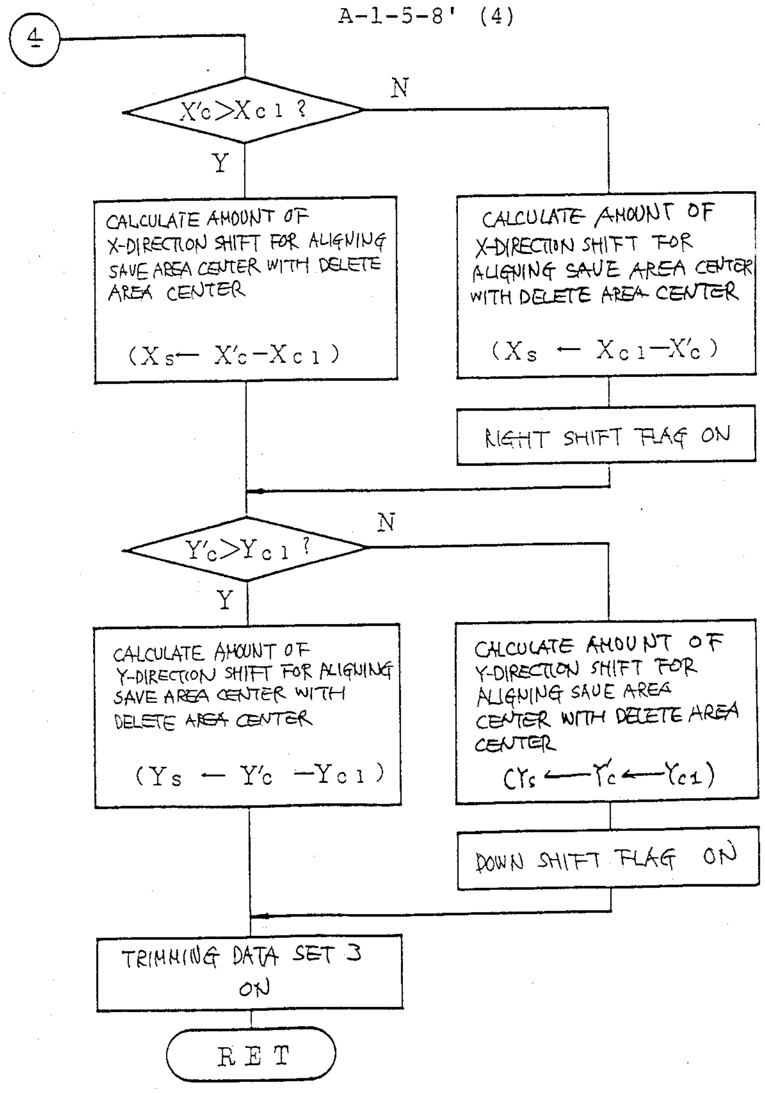

Fig. 8F-a
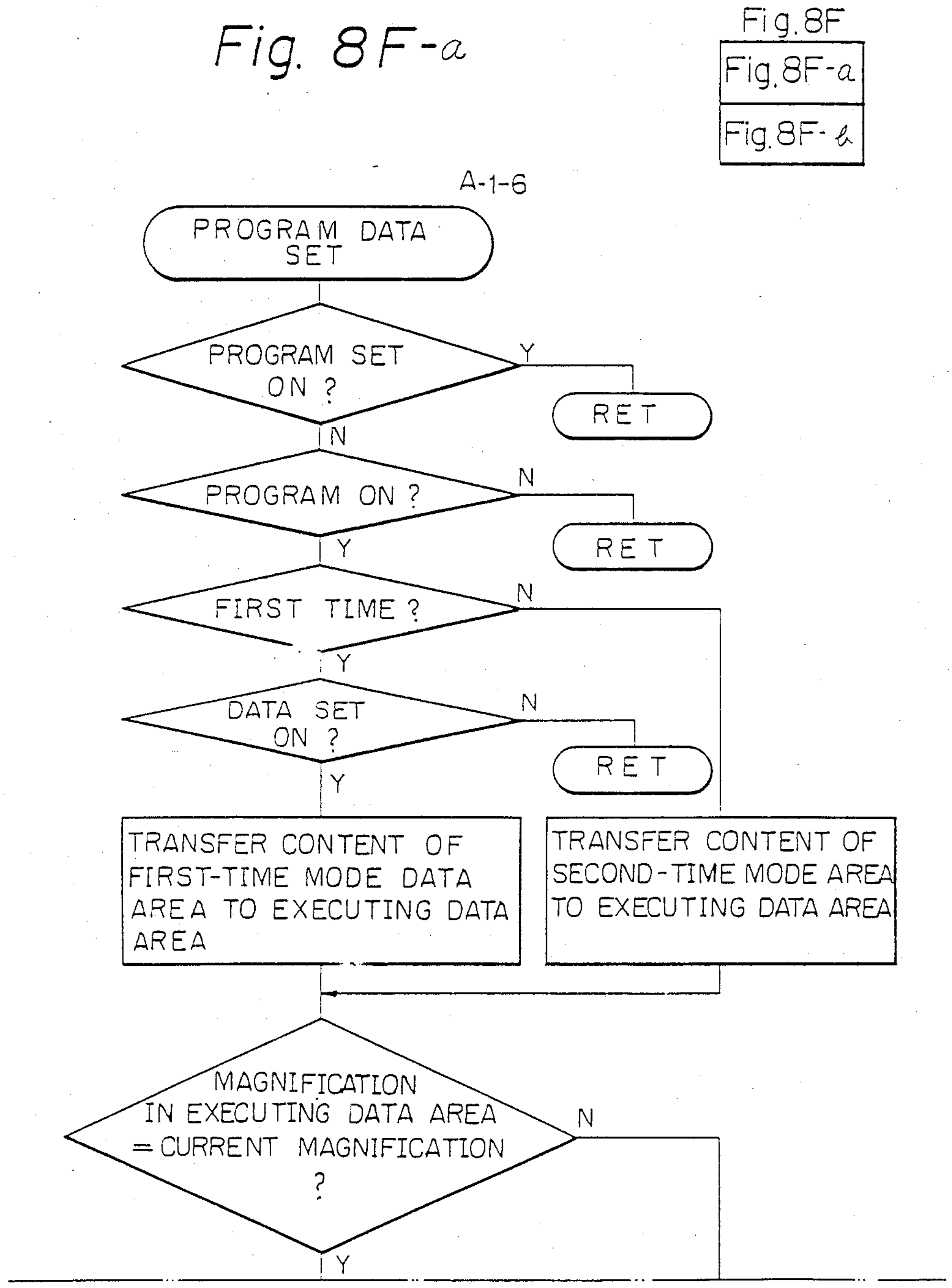

Fig. 8F-b
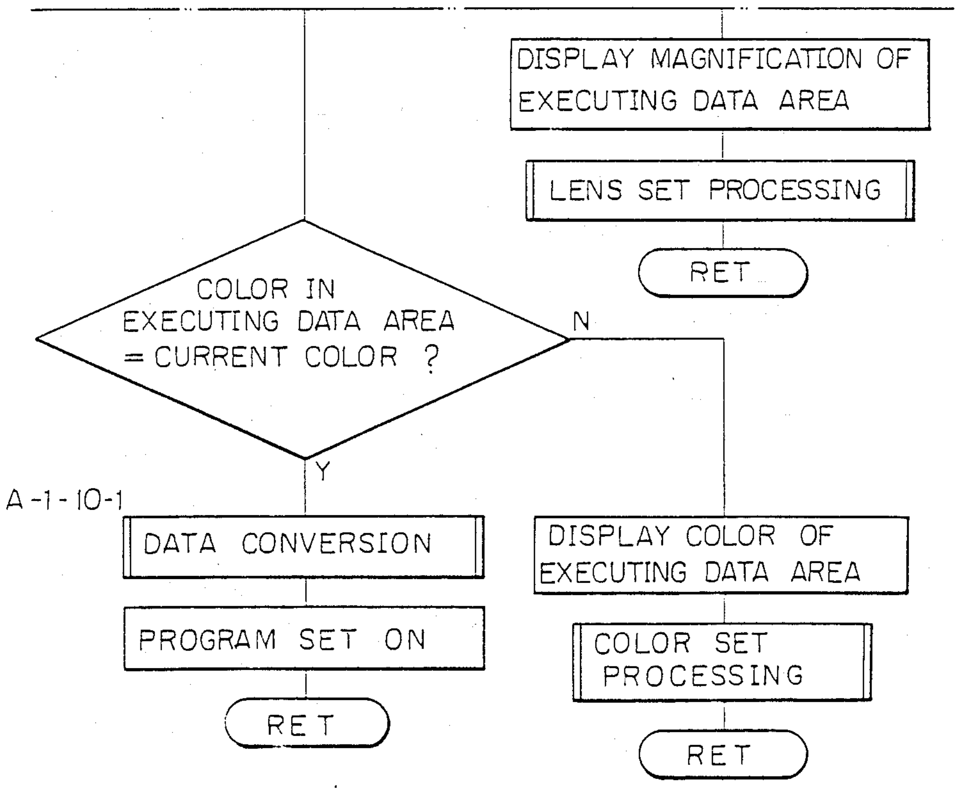

| | |
|---|---|
| Fig.19A | Fig.19B |
| Fig.19C | Fig.19D |
| Fig.19E | Fig.19F |

REFERENCE DEFINED BY ONE SIDE

REFERENCE DEFINED BY CENTER

CONTROL SYSTEM FOR A COPIER

BACKGROUND OF THE INVENTION

The present invention relates to a control system for a copier and, more particularly, to a control system for an electronic copier of the type having a monocolor or multicolor printing function, a combining function, a shifting function, a trimming function, a continuous printing function, a magnification changing function, and others.

A modern high-performance copier has various functions such as a monocolor or multicolor printing function, a combining function for printing images a plurality of times on a single paper, a shifting function for printing an image by shifting the display position of a document, a trimming function for printing only a part of a document, a continuous printing function for printing images of a plurality of objects carried on, for example, an A3 document on papers of smaller format than the document format by dividing the objects, and a magnification changing function for printing an image of a document by enlarging or reducing the image.

In a prior art copier of the type described, each of the functions is accomplished by setting data only once when it is not accompanied with another. To execute two different functions together, after an image has been printed out with data on the first function set, data on the other function is set to print out an image in the same paper. For example, in a combine mode which includes a trim mode and a shift mode, data for trimming or shifting is set, then an image is printed out, then another document data to be combined is set, then the data is printed out combined with the previous one. In this manner, data has to be registered by consecutive times of manipulation on a function-by-function basis. Such not only forces troublesome manipulations upon the operator but also frequency invites erroneous manipulation, faulty printing, and other undesirable occurrences.

Although a special mode capable of executing such settings at the same time may be proposed, it will never occur that after the first copying operation the same mode is needed, e.g., that after the trim mode has been set and executed, the same trimming data is set for the next mode. Hence, repeating the same mode would limit the user's editing and data correcting ability.

The Inventor has proposed a copier control system which promotes operability by, in a combine mode which includes data settings for trimming, shifting and others, allowing the first and second data settings to be effected at the same time (see U.S. patent application Ser. No. 073,749 filed July 15, 1987). Specifically, this system is executed by programming the contents of the first and second documents which are to be edited. In this case, when a masking area and a trimming area are deviated from each other, the trimming area has to be moved by a shift key. Such a system, however, has a drawback that a sequence of troublesome steps such as comparing a document to be masked and a document to be trimmed so as to grasp a distance of movement are needed, resulting in poor operability. In addition, should the distance of movement be inaccurately set, the chance for an image to be dislocated on a copy would be increased.

Further, since such a high performance copier is operated to reproduce a document image by changing the magnification to 110%, 100%, 94%, 78%, 64% or the like, the center of an image is unavoidably shifted based on the magnification selected. Also, the amount of shift is changed according to the magnification. This makes it difficult for the user to edit images because the position of an image to be printed out in a paper differs from that of an image printed in a document. For example, when the trim mode or the image shift mode is combined with the magnification change mode or when the combine mode is combined with the magnification change mode, even if a shift area is specified, the image is shifted by an amount which is produced by multiplying it by the magnification selected; converting the amount of shift to a specific one would make the editing work more difficult.

SUMMARY OF THE INVENTION

It is, therefore, an object of the present invention to provide a copier control system which eliminates the drawbacks particular to the prior art control system as discussed above.

It is another object of the present invention to provide a control system for a copier of the type having a combining, a trimming, a masking and an image shifting capability which allows a trimmed image to be automatically laid in a masked area to thereby enhance operability.

It is another object of the present invention to provide a control system capable of selectively controlling a copier such that the center of a magnification-changed image is located at the same coordinates as the center of an image carried on a document, such that a magnification-changed image is shifted by a specified distance (absolute value), and such that even if the magnification 1, an image is shifted by a specified distance when the document size is different.

It is another object of the present invention to provide a generally improved control system for a copier.

In accordance with the present invention, in a control system for a copier having at least a combining, a trimming, a masking and an image shifting function, there is provided an improvement wherein when a first document is to be masked or trimmed and a second document is to be trimmed or masked so as to combine the two documents, an amount and a direction of shift of a particular area which is defined on one of the two documents is calculated to cause the center of the particular are into register with a center of a particular area which is defined on the other document. The control system controls the copier based on a result of the calculation.

Further, in accordance with the present invention, in a control system for a copier having a partial copying means, an image shifting means and other editing means and a magnification changing means, there is provided an improvement wherein a selective control means is provided for selectively controlling partial magnification change for changing a magnification of a specified area for partial copying and total magnification change for changing a magnification of an image edited by the editing means.

The above and other objects, features and advantages of the present invention will become more apparent from the following detailed description taken with the accompanying drawings.

BRIEF DESCRIPTION OF THE DRAWINGS

FIG. 8A-1 is a flowchart showing magnification change processing;

FIG. 8A-2 is a flowchart showing fixed magnification setting;

FIG. 8A-3 is a flowchart showing magnification change mode setting;

FIG. 8A-4 is a flowchart showing zoom magnification setting;

FIG. 8A-5 is a flowchart showing magnification change set 2;

FIG. 8A-6 is a flowchart showing magnification change set 3;

FIG. 8E-1 is a flowchart showing right/left key processing

FIG. 8E-2 is a flowchart showing up/down key processing;

FIG. 8E-3 is a flowchart showing enter key processing;

FIGS. 8E-4 and 8E-4-1 are flowcharts showing partial magnification change set processing;

FIG. 8E-5 is a flowchart showing edit data convert processing;

FIG. 8E-6 is a flowchart showing trimming data convert 1;

FIGS. 8E-7 and 8E-7-1 are flowcharts showing trimming data convert 2;

FIGS. 8E-8-1-A, 8E-8-1-B, 8E-8-2-A, 8E-8-2-B, 8E-8-2-C and 8E-8-2-D are flowcharts showing trimming data convert 3;

FIG. 8E-9 is a flowchart showing trimming data convert 4;

FIG. 8E-10 is a flowchart showing centering data convert processing;

FIG. 8E-11 is a flowchart showing shift data convert processing;

FIGS. 8E-12 and 8E-13 are flowcharts demonstrating an automatic combine set mode;

FIGS. 8F and 8F-1 are flowcharts showing program setting;

FIG. 9 is a flowchart showing print condition check;

FIG. 8G-1 is a flowchart showing data convert processing;

FIG. 10 is a flowchart showing pre-copy processing;

FIG. 11 is a flowchart showing print ON initialization;

FIG. 11A is a flowchart showing ADF feed check;

FIG. 11B is a flowchart showing combine 1/surface mode set processing;

FIG. 12 is a flowchart showing pre-copy operation processing;

FIG. 12B-1 is a flowchart showing paper feed control;

FIG. 12B-1-1 is a flowchart showing paper feed/transport clutch ON;

FIG. 12B-1-2 is a flowchart showing combine gate/-solenoid ON;

FIG. 12B-2 is a flowchart showing combine sensor check;

FIG. 12B-3 is a flowchart showing combine paper feed control;

FIG. 13 is a flowchart showing copy processing;

DESCRIPTION OF THE PREFERRED EMBODIMENTS

Figure 1:
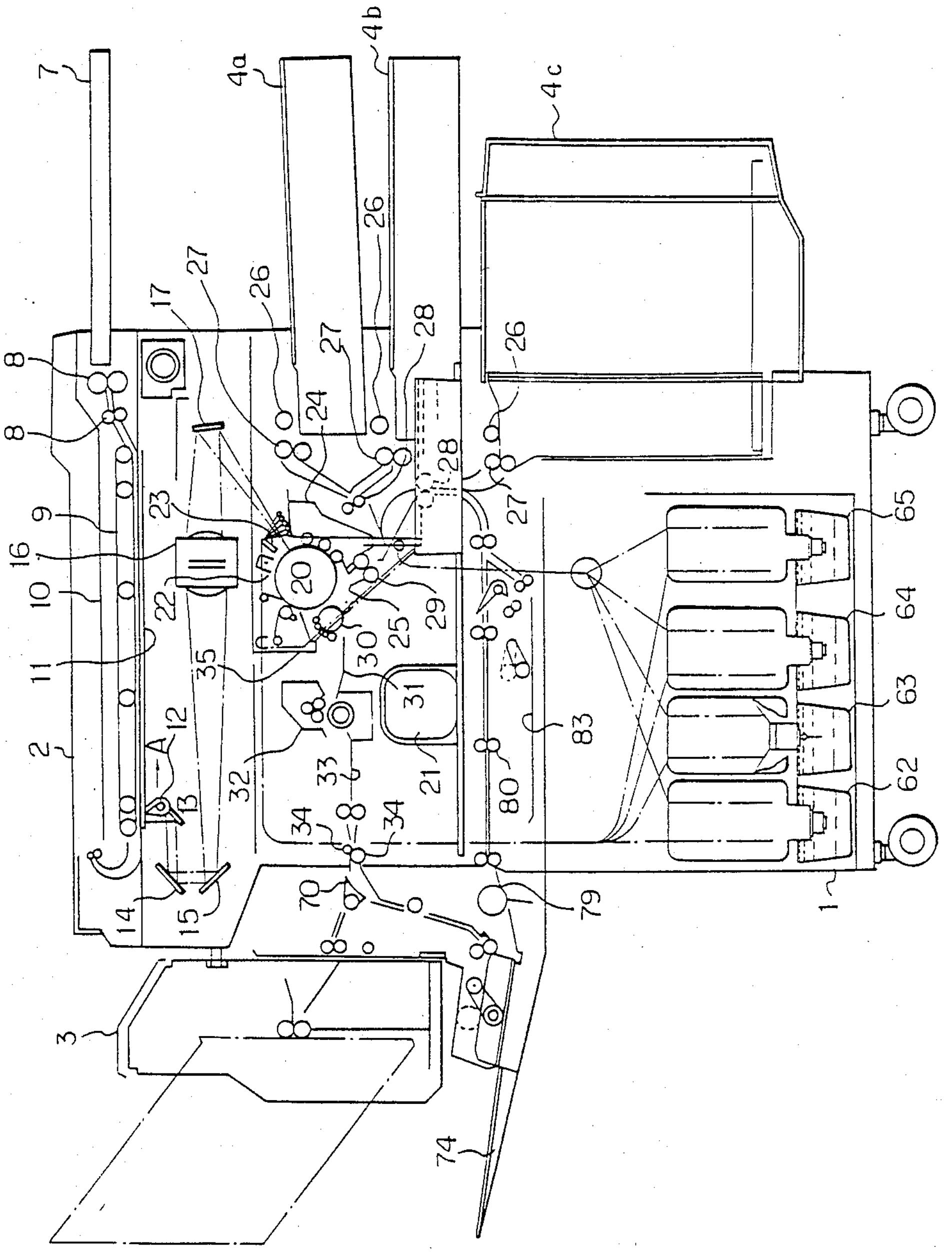
FIG. 1 is a sectional elevation of a monocolor copier to which the present invention is applicable.

Referring to FIG. 1 of the drawings, a monocolor copier to which the present invention is applicable is shown. As shown, an automatic document feeder (ADF) 2 is loaded on the top of a copier body 1, and a sorter 3 is provided on the paper outlet side of the copier body 1. Provided on the paper inlet side of the copier 1 is a paper feed section which includes paper cassettes 4*a* and 4*b*, and a paper tray 4*c* adapted for the supply of a large amount of papers. The ADF 2 includes a document setting portion 7, ADF feed rollers 8, an ADF conveyor belt 9, and a document discharge tray 10. Documents loaded in the document setting section 7 are fed one by one by the ADF feed rollers 8 to the ADF conveyor belt 9, then positioned on a glass platen 11, and then discharged to the tray 10 after copying. The ADF 2 is hinged at one side thereof to the copier body 1 to be movable toward and away from the glass platen, serving as a cover or presser plate when a document is manually set on the glass platen 11.

The document laid on the glass platen 11 is illuminated by a lamp 12. A reflection from the document is focused on the surface of a photoconductive drum 20 by way of a first mirror 13, a second mirror 14, a third mirror 15, a lens unit 16, and a fourth mirror 17. The drum 20 is driven in a clockwise rotary motion by a main motor 21 through a power transmitting mechanism, not shown. The lamp 12 and first mirror 13 are loaded on a first carriage, not shown, and driven at a predetermined rate in a direction indicated by an arrow A. The second and third mirrors 14 and 15, respectively, are mounted on a second carriage, not shown, and driven in the direction A at half the rate of the first carriage. The charged surface is exposed to the imagewise reflection from the document, so that an electrostatic latent image is formed on the charged surface. The latent image is developed by a developing unit 24, and the resulting visible image is fed to a transfer charger 25.

A paper fed from the paper feed section by feed rollers 26 is driven sequentially by rollers 27 and 28 to register rollers 29. At a predetermined timing, the register rollers 29 drive the paper toward the transfer charger 25 along a paper guide, whereby the previously mentioned visible image is transferred to the paper. Then, the paper is separated from the drum 20 by a separating unit 30 and, then, fed along a paper guide 31 to a fixing unit 32 which applies heat to the paper. The paper coming out of the fixing unit 32 is advanced along a paper guide 33 to discharge rollers 34 to be thereby fed out of the copier body 1. The sorter 3 sorts the papers which are sequentially fed out of the copier body 1.

In a combine mode or a two-side copy mode, images should be printed out twice on a single paper. In such a mode, the paper is transferred by a switch 70 toward a position 74 where it awaits another copying cycle. Thereafter, the paper is advanced through a second transport path by rollers 79 and 80 to reach the transfer charger 25 again. In the two-side copy mode, the paper directly transferred from the waiting position 74 to the transfer charger 25 is upside down and, therefore, can be printed with the next image without changing its position. On the other hand, in a combine mode which allows, for example, an undercolor to be printed in a single color, the paper is turned over at a second waiting position 83 and, then, transported to the transfer charger 25 so as to print out another image on the same side of the paper. The surface of the drum 20 is cleaned by a cleaning unit 35, whereafter the main charger 22 is energized again. Located in a bottom part of the copier body 1 and independently of each other are a red printing liquid 62, a green printing liquid 63, a blue printing liquid 64, and a cleaning liquid 65. Each of these liquids is circulated between its associated reservoir and the drum 20.

Figure 2:
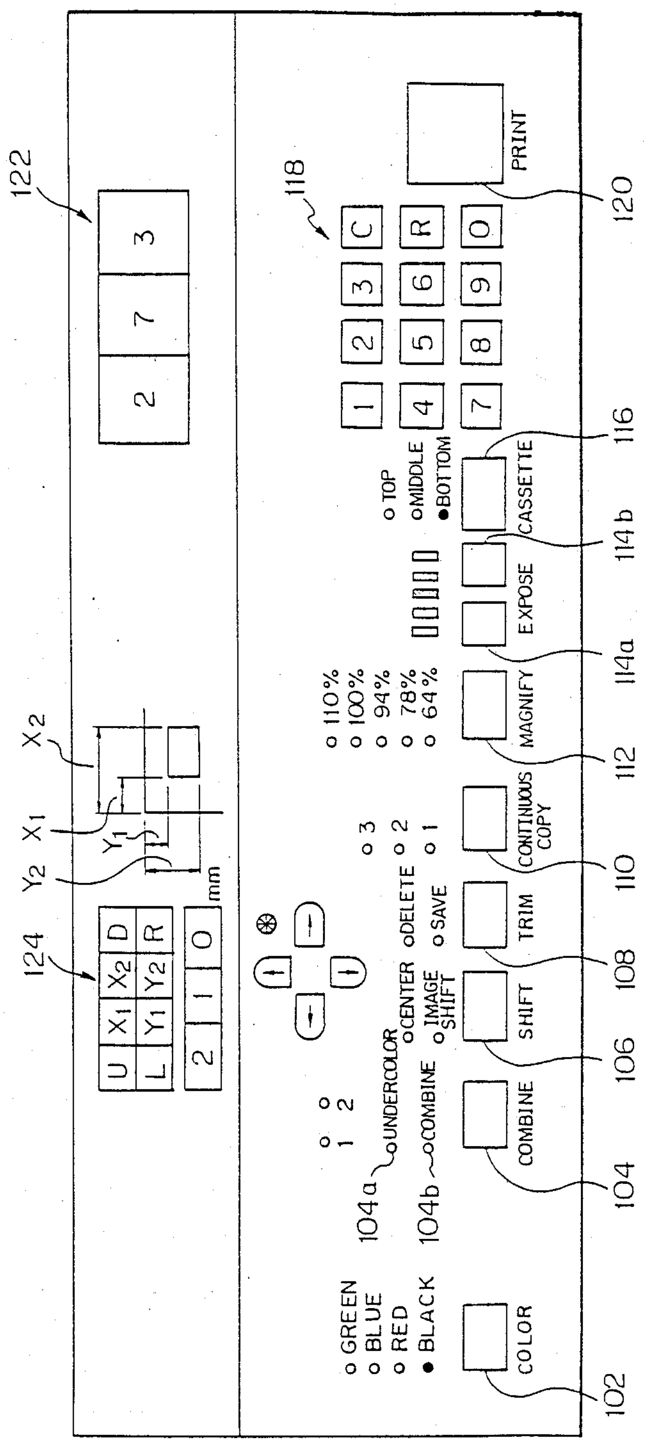

Referring to FIG. 2, a control panel, or operation board, in accordance with one embodiment of the present invention is shown. Various keys provided on the control panel will be described from the right to the left of the figure. When a color key 102 is depressed, a green, a blue, a red and a black lamp are sequentially turned on in this order. As a combine key 104 is depressed, one of an undercolor lamp 104*a* and a combine lamp 104*a* is turned on to set up a mode. Depressing a shift key 106 causes a center lamp and an image shift lamp to glow alternately. Depressing a trim key 108 causes a delete lamp and a save lamp to glow alternately. A save mode is such that a desired area of an image is specified and saved with the other area deleted, and a delete mode is such that that desired area is deleted. A continuous copy key 110 is adapted to select one of the first, second and third divisional copying. A magnify key 112 is operable to select a magnification ranging from 110% to 64%. Expose keys 114*a* and 114*b* are selectively operable to sequentially increase the image density, from the right to the left of the figure. A cassette key 116 is adapted to select a desired one of the top, middle and bottom cassettes. Numeral keys 118 may be depressed to enter a desired number of copies. A print key 120 is operable to start a copying operation. A numerical display 122 provided in an upper right portion of the control panel shows a cumulative number of copies. In an upper left portion of the control panel, symbols U, D, L, R, X1, X2, Y1 and Y2 are provided. The symbols U, D, L and R are representative of, respectively, UP, DOWN, LEFT and RIGHT while the symbols X1, X2, Y1 and Y2 are individually representative of the distances which are shown at the center of the control panel. Specifically, in the event of setting data for trimming and image shifting, the arrows which are positioned above the various keys are selectively manipulated to select a particular direction of shift and, then, a distance from the starting point is set by means of the symbols 124 and a display, which is shown as indicating 210 mm.

Figure 2A:
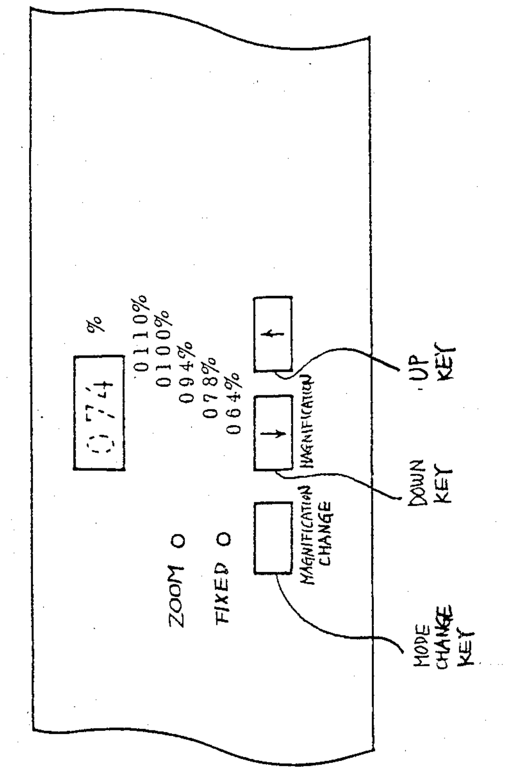
FIGS. 2A and 2B are views each showing an exemplary control panel of the copier as shown in FIG. 1.

In an alternative configuration of the control panel shown in FIG. 2A, there are provided a mode select key and magnification keys UP and DOWN. Every time the mode select key is depressed, the mode alternates between a zoom and a fixed magnification mode. The magnify key UP is operable to increase the magnification and the magnify key DOWN to decrease it.

Figure 3:
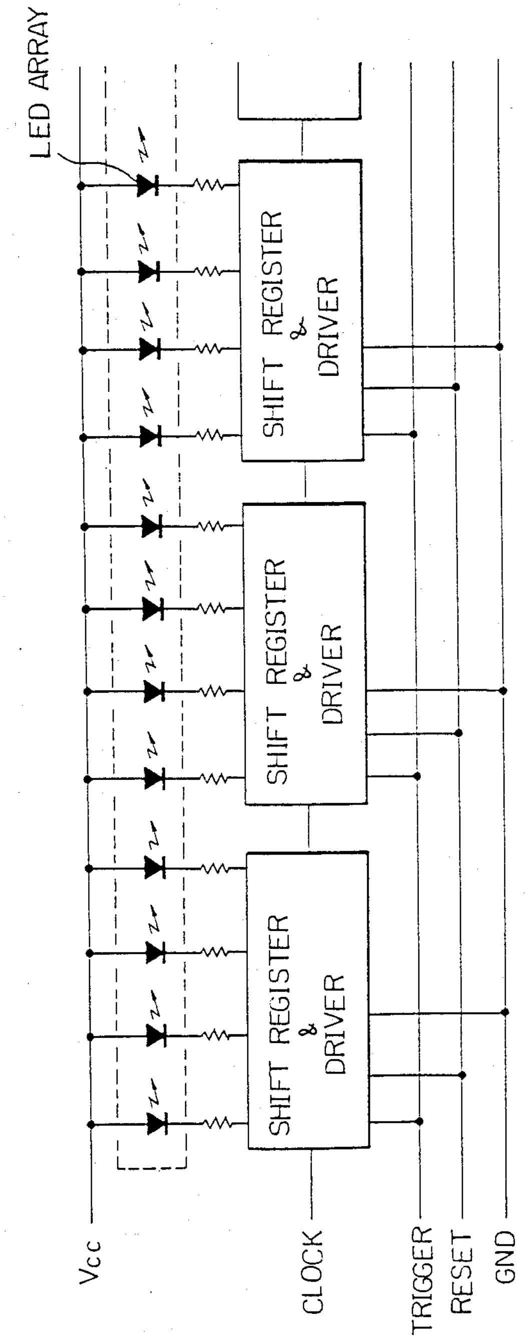
FIG. 3 is a diagram showing an LED array control circuit installed in the copier of FIG. 1.

Referring to FIG. 3, there is shown an LED (light emitting diode) array control circuit adapted to erase a part of a latent image which is provided on the drum 20. A CPU (central processing unit) delivers an LED arrangement signal as counted from a reference side in response to a clock signal, whereby a bit arrangement corresponding to turn-on and turn-off of LEDs is generated. Then, a trigger is input in synchronism with a turn-on timing to selectively control the LEDs. While a shift register and driver is associated with each four LEDs, such merely suggests the use of shift registers each having four pin terminals; use may be made of a single shift register having a great number of pins, if desired.

Figure 4:
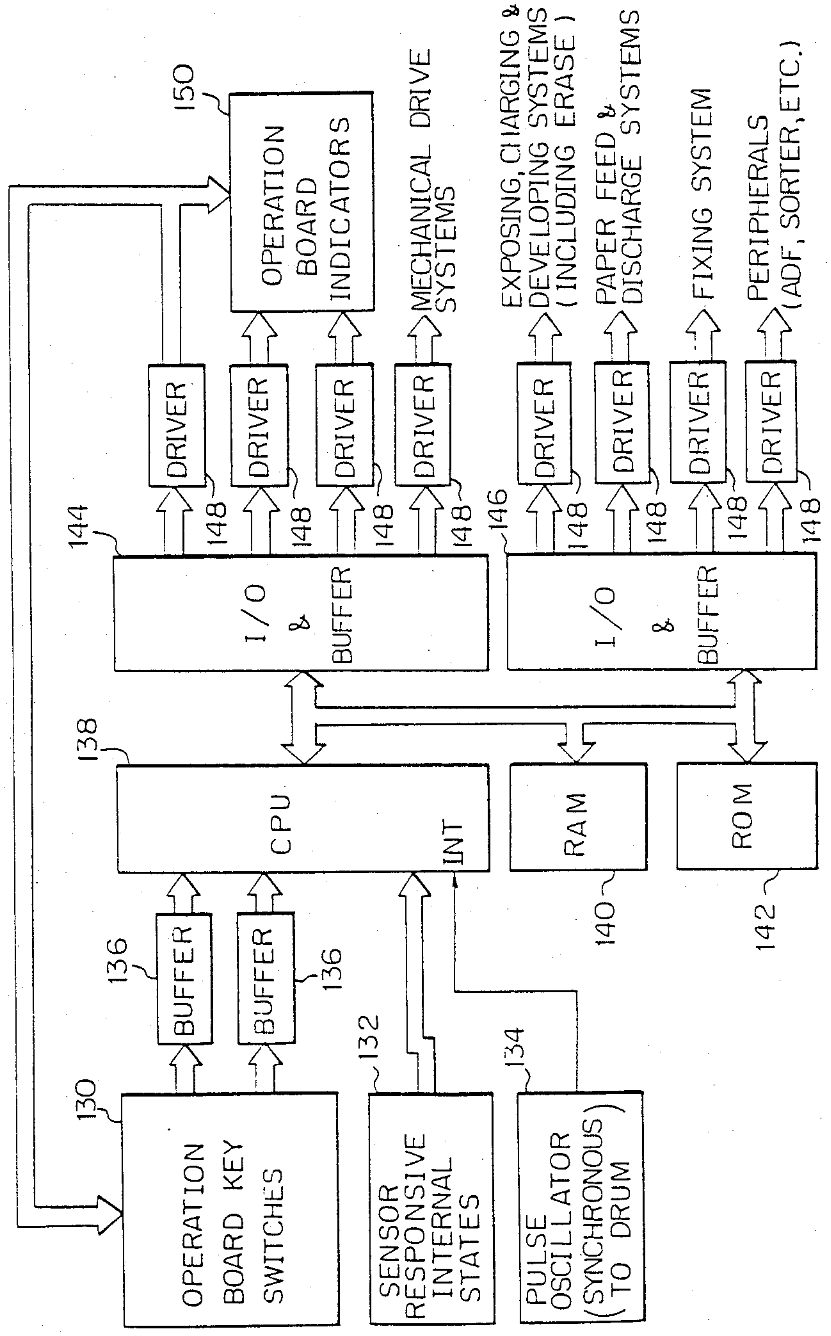
FIG. 4 is a schematic block diagram showing a control section of the copier as shown in FIG. 1.

FIG. 4 shows a copier control section in accordance with the present invention. As shown, a CPU 138 is connected via buffers 136 to various key switches 130 of the copier, sensors 132 responsive to various conditions inside of the copier, and a pulse oscillator 134 which is synchronous to the drum 20. The CPU 138 is also connected to a RAM 140, a ROM 142, and I/O (input/output) port buffers 144 and 146 by an address bus, a control bus, a data bus, etc. The I/O port buffers 144 and 146 are connected via drivers 148 to a load 150 which is adapted for drive, display and others.

In this particular embodiment, in a combine mode which includes setting of data for trimming, shifting and others, only the program stored in the CPU1 is changed and not the hardware described so far, so that such data may be set at the same time. Hereinafter, the composite combine mode will be referred to as a program mode for simplicity. As regards the control panel shown in FIG. 2, the program mode is executed by operating two or more of the buttons, i.e., without resorting to any extra button.

Hereinafter will be described the basic operation of the copier and the trim mode, shift mode, combine mode, program mode, and others.

BASIC OPERATION

Figure 5:
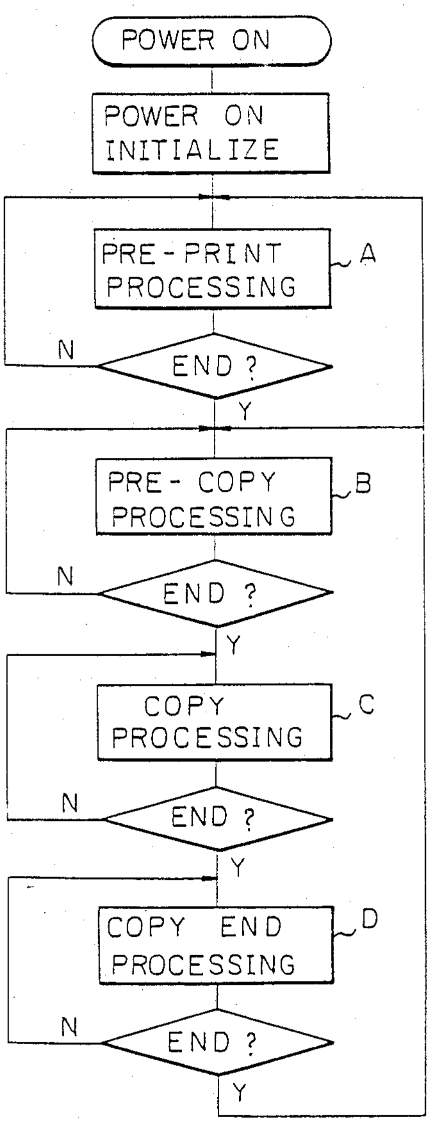
FIG. 5 is a flowchart demonstrating the basic operation of the copier.

Referring to FIG. 5, the basic operation of a copier which uses the invention is shown in a flowchart. When a power switch, not shown, of the copier is turned ON, power ON initialize processing is executed and, then, copy processing (C) is performed by way of pre-print processing (A) and pre-copy processing (B). After the copy processing (C), copy end processing (D) is executed to effect pre-processing for the next copying or, alternatively, the copy end processing is simply repeated.

Figure 6:
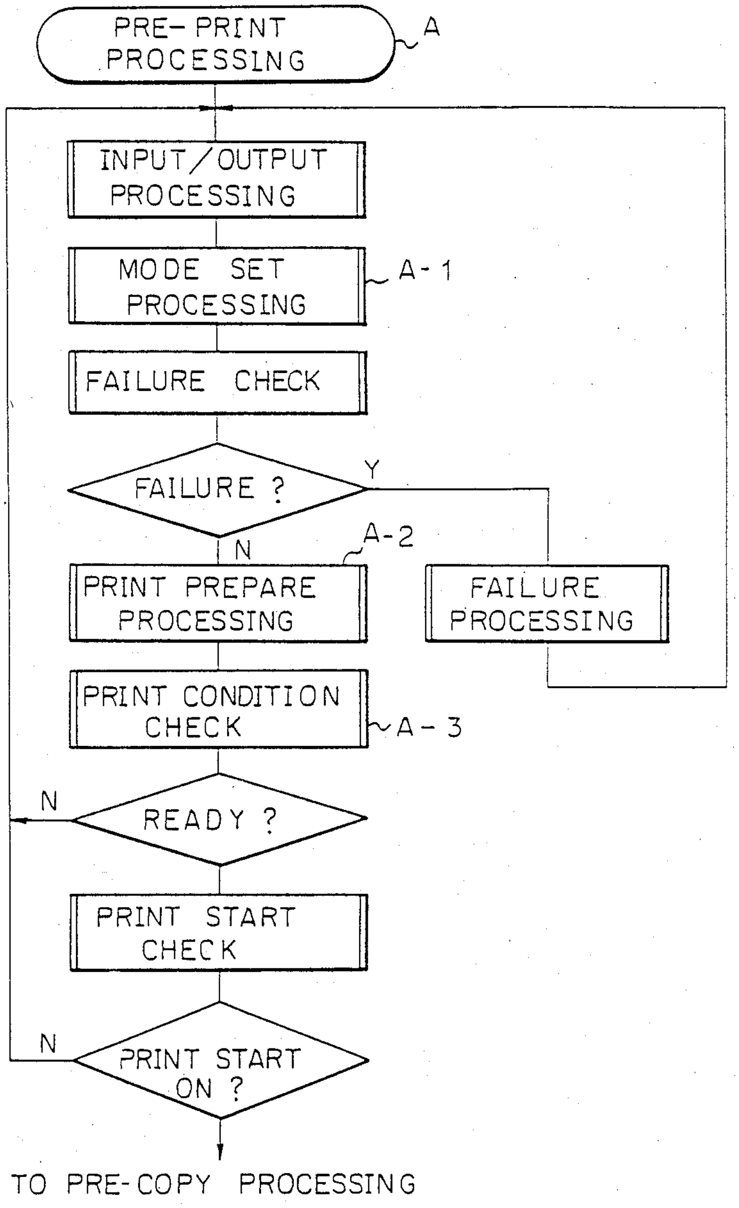
FIG. 6 is a flowchart showing pre-print processing.

FIG. 6 shows the pre-print processing (A) of FIG. 5 in detail. As shown, input/output processing, mode set processing (A-1), and failure checking are executed one after another in this order. If any failure is found, failure processing is performed. If no failure is found, the program advances to print prepare processing (A-2), and then to print condition check (A-3). If the printer is READY, print start check is performed to see if a print start ON condition has been reached. If the printer is not READY or if the print start ON condition has not been reached, the program returns to the beginning to repeat the input/output processing.

Figure 8:
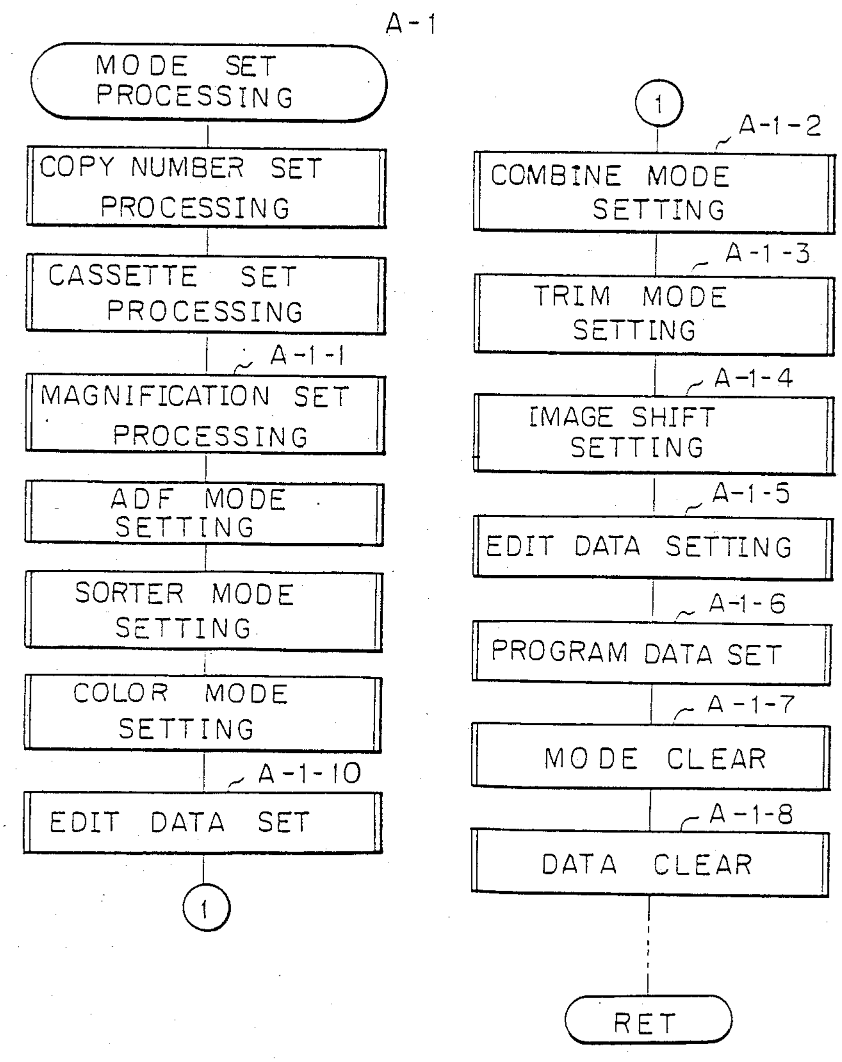

FIG. 8 shows the mode set processing (A-1) in detail. In the mode set processing (A-1), magnification set processing (A-1-1) is executed after copy number set processing and cassette set processing. This is followed by ADF mode set, sorter mode set, color mode set, edit data set (A-1-10), combine mode set (A-1-2), trim mode set (A-1-3), image shift set (A-1-4), edit data set (A-1-5) and program set (A-1-6), and then by mode clear (A-1-7), data clear (A-1-8), and the like. Thereafter, the program returns (RET) to the beginning.

Figure 7:
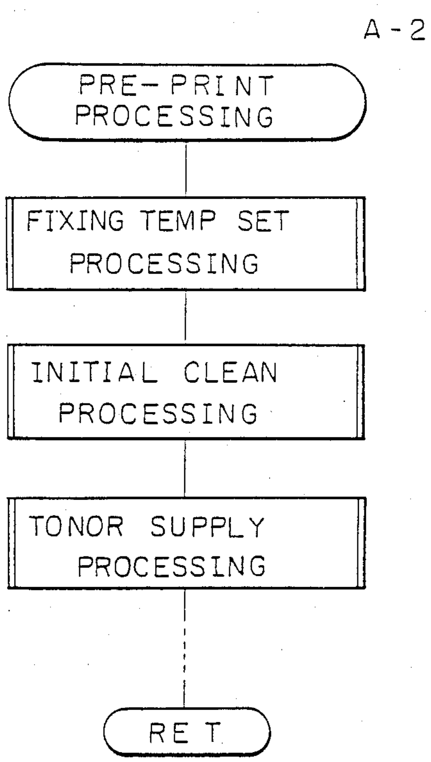
FIG. 7 is a flowchart showing print prepare processing.

FIG. 7 shows details of the print prepare processing (A02) which is included in the pre-print processing (A). As shown, fixing temperature set processing, initial clean processing, toner supply processing and others are executed in sequence and, then, the program returns (RET) to the beginning.

Figures 1, 8A:
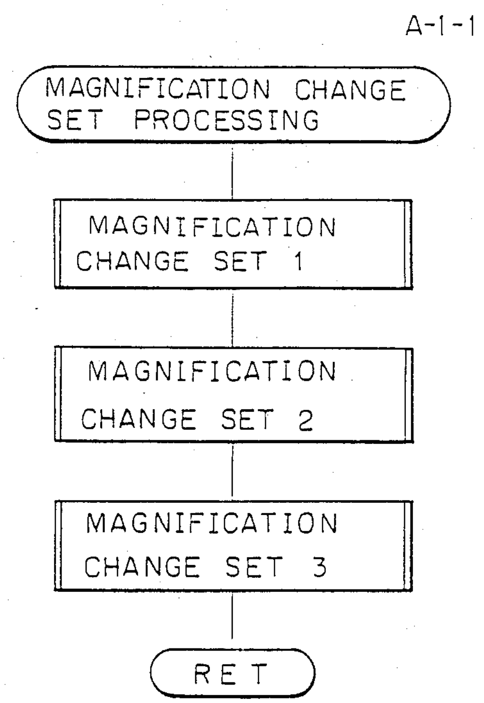
Figures 2, 8A:
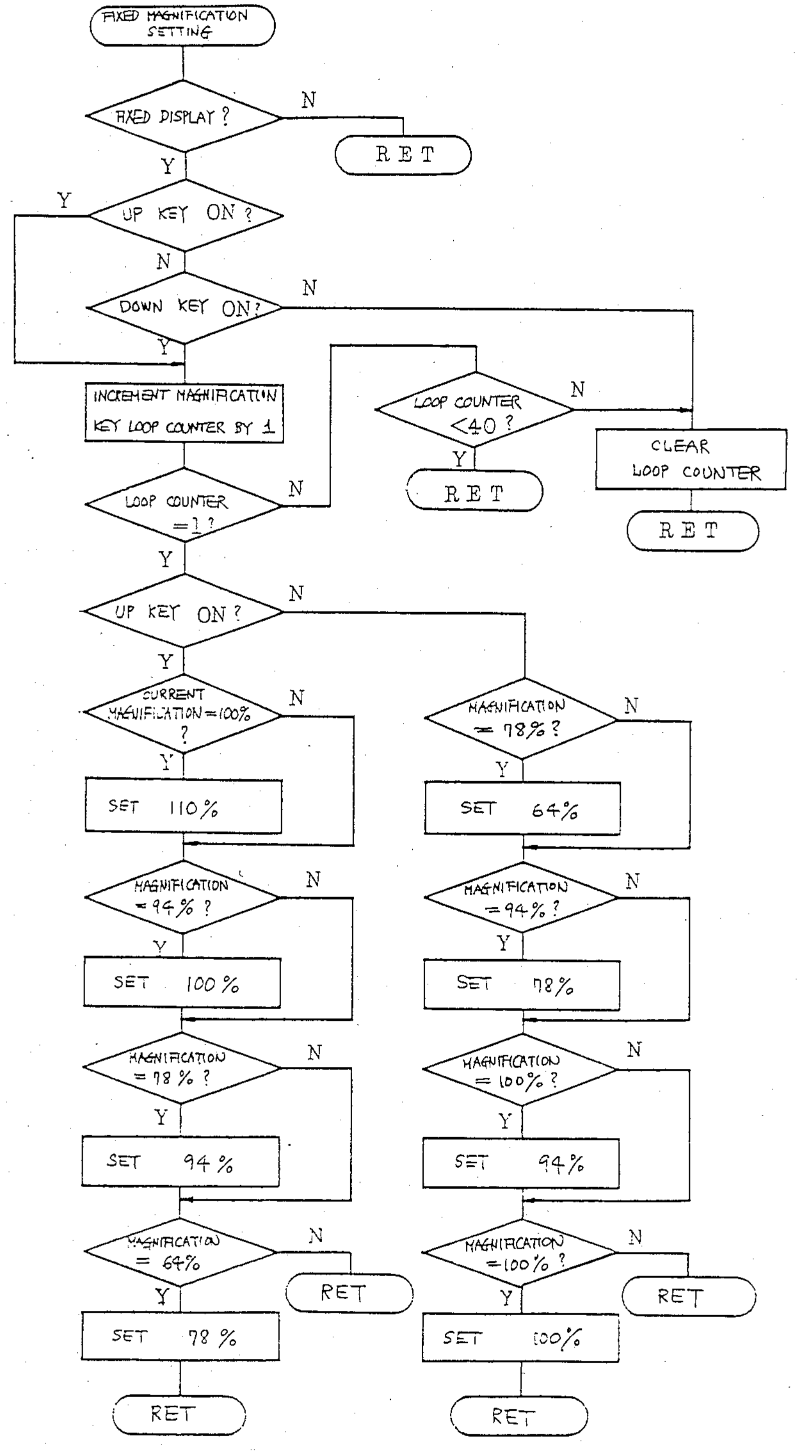
Figures 3, 8A:
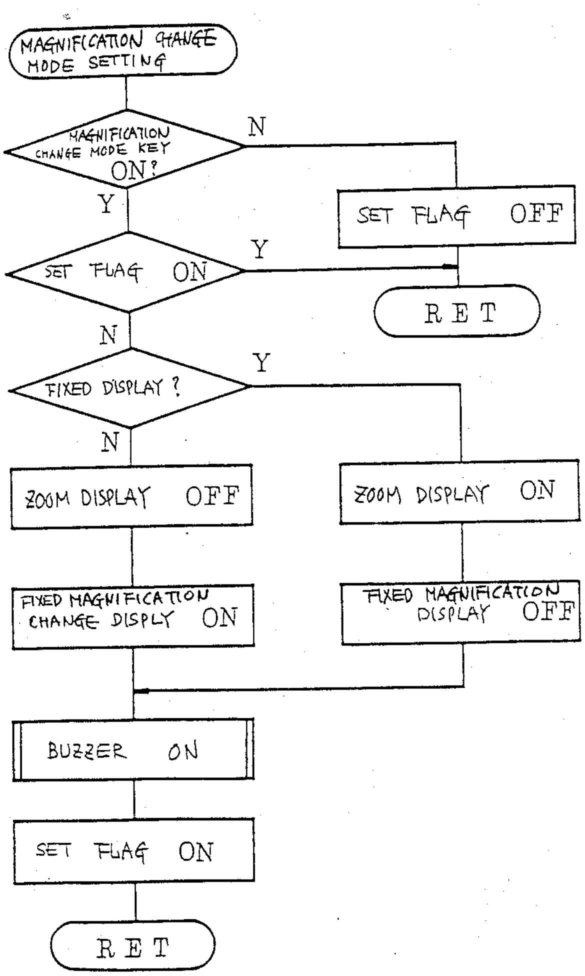
Figures 4, 8A:
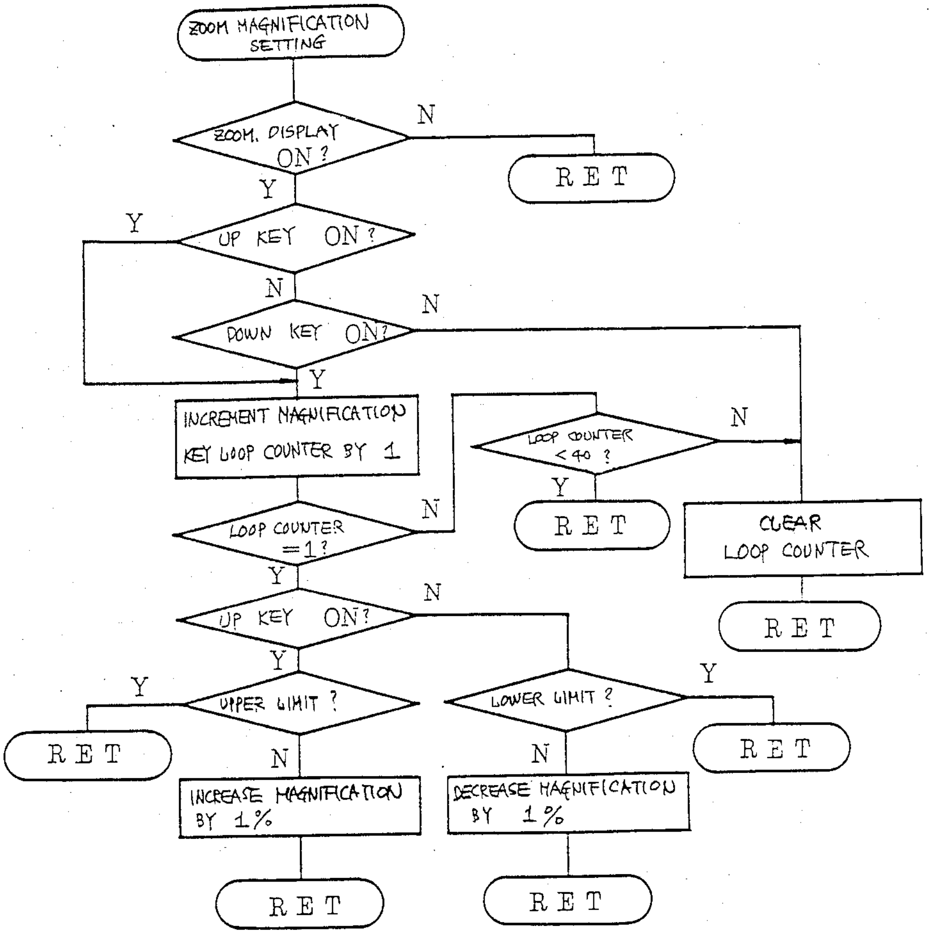
Figures 5, 8A:
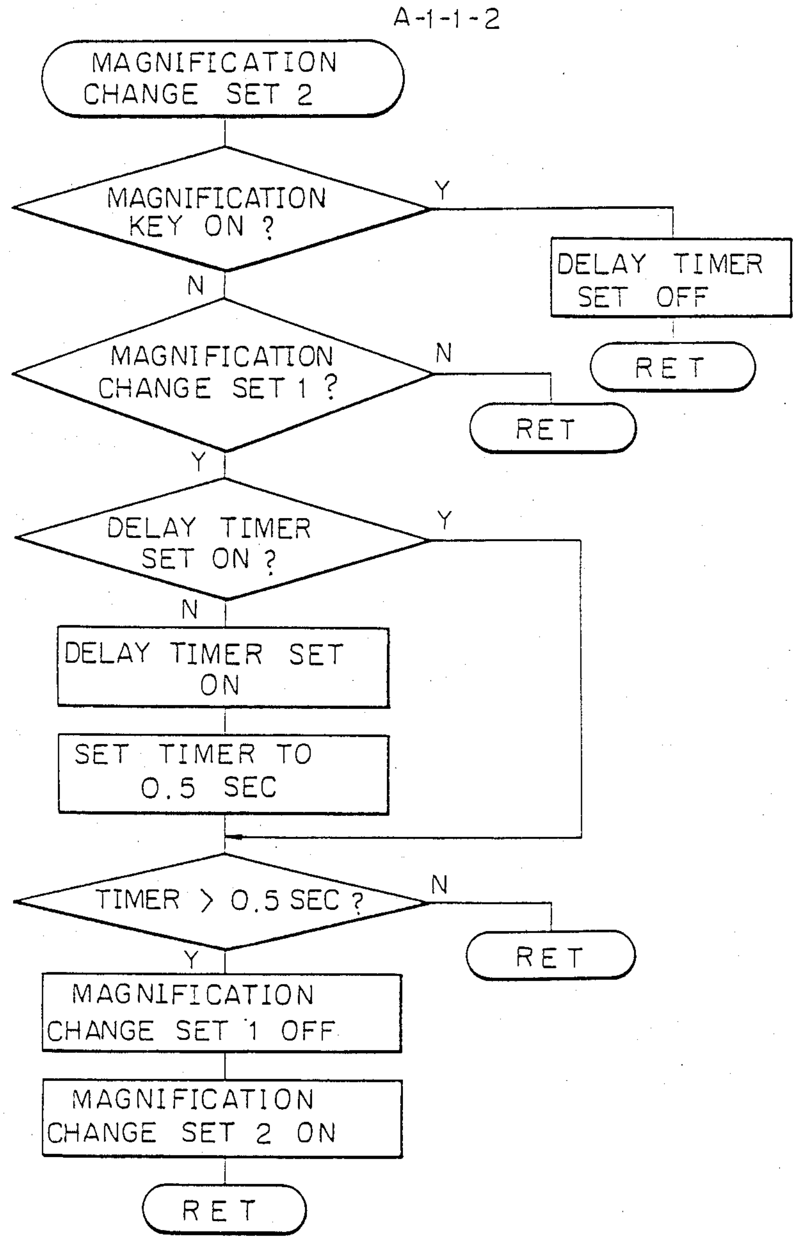
Figures 6, 8A:
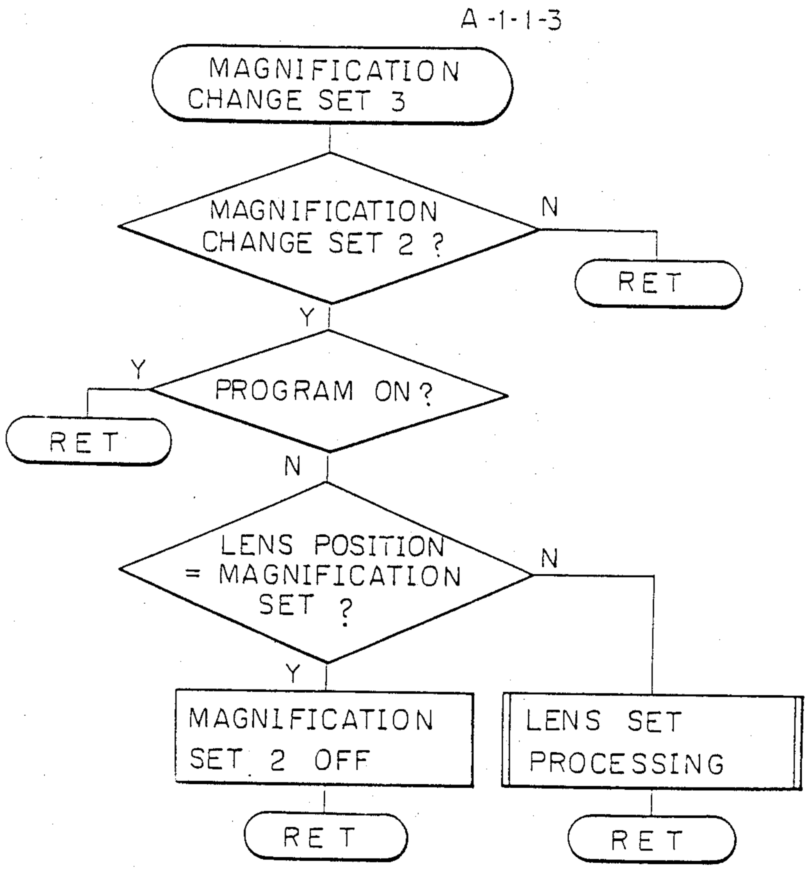
Figure 8B:
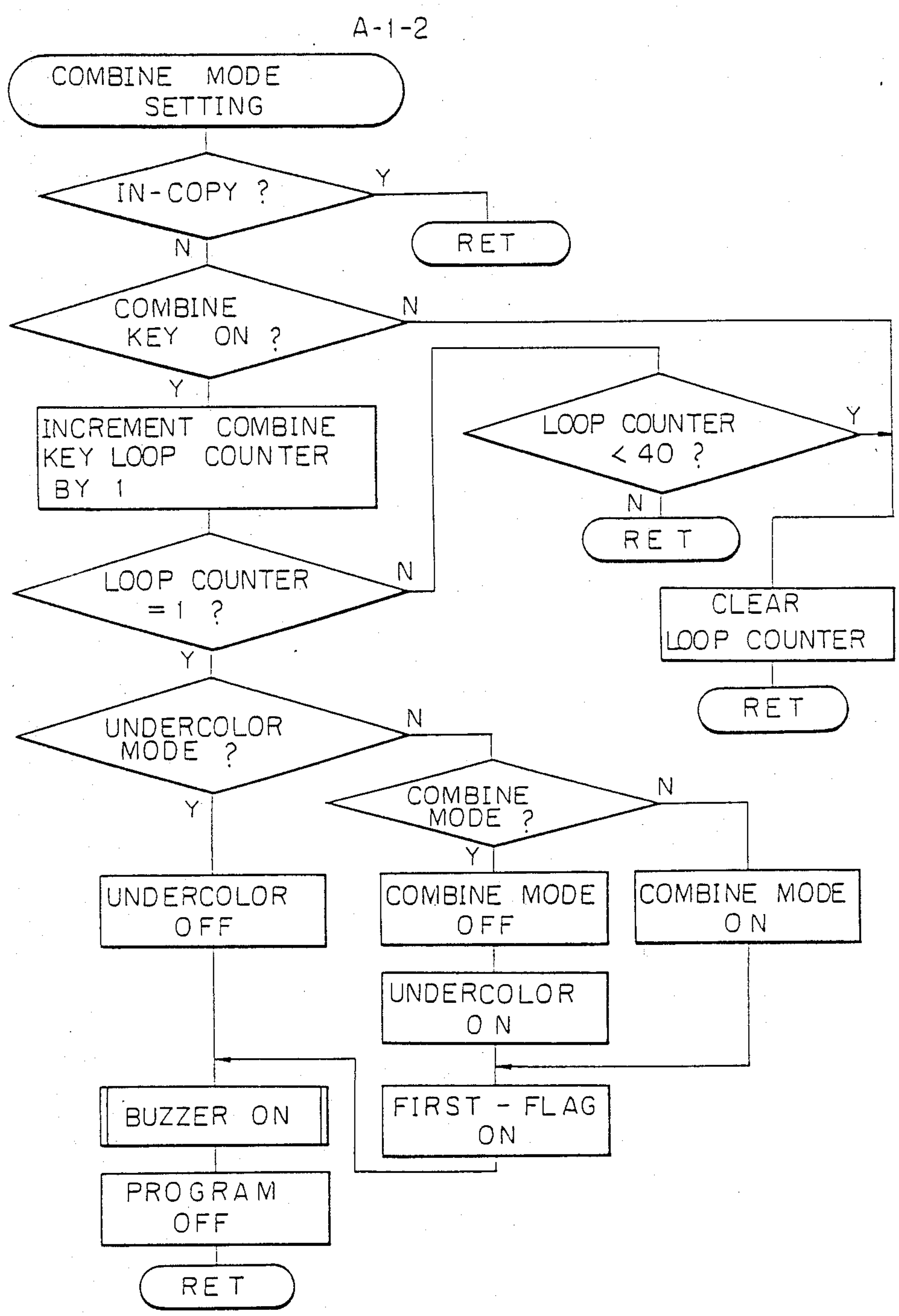
FIG. 8B is a flowchart showing combine mode set processing.
Figures 1, 8C:
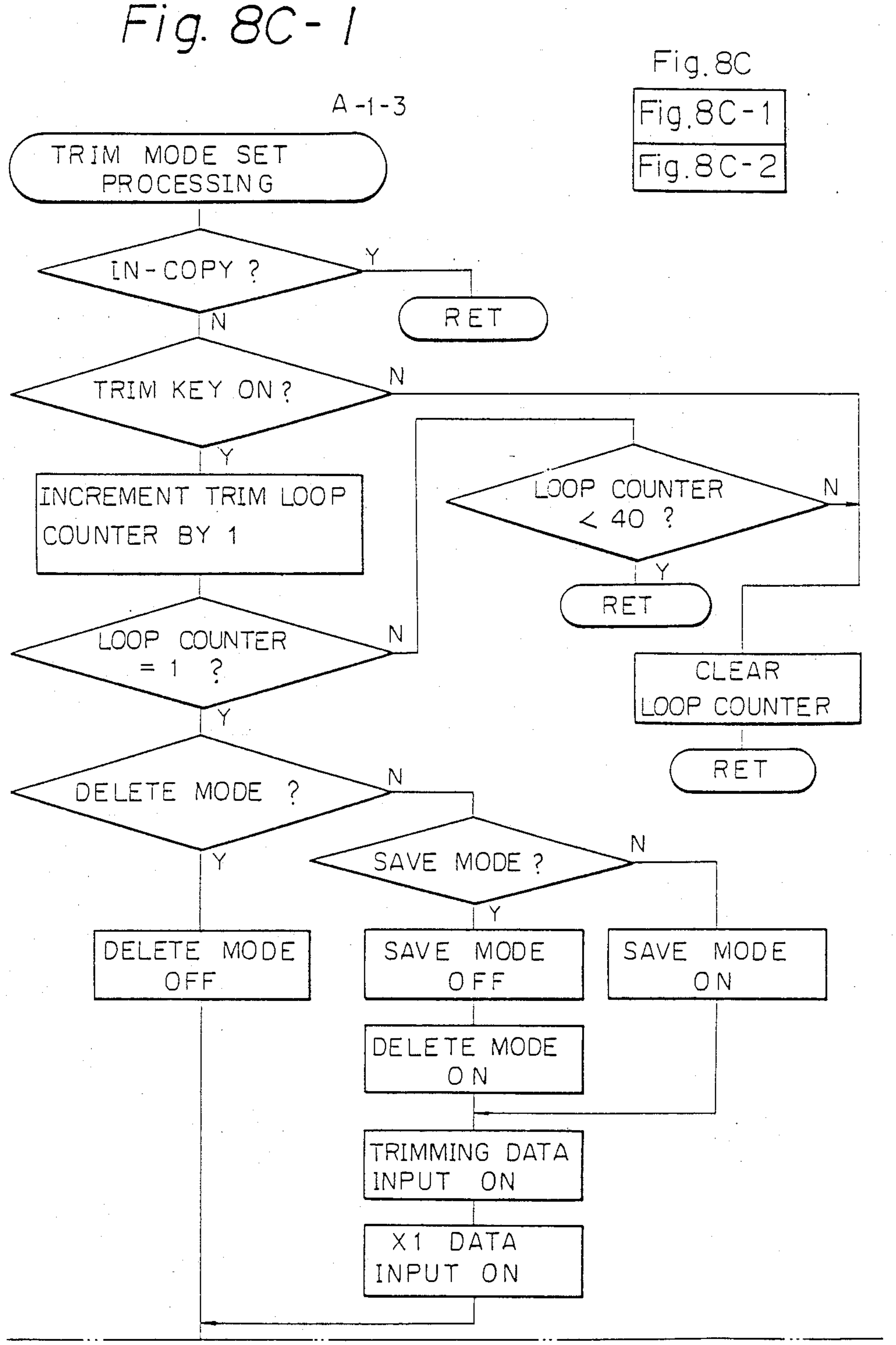
FIG. 8C is a flowchart showing trim mode set processing.
Figures 2, 8C:
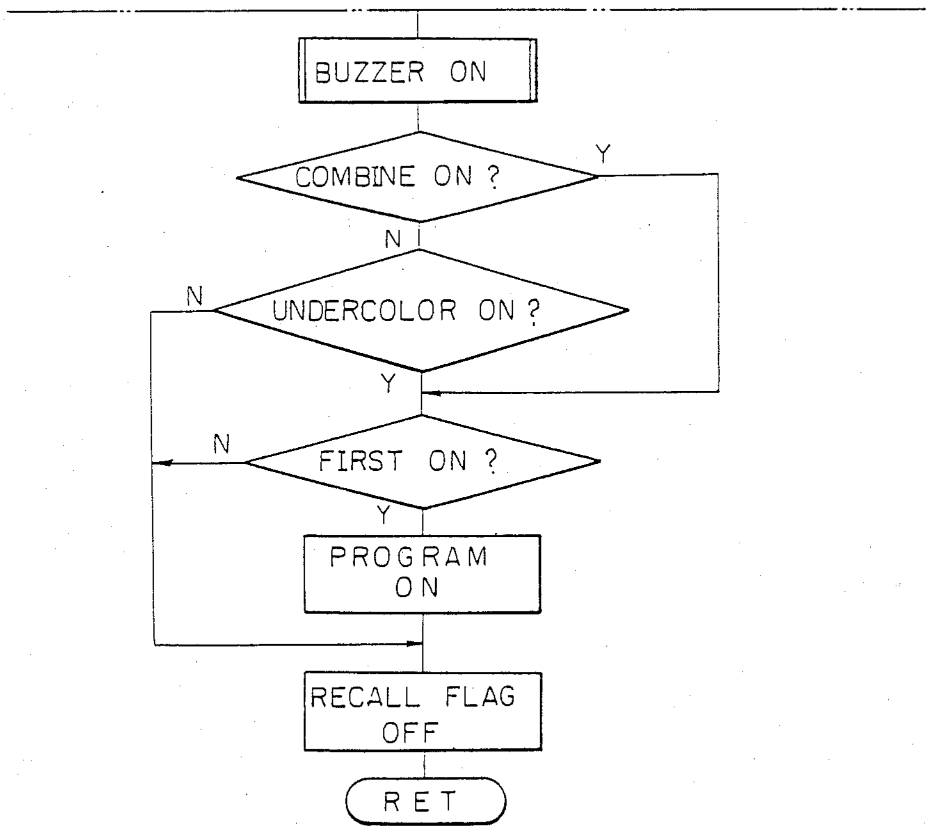
Figures 1, 8D:
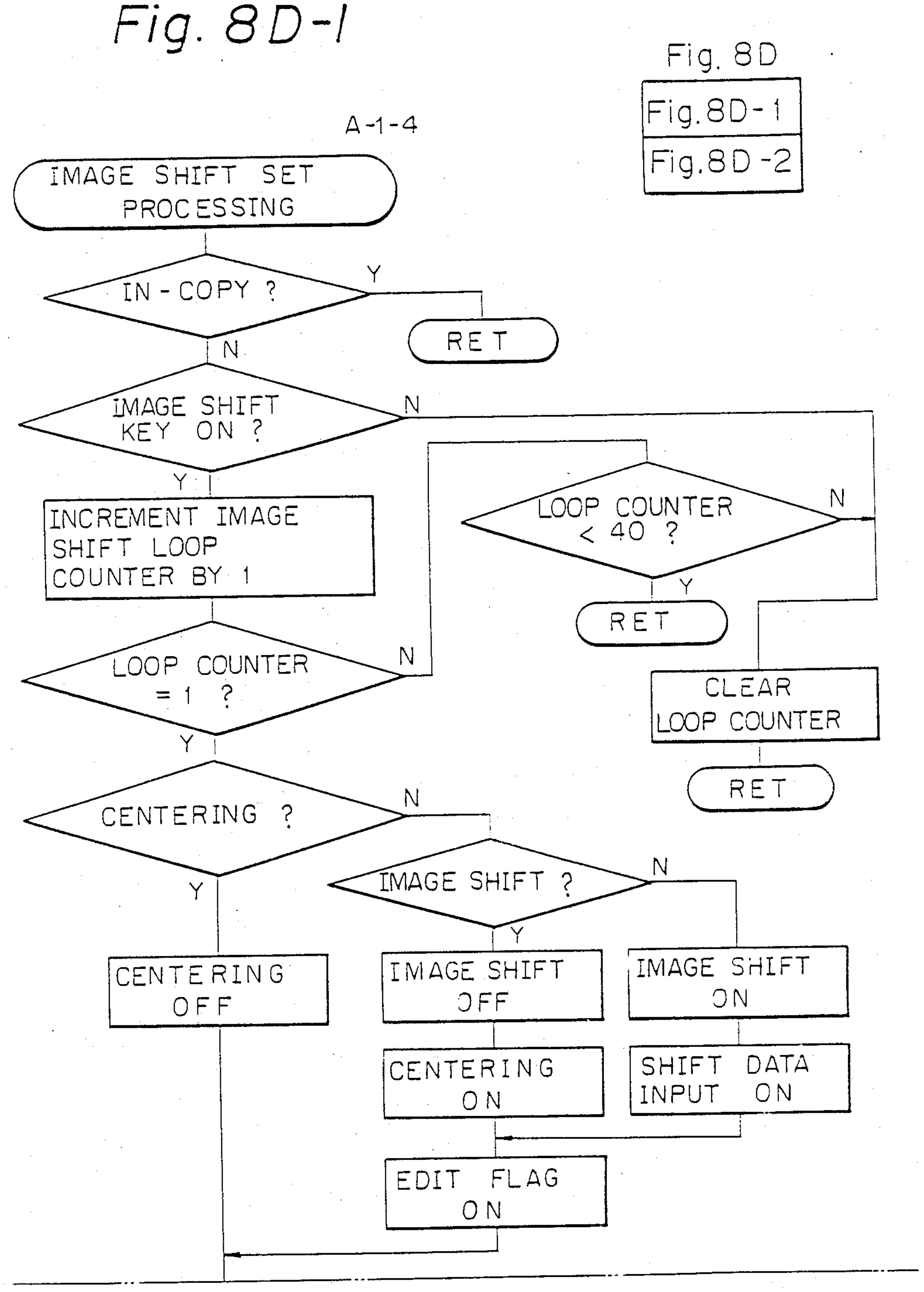
FIG. 8D is a flowchart showing image shift mode set processing.
Figures 2, 8D:
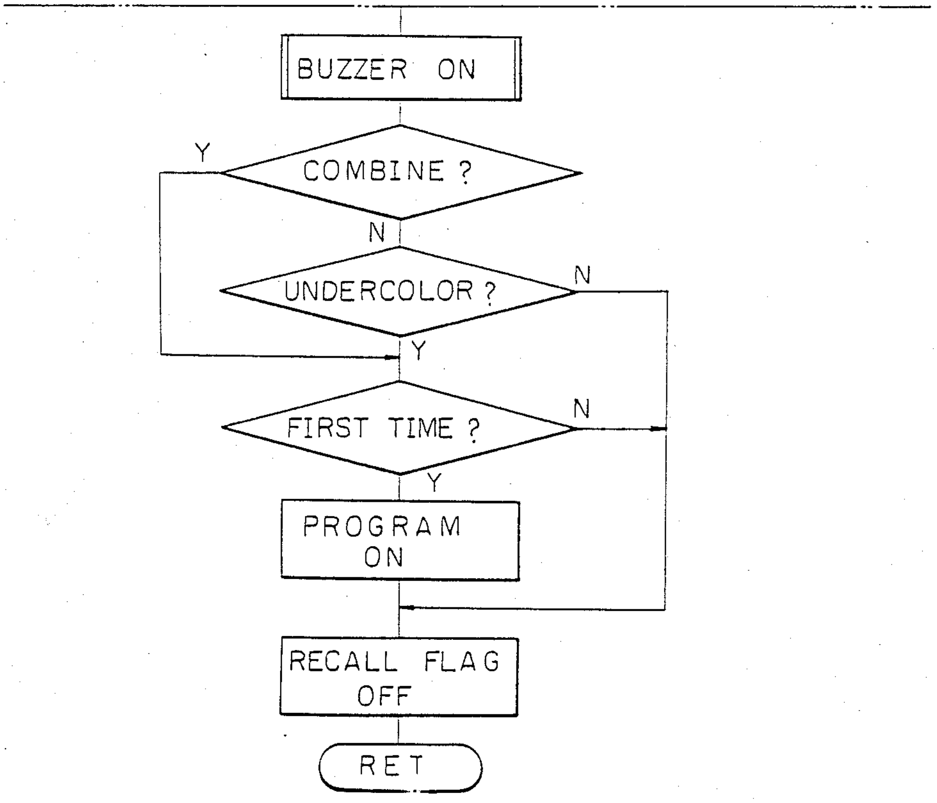
Figure 8E:
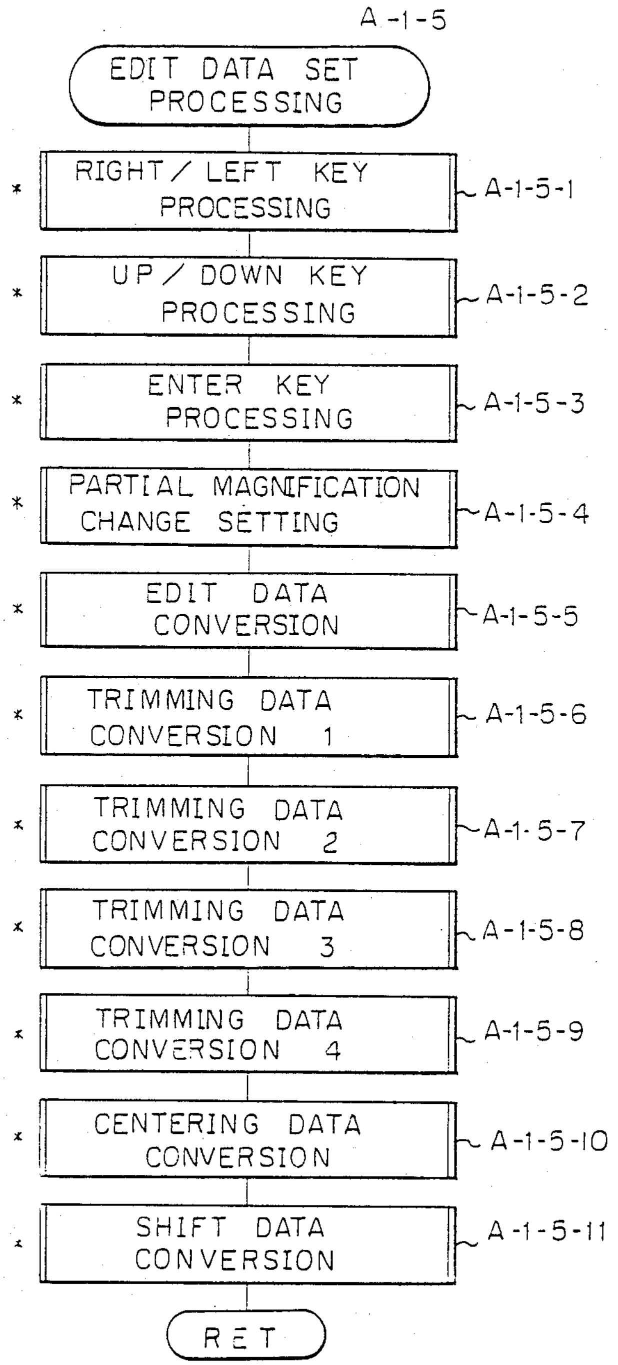
FIG. 8E and 8E' are flowcharts showing edit data set processing.
Figure 8E:
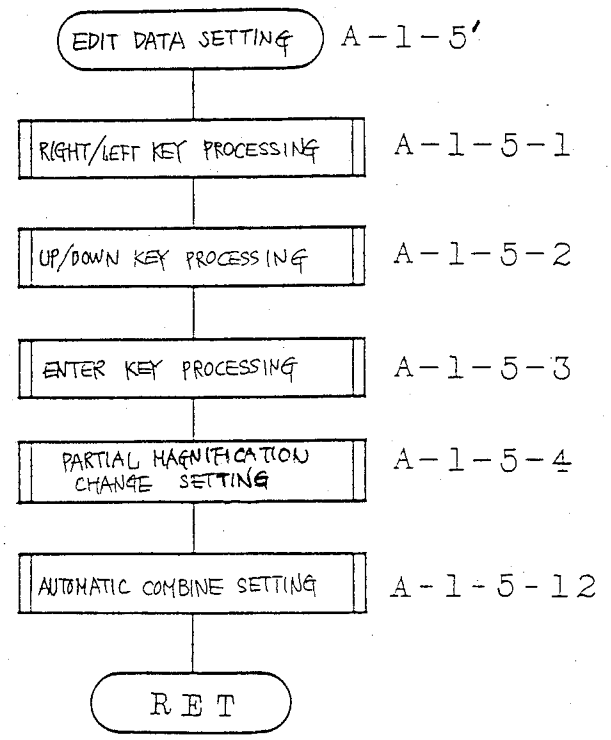
Figures 1A, 8E:
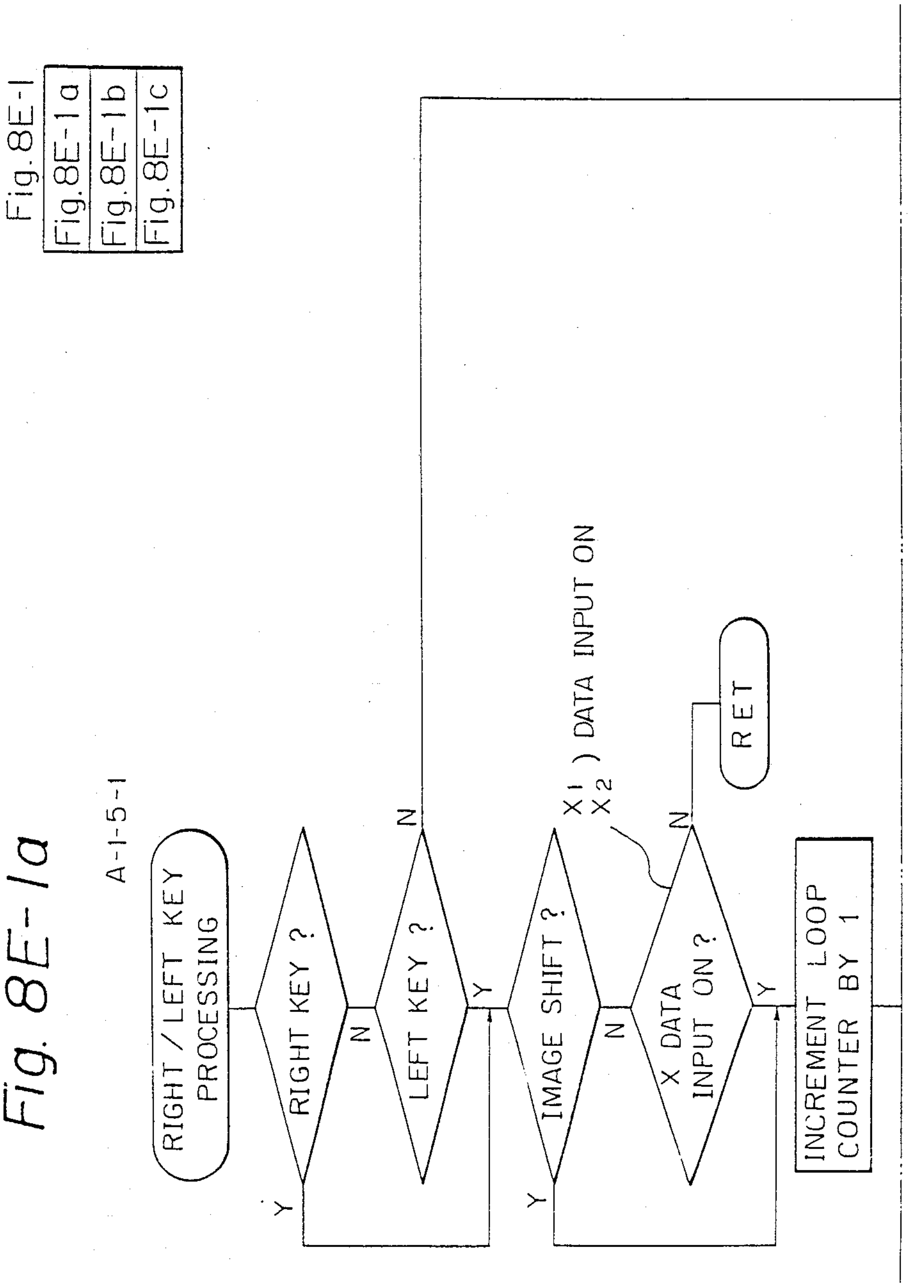
Figures 1B, 8E:
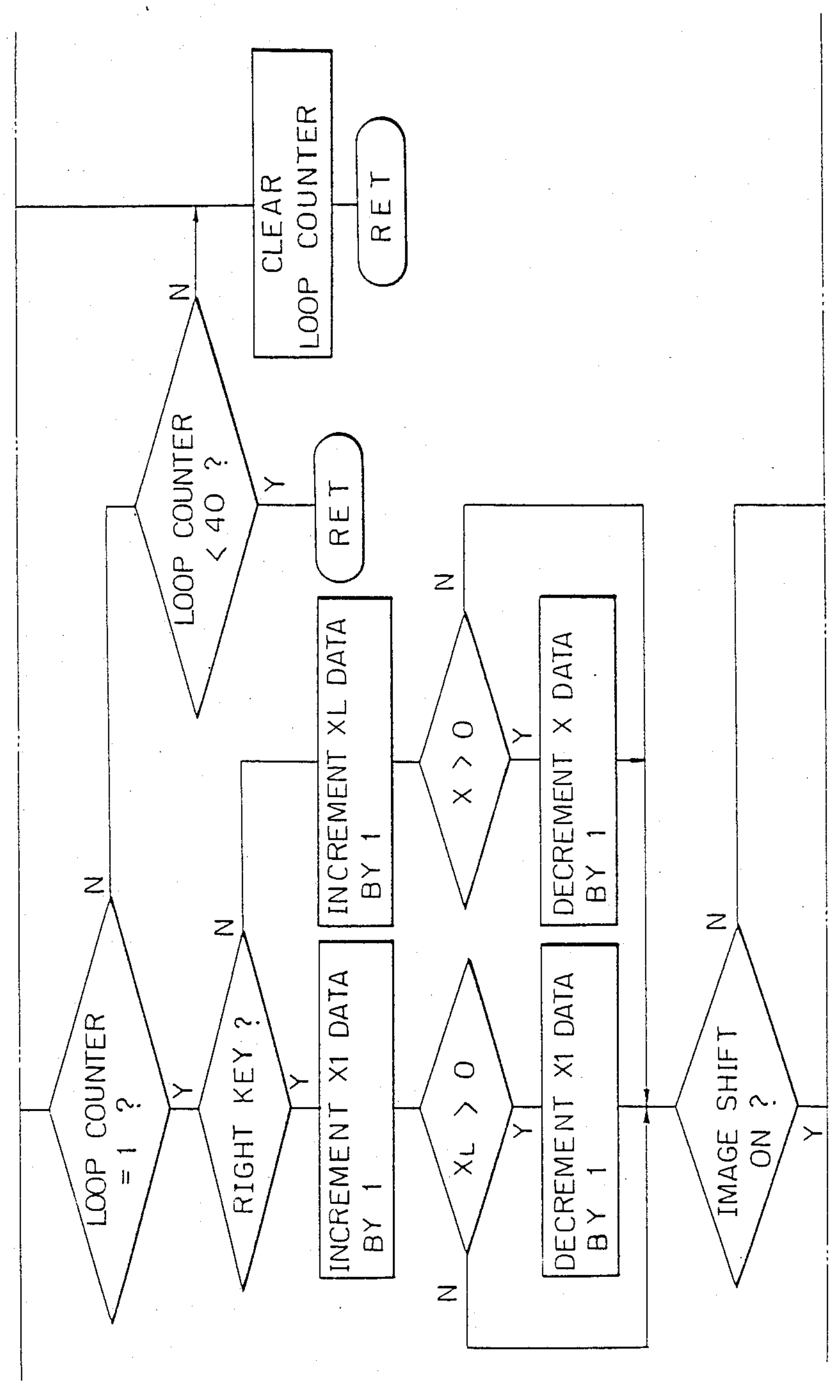
Figures 1C, 8E:
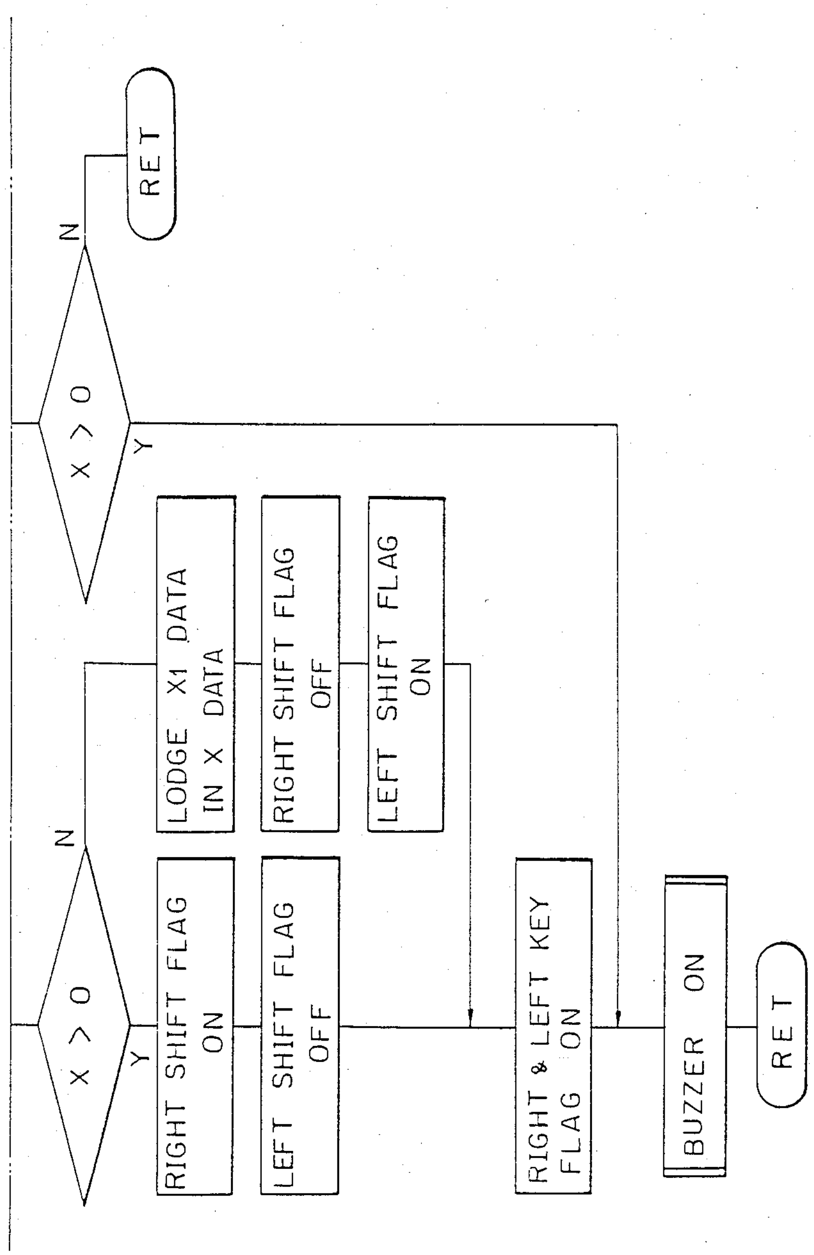
Figures 2, 2A, 8E:
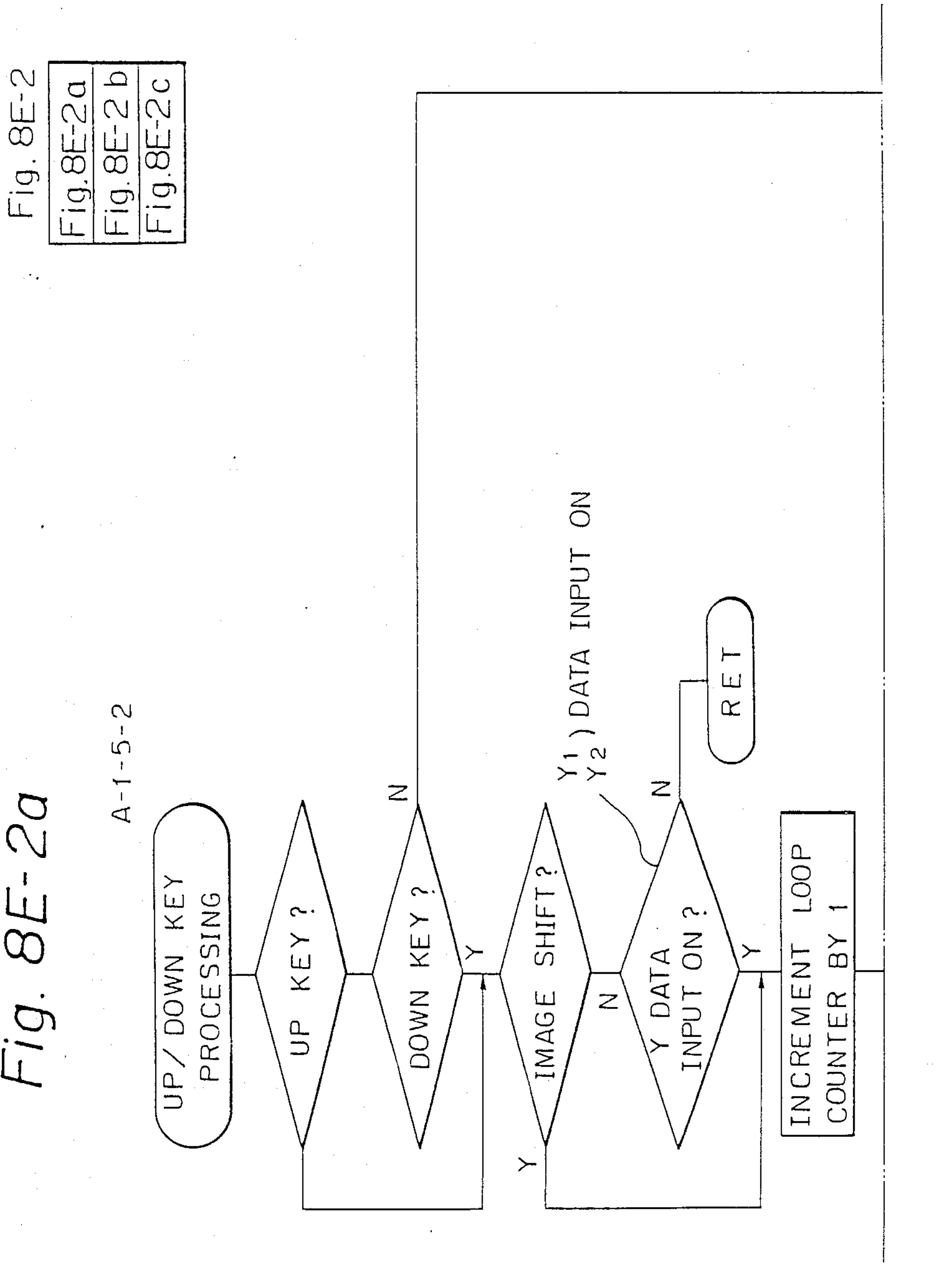
Figures 2B, 8E:
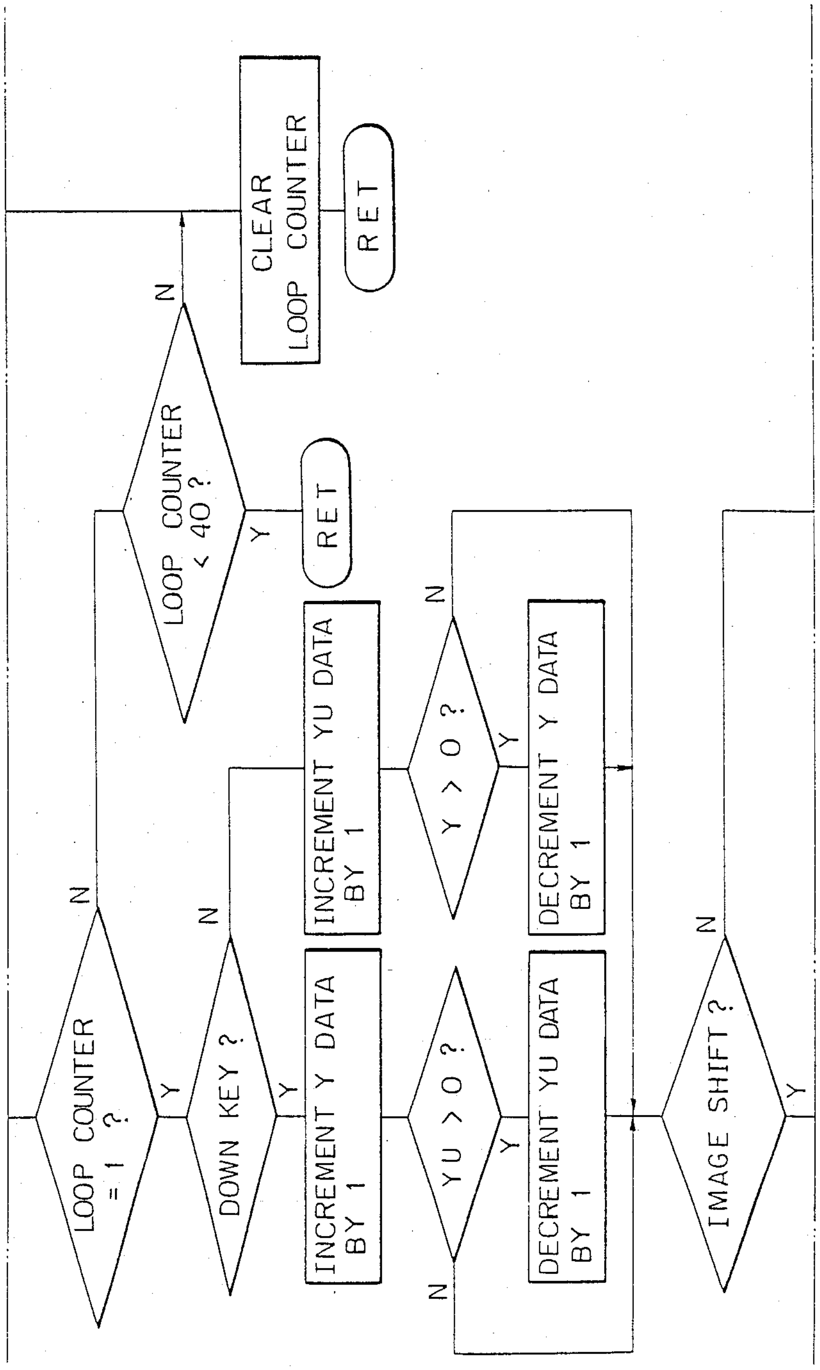
Figures 2C, 8E:
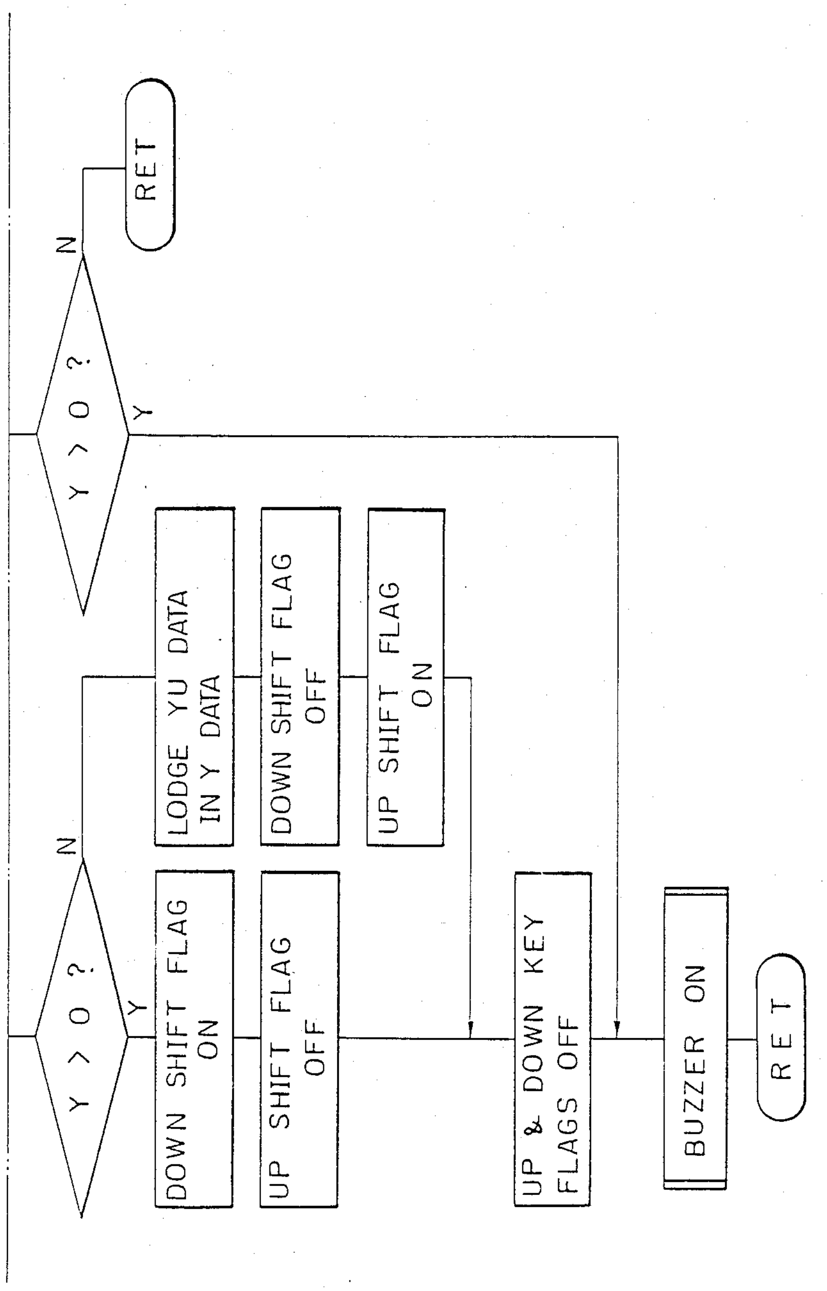
Figures 3A, 8E:
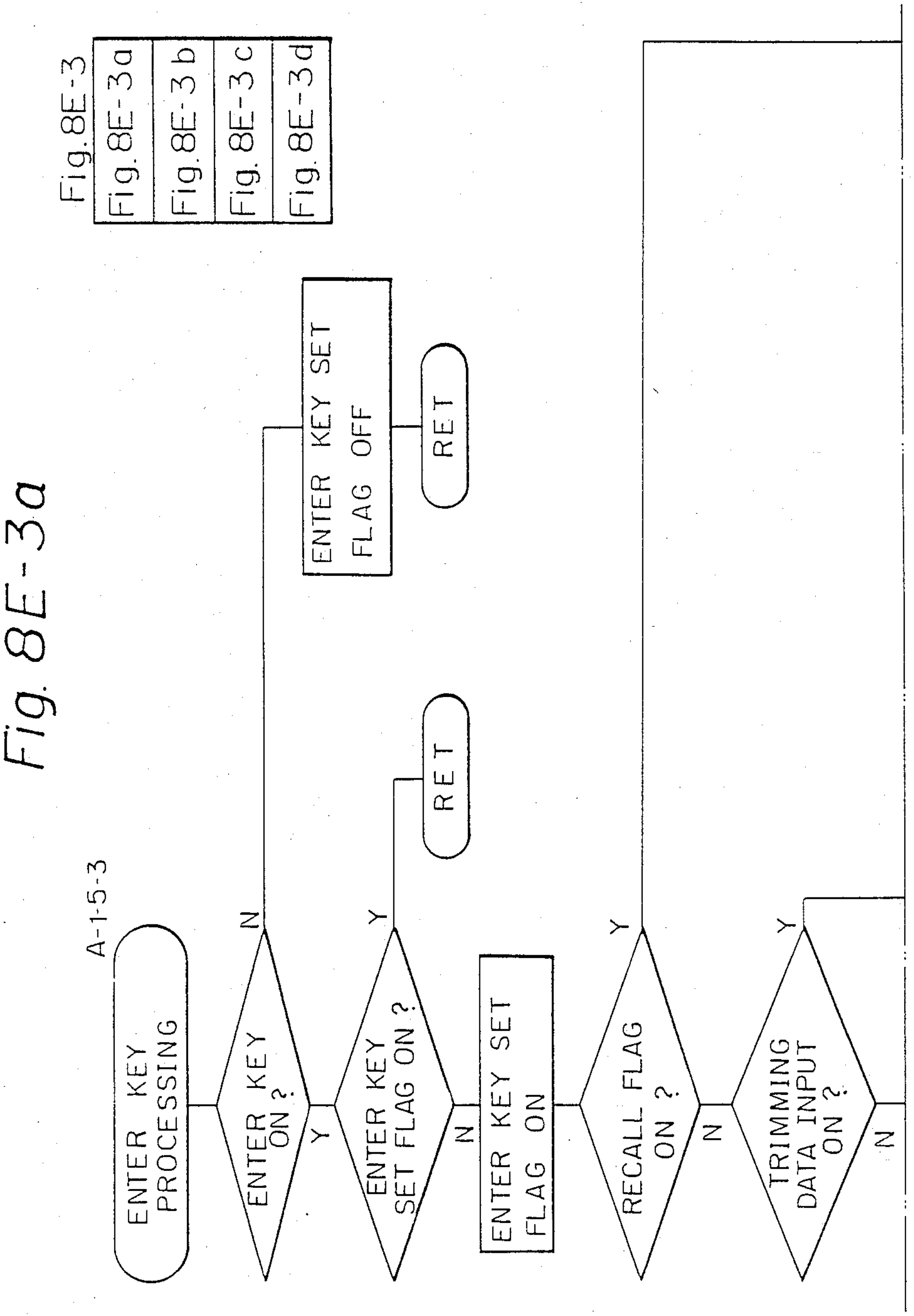
Figures 3B, 8E:
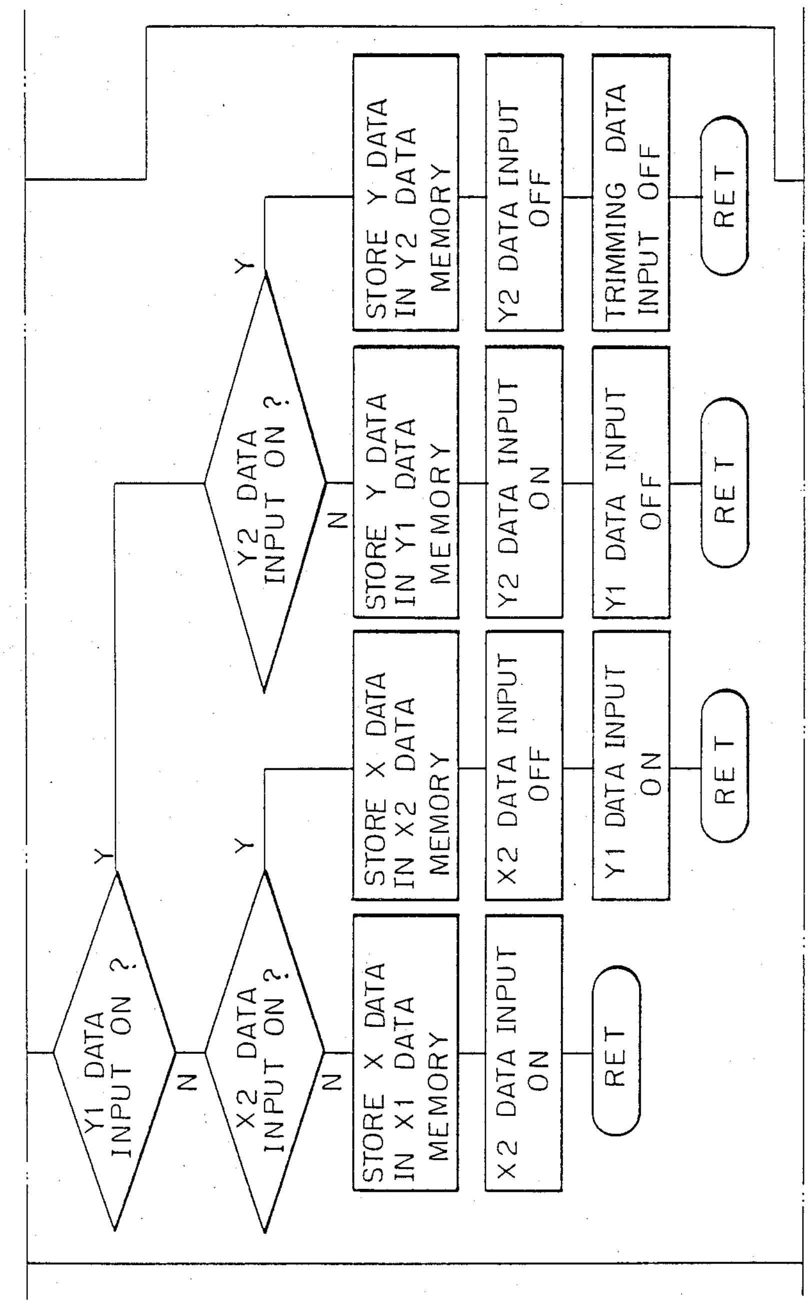
Figures 3C, 8E:
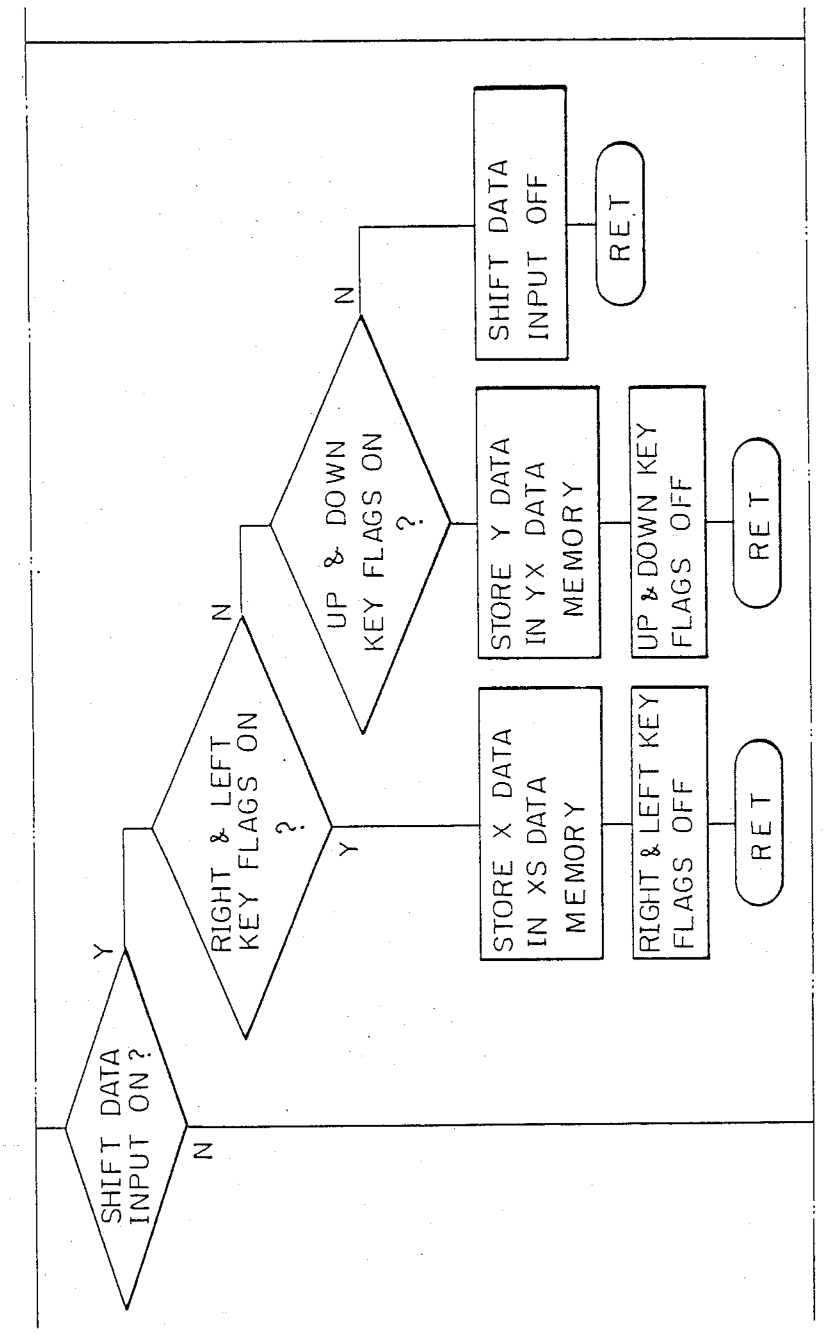
Figures 3D, 8E:
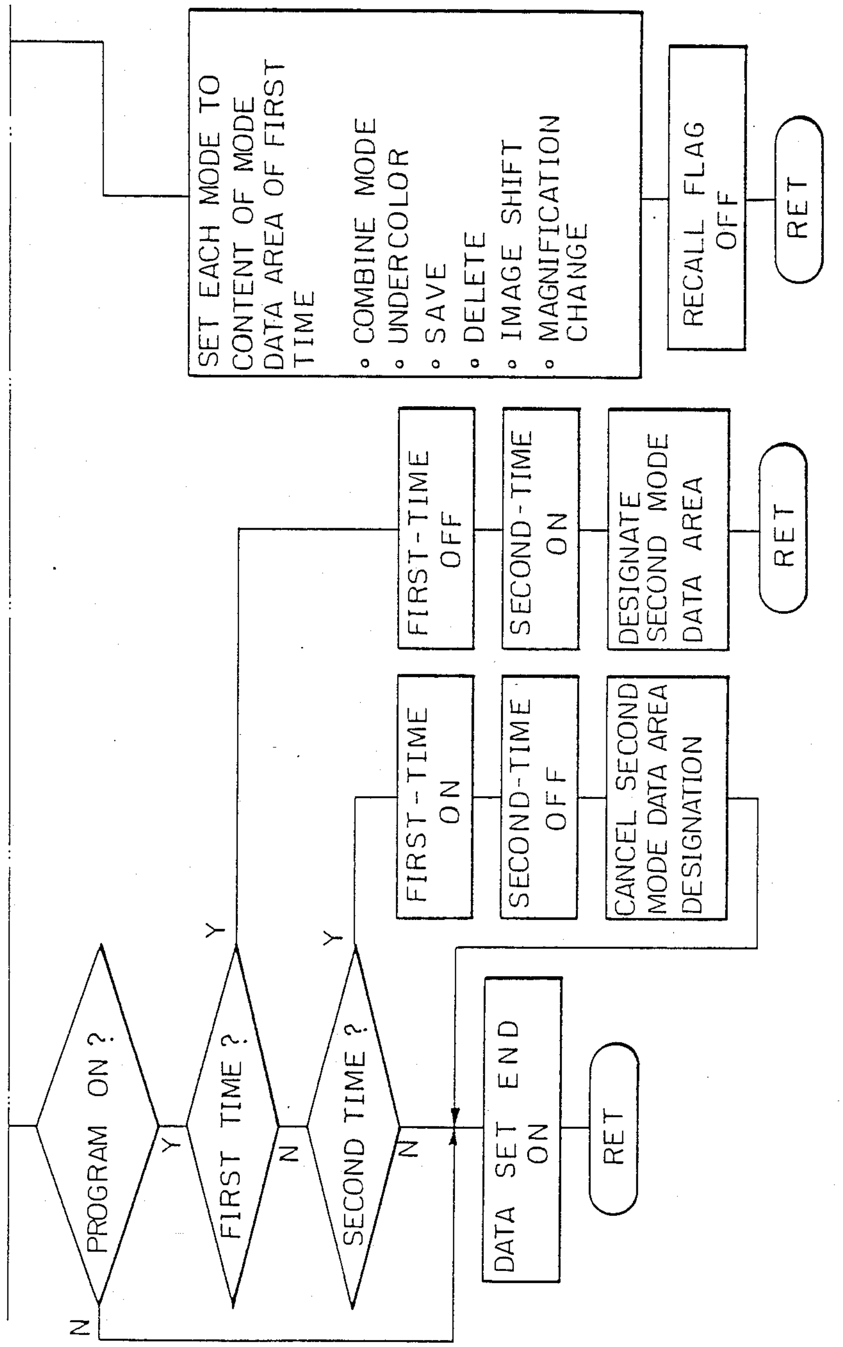
Figures 4, 8E:
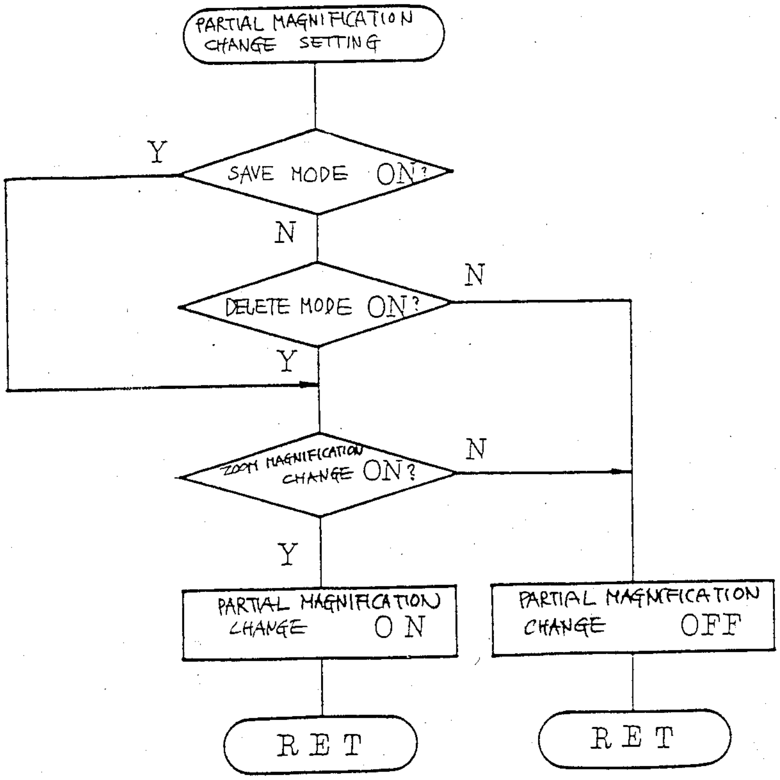
Figures 1, 4, 8E:
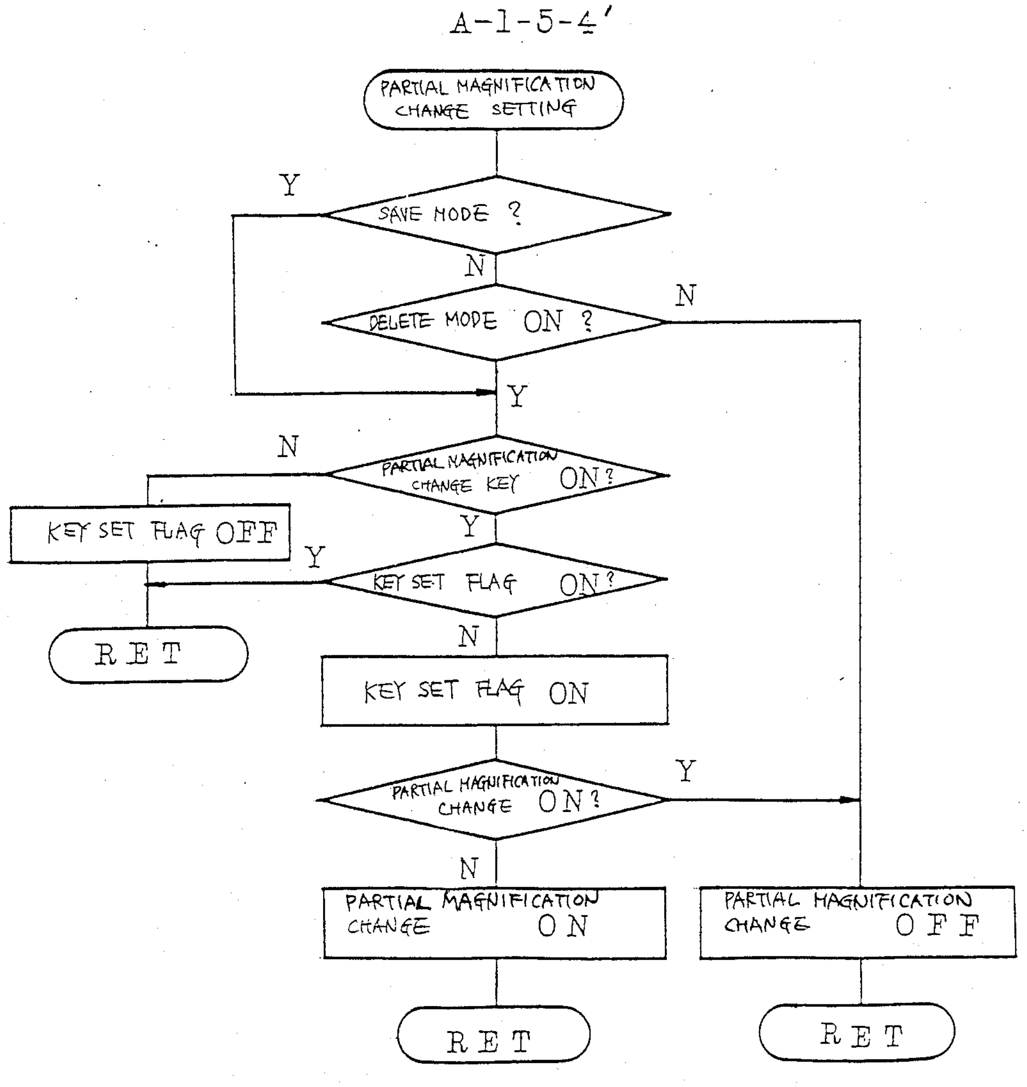
Figures 5, 8E:
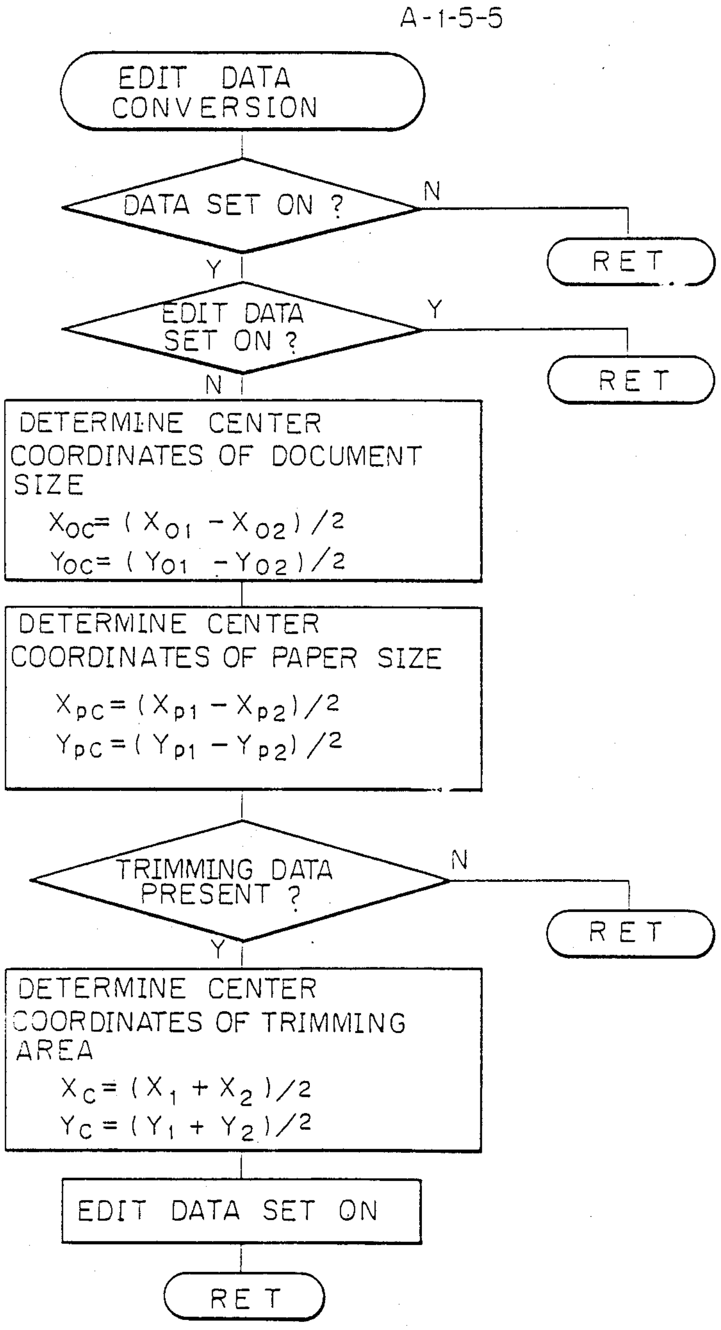
Figures 6A, 8E:
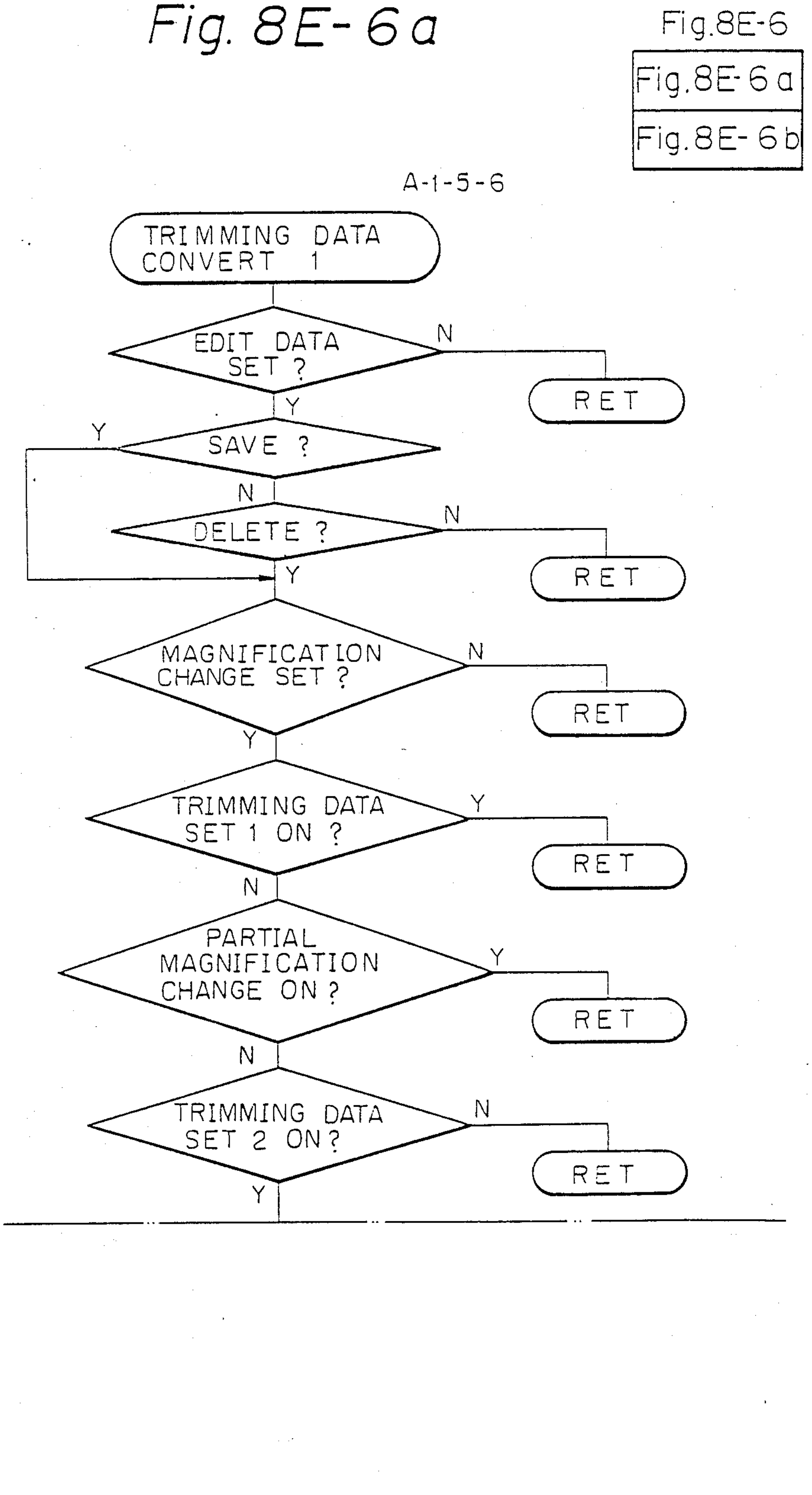
Figures 6B, 8E:
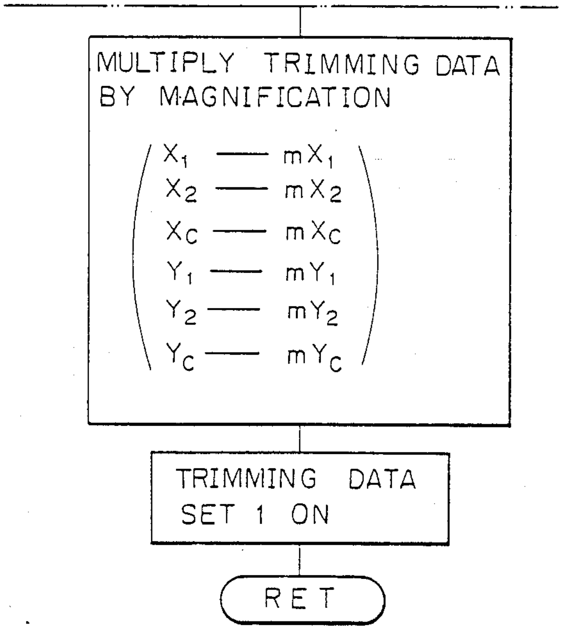
Figures 7A, 8E:
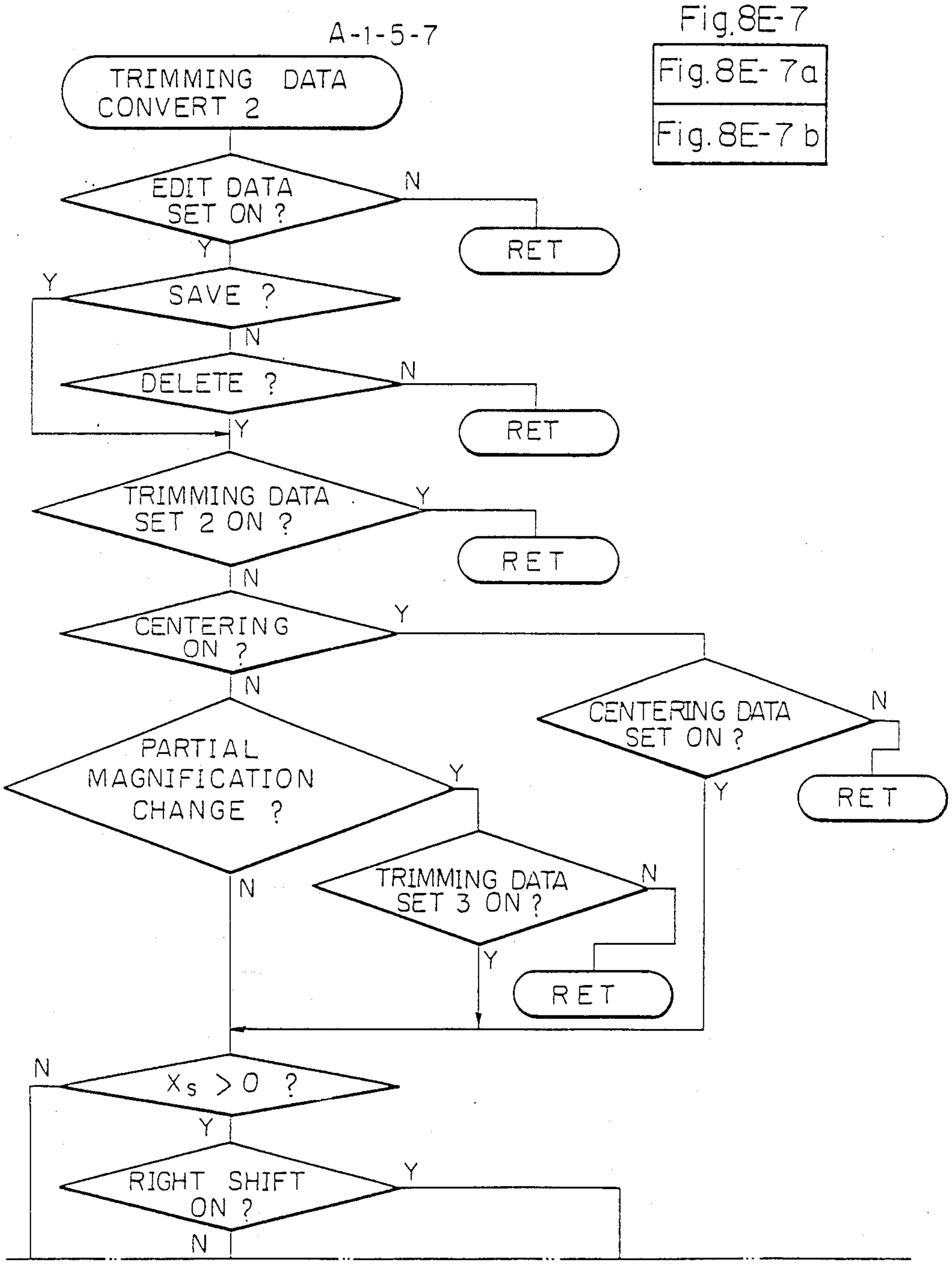
Figures 7B, 8E:
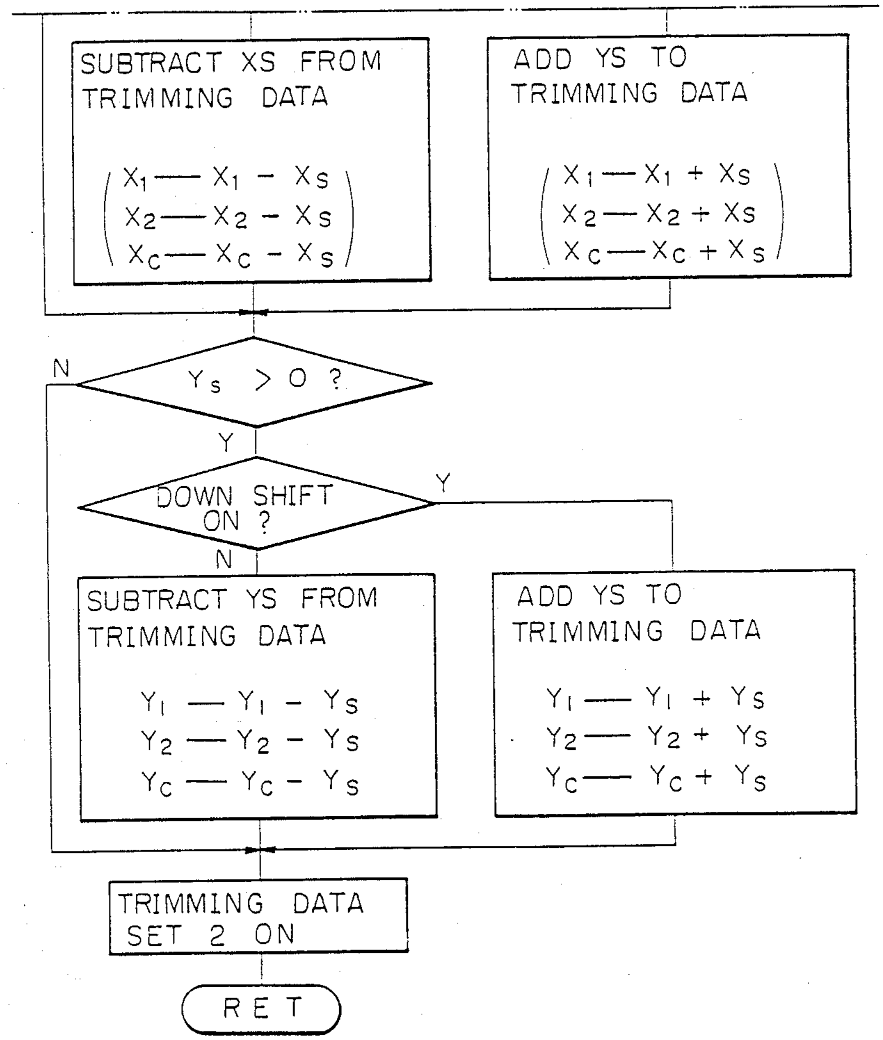
Figures 8, 8E, 9:
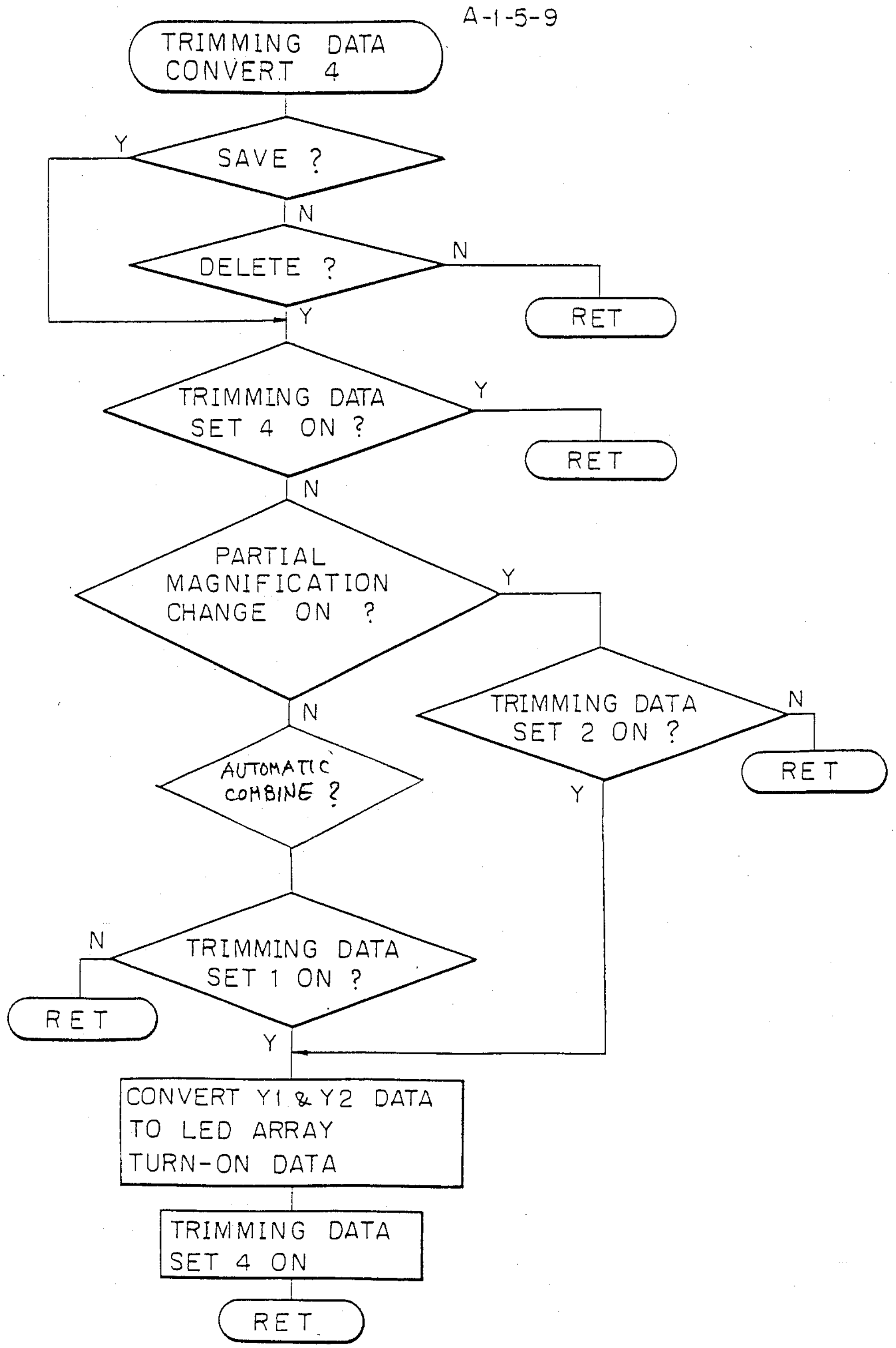

FIG. 9 shows in detail the print condition check (A-3) included in the pre-print processing (A). As shown, after whether the fixing temperature is adequate, whether the intial cleaning has been completed, whether a magnification has been changed, and whether a color has been set are decided. Then, which one of the save and delete modes has been selected is determined. Thereafter, whether trimming data has been set, whether, in the case of image shift, shift data has been set, whether, in the case of centering, center data has been set, whether the combine mode has been selected, whether the undercolor mode has been selected, whether combine mode setting has been completed, and others are decided. If all the answers are yes (Y), the program returns to the beginning displaying inhibition.

TRIM MODE

The trim mode includes a save mode an a delete mode as previously stated. By the combination of the trim mode and the combine mode, the program mode is set up. Mode Setting FIG. 8C shows details of the trim mode set processing (A-1-3) which is included in the mode set processing (A-1).

(a) By the trim mode set processing (A-1-3), either one of the save mode, delete mode, and OFF mode is set up.

(b) A mode indicator on the control panel which corresponds to the set mode is turned on.

(c) Then, the indicator X1 for urging the operator to enter data is turned on.

(d) When the trim mode is set after a particular magnification has been selected, a partial magnification change mode is set (A-1-5-4).

(e) When the trim mode is set after the combine mode or the undercolor mode has been selected, the program mode is set.

A reference will be made to FIG. 8C for describing the operation in detail. In the trim mode set (A-1-3), that the copier is out of operation is confirmed. Then, whether the trim key on the operation board is ON (i.e. turned ON when a signal is input) is decided and, if it is ON, a trim loop counter is incremented by 1. If it is not ON, the loop counter is cleared. If the count of the loop counter is greater than 2 and smaller than 40, the program returns (RET) to the beginning; if it is greater than 40, the loop counter is cleared. By the procedure described so far, the mode is sequentially changed over at predetermined intervals while the key is continuously depressed. As the loop counter is incremented to 1, whether the mode is the delete mode or the save mode is decided and, then, a corresponding mode flag is set to thereby energize a corresponding mode indicator on the operation board. When the delete mode or the save mode is ON, a flag adapted for the entry of trimming data is set to execute right/left key processing (A-1-5-1, FIG. 8E-1) and enter key processing (A-1-5-3, FIG. 8E-3). By those flags, the data input command indicator X1 is displayed. At the same time, a buzzer is energized to urge the operator to enter data.

Subsequently, whether the program mode of this embodiment is to be set is decided. Specifically, if either the combine mode or the undercolor mode is ON and this is the first ON condition ever occurred, the program mode is turned ON. If it is the second ON condition or above, a recall flag is cleared to return (RET) to the beginning because the combine mode is under way. In the program mode, the first copy mode, i.e., combination or undercolor and the second copy mode, i.e., trim mode are programed beforehand. After the last mode has been set, the first mode is set and, upon the turn-on of the print switch, the first copying operation is executed. As the first copying operation is completed, the second mode is automatically set up and, upon another turn-on of the print switch, the second copying operation is executed.

Next, the entry of data in the trim mode will be explained.

(a) A document size to be trimmed is entered.

(b) A trimming area is specified by entering the distances from the reference point to the four corners of the trimming area by means of the direction keys.

(c) First, X1 data is entered by the R (right) key (see A-1-5-1, FIG. 8E-1).

(d) After the entry of X1 data, an enter key is depressed to store it in an X1 data memory while, at the same time, X2 data input flag for the entry of X2 data is set (see A-1-5-3, FIG. 8E-3).

(e) X2 data is entered and, by the manipulation of the enter key, stored in an X2 data memory.

(f) In the same manner, Y1 and Y2 data are entered one after another.

(g) After the entry of all of the trimming data, if none of the shift mode, program mode and others has been set, the enter key is depressed again to set a data set end flag to thereby finish data entry.

FIG. 8E shows the edit data set (A-1-5) which is included in the mode set processing of this embodiment. In the edit data set processing, there are sequentially performed R/L key processing (A-1-5-1), U/D key processing (A-1-5-2), enter key processing (A-1-5-3), partial magnification change processing (A-1-5-4), edit data convert (A-1-5-5), trimming data convert 1 (A-1-5-6), trimming data convert 2 (A-1-5-7), trimming data convert 3 (A-1-5-8), trimming data convert 4 (A-1-5-9), centering data convert (A-1-5-10), shift data convert (A-1-5-11), and automatic combine set (A-1-5-12). Then, the program returns (RET) to the beginning.

FIG. 8E-1 shows the R/L key processing (A-1-5-1) mentioned above. When the R (right) or the L (left) key is depressed, X1 data or X2 data entry is made ON. In the case of the image shift mode, entry of X1 and X2 data is not performed at this stage and is performed later by increasing or decreasing through the R or L key. When data is entered, a loop counter is incremented by 1 and, when the R and L keys are not operated, the loop counter is cleared. Specifically, while any of the R and L keys is continuously depressed, it takes 10 milliseconds for the loop counter to be incremented by 1. Hence, the loop counter is incremented forty consecutive times which corresponds to 0.4 second and, when incremented more than forty times, it is cleared. The increment of the loop counter by 1 causes a shift of 2 millimeters on the coordinates. The R key is adapted to increase the data, and the L key to decrease it (i.e. the loop counter is incremented in the leftward direction XL). When the R key is depressed while the initial position is at the left ($XL>0$), the XL data is decremented by 1. However, when the L key is depressed while the initial position is at the right ($X>0$), the X data is incremented by 1. Since the image shift may be effected to the left, a direction flag is provided to facilitate discrimination of data. Specifically, the mode is the trim mode if it is not the image shift mode and, in this condition, the keys are invalidated (the buzzer is not energized) because no data is present on the left-hand side with respect to the reference. In the case of image shift, when X is greater than zero, a right shift flag is set an a left shift flag is cleared and, when X is smaller than zero, LX data is included in the X data with the right shift flag cleared and the left shift flag is set. Then the right and left key flags are set to energized the buzzer. In response to these shift flags, the direction indicators on the operation board are selectively turned on.

FIG. 8E-2 shows the U/D key processing (A-1-5-2) which is included in the edit data set processing. First, a loop counter is cleared while the processing associated with the U (up) key or the D (down) key is not performed. The loop counter is incremented by 1 if the trim mode as distinguished from the image shift mode is set even when the U key or the D key processing is performed, and if Y1 and Y2 data are ON. Specifically, while any of the U and U keys is continuously depressed, it takes 10 milliseconds for the loop counter to be incremented by 1 once. Hence, the increment by 1 is repeated forty times, i.e., 0.4 second; as it is repeated more than forty times, the loop counter is cleared. Every time the loop counter is incremented by 1, a shift of 2 millimeters occurs on the coordinates. The D key increments data while the U key decrements it (i.e. the data is incremented by 1 in the upward direction YU). When the D key is depressed while the initial position is on the upper side ($YU>0$), the YU data is decremented by 1; when the D key is depressed while the initial position is on the lower side ($Y>0$), the Y data is decremented by 1. Since the image shift may be effected upward, a direction flag is provided for the discrimination of data. An up shift flag and a down shift flag cause their associated direction indicators on the operation board to glow. In the case of trimming, the U and D keys are invalidated (the buzzer is not energized) because no data is present above the reference.

FIG. 8E-3 demonstrates the enter key processing (A-1-5-3) included in the edit data processing. As the enter key is depressed, an enter key set flag is set, and whether a recall flag is set is decided (the recall flag is set when a reset mode switch is turned ON in a copy end routine (D-4)). If the recall flag is set, each mode is set to the content stored in the mode data area for the first time (combine, undercolor, save, delete, image shift, and magnification change) and, then, the recall flag is cleared. If the recall flag is not set and trimming data input is OFF, X1, X2, Y1 and Y2 data are sequentially entered and, subsequently, the input flag and the trimming data input flag are cleared. Further, if shift data input is ON, X data and Y data are stored in, respectively, an XS data memory and a YS data memory depending upon whether the right, left, up and down key flags are set, followed by making shift data input OFF. If the program mode is ON, first time is is turned OFF if it is ON while, at the same time, second time is turned ON to specify the second mode data area. If second time is ON, first time is made ON and the second time OFF, thereby cancelling the second mode data area designation. Thereupon, a data set end flag is set.

Details of the data convert processing will be described hereinafter. Data conversion is adapted to prepare LED array control data on the basis of input data.

Data Conversion (a) Each center coordinate of a document trimming area is determined based on a document size, a paper size, and trimming area data (A-1-5-5).

(b) If there is any image shift, the trimming data is increased or decreased by the amount of shift (A-1-5-7).

(c) If the image shift is combined with a magnification change, data produced by the above step (b) is multiplied by a magnification.

(d) The data produced by such conversion is used to produce data for controlling the turn-on of the LED array (A-1-5-9).

FIG. 8E-5 demonstrates the edit data convert processing (A-1-5-5) stated above. When data set is ON, if edit data is not set, the center coordinates of a document size is determined and, then, that of a paper size. Then, if trimming data is present, the coordinates of a timming area is determined and, then, edit data set is made ON.

FIGS. 8E-6, 8E-7 and 8E-9 demonstrate, respectively, the trimming data convert processings 1, 2 and 4.

In the trimming data convert 1 (A-1-5-6) of FIG. 8E-6, if edit data set is ON and if one of the save mode and delete mode is selected, that magnification change set is ON, that trimming data set 1 is OFF, and that partial magnification change is OFF are confirmed. Then, the trimming data set 1 is made ON after, if trimming data set 2 is ON, multiplying trimming data by the magnification.

In the trimming data convert 2 of FIG. 8E-7, if edit data set is ON and if the save mode or the delete mode is selected, that trimming data set 2 is OFF, that centering is OFF, and that partial magnification change is OFF are confirmed. Then, centering data set and trimming data set are made ON. If XS is greater than zero, XS is added to the trimming data if right shift is ON and subtracted from the same if left shift is ON. Next, when YS is greater than zero, TS is added to the trimming data if down shift is ON and subtracted from the same if up shift is ON. Subsequently, the trimming data set 2 is made ON.

In the trimming data convert 4 (A-1-5-9) of FIG. 8E-9, if either the save mode or the delete mode is set, trimming data set 4 is not ON, partial magnification change is not ON, and trimming data set 2 is ON, Y1 and Y2 data are converted into LED array turn-on data. Subsequently, trimming data set 4 is made ON.

The copying operation will be explained in detail hereinafter.

Copying Operation (a) Among the trimming area data, the X-direction data is adapted to determine the turn-on timing of the LED array and delivered to an optical system (together with optics start signal, size data, and other data).

(b) The optical system converts the X-direction data into position data as measured from the starting point of a scanner. The position data is transmitted to the body as a trimming signal when the scanner is brought to a corresponding position.

(c) In response to the trimming signal, LEDs corresponding to Xn are turned ON to delete or save an image area on the drum (C-2-2).

Figures 8, 8E, 9, 10, 10A:
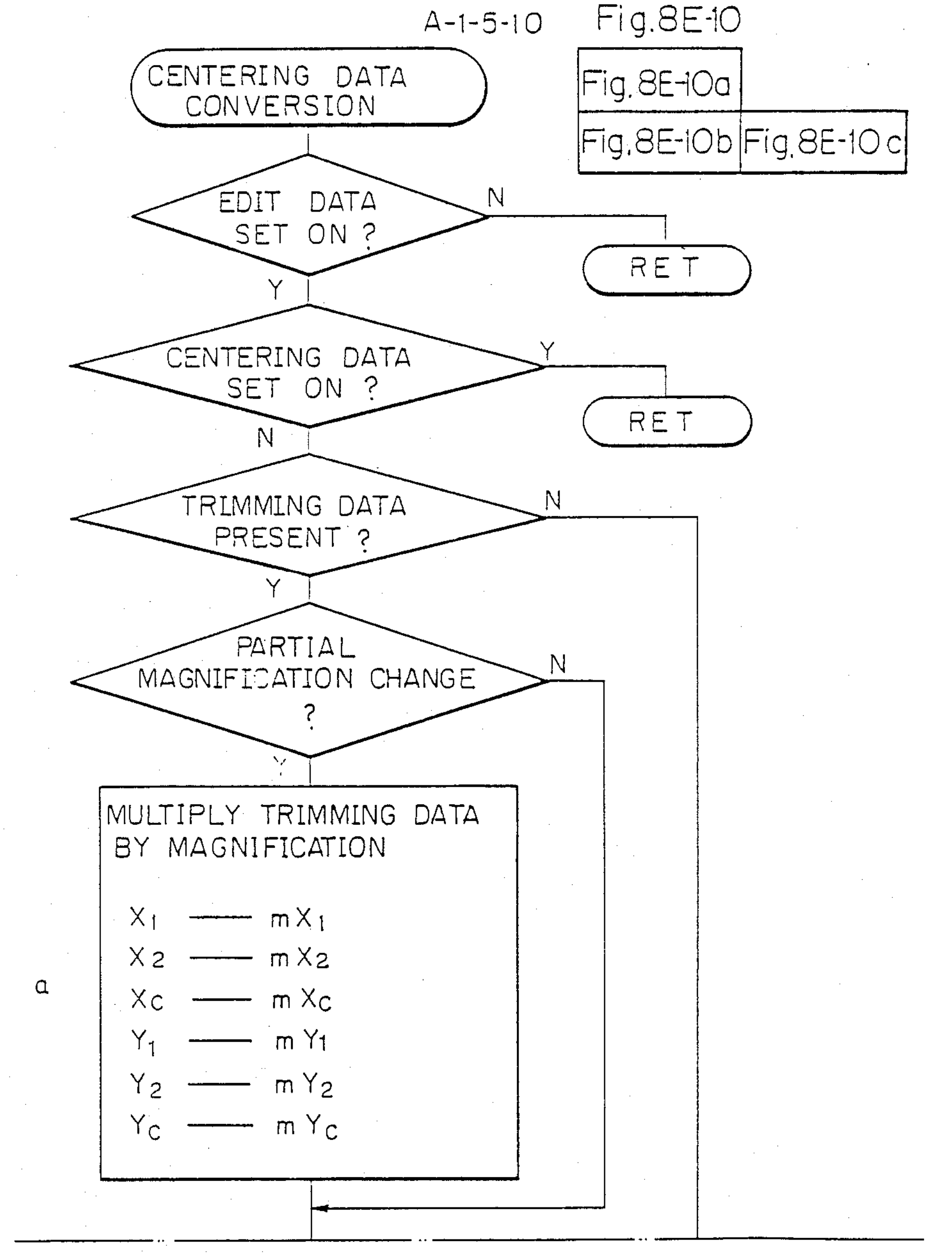
Figures 8, 8E, 9, 10, 10B:
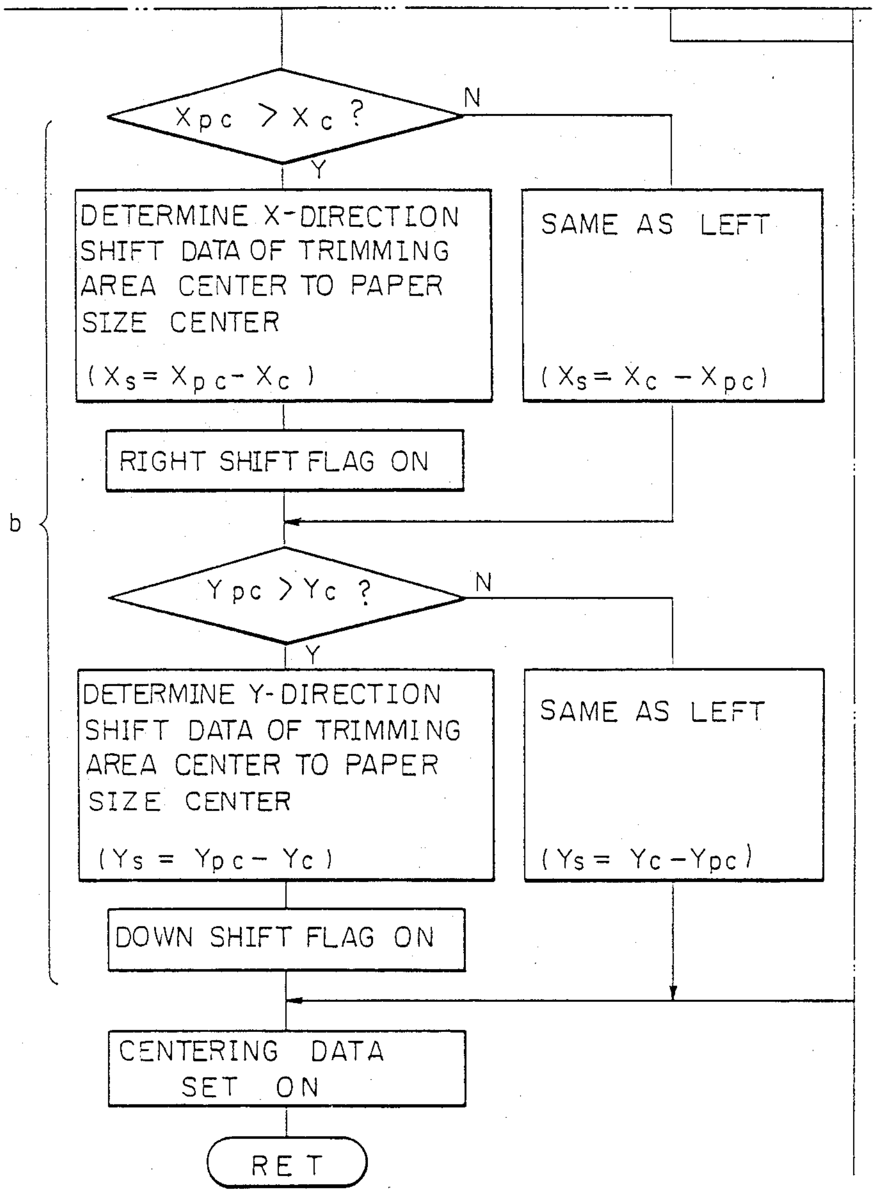
Figures 8, 8E, 9, 10, 10C:
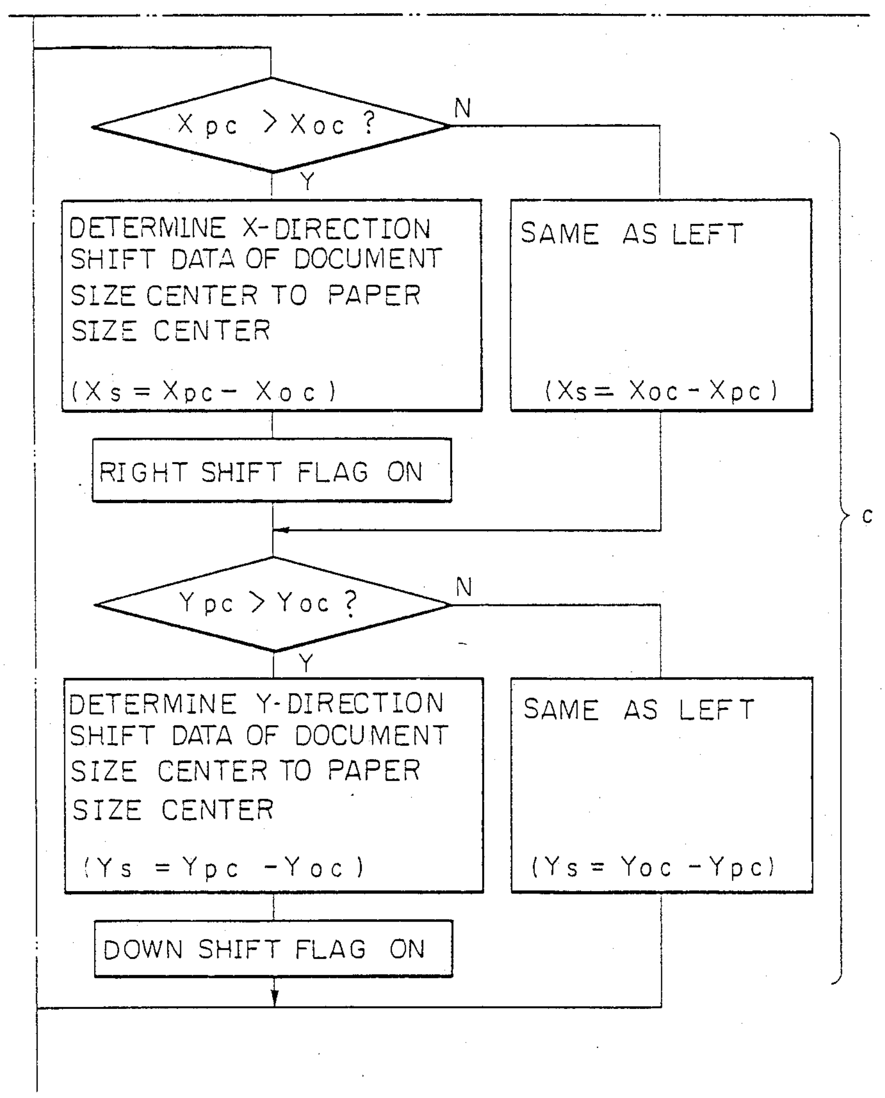
Figures 8, 8E, 9, 10, 11:
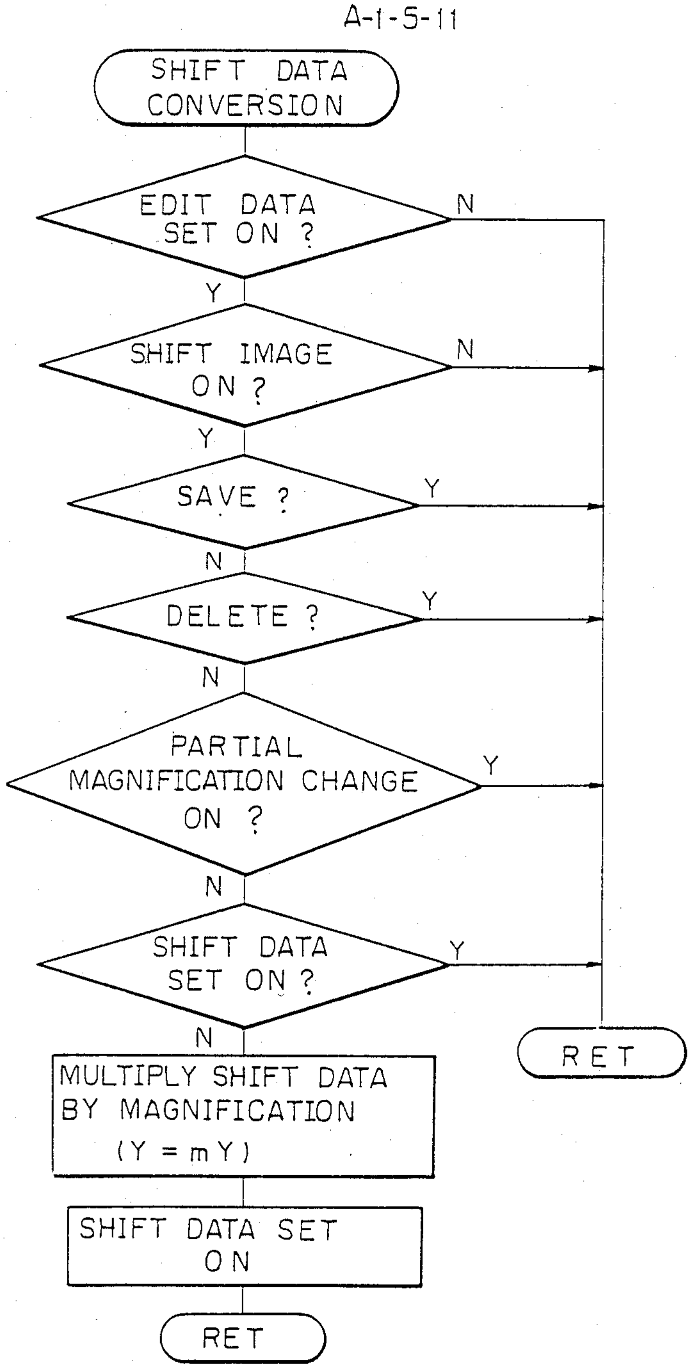
Figures 8, 8E, 9, 10, 11, 12:
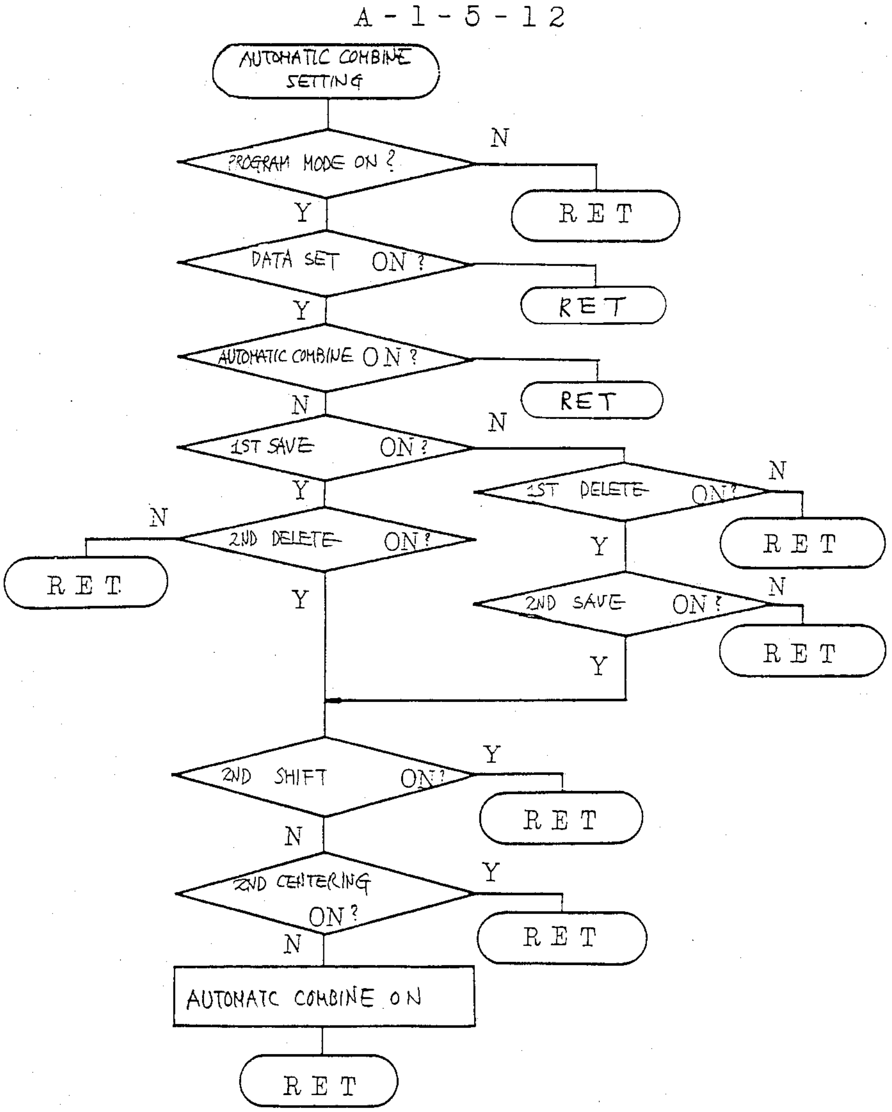
Figures 8, 8E, 9, 10, 11, 12, 13:
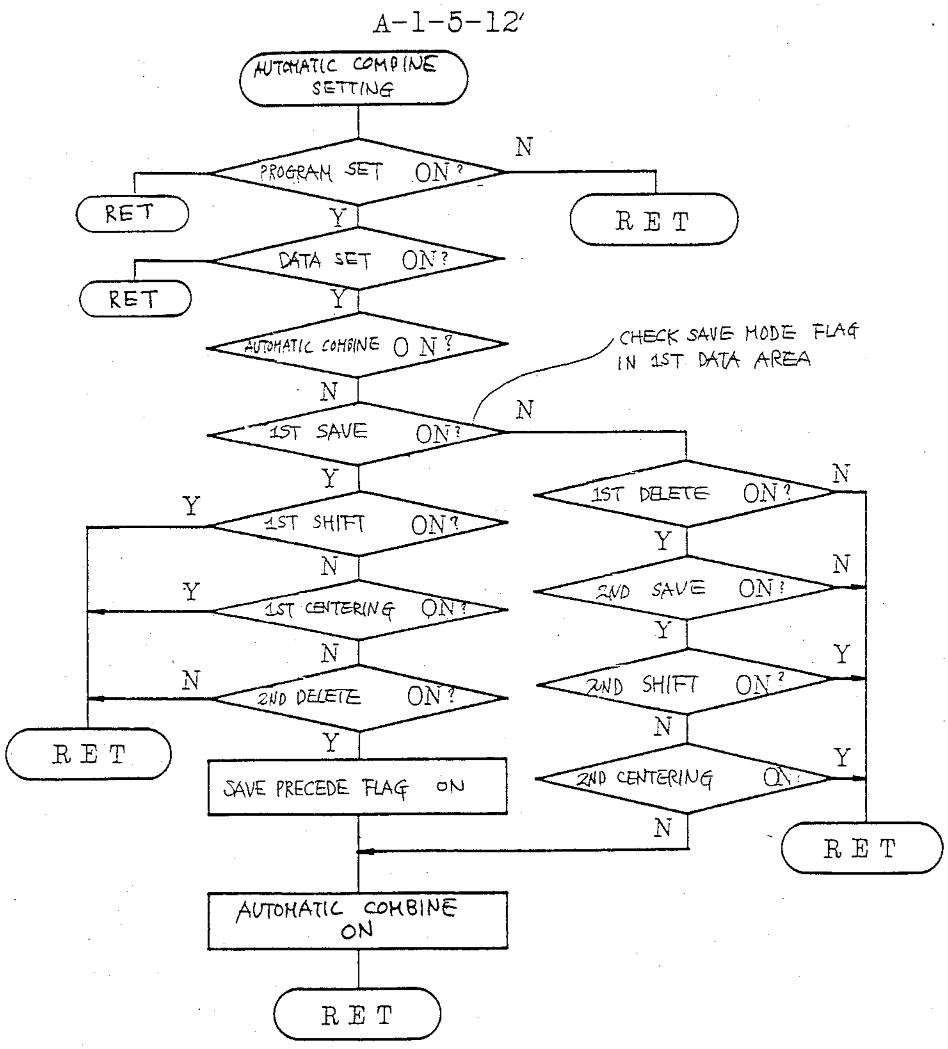

FIGS. 10 and 13 demonstrate, respectively, the pre-copy processing and the copy processing. In the pre-copy processing (B), after the print ON initialization, input/output processing and failure checking are executed and, if no failure is found, the pre-copy processing is performed. If any failure is found, the program is transferred to a failure processing routine.

In the copy processing (C) of FIG. 13, the initialization is followed by input/output processing and failure checking. If no failure exists, repeat processing repeat timing check are executed. If the repeat timing has been reached, repeat and check is performed. When the end of repetition is confirmed, the operation is transferred to a copy end processing routine.

Figure 15:
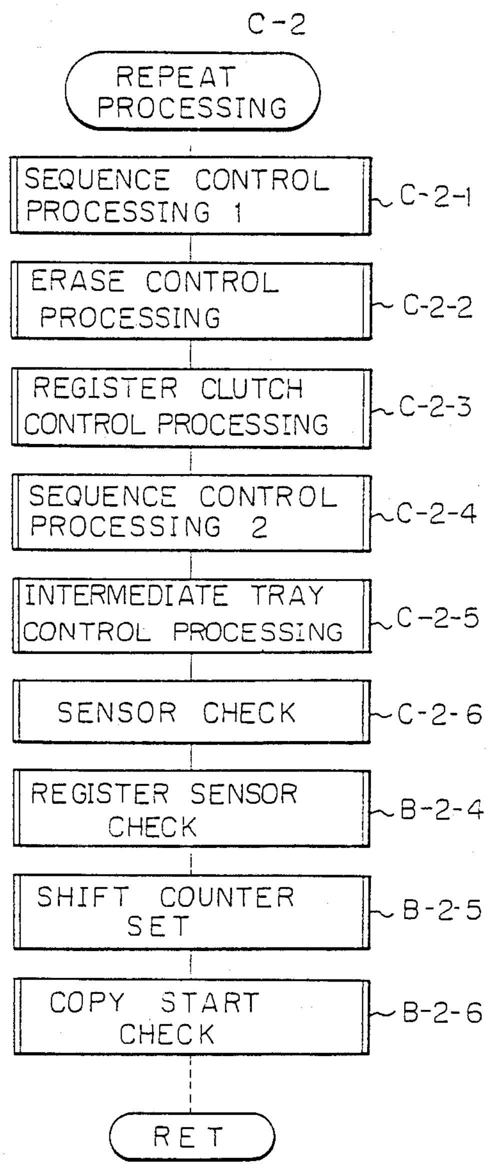
FIG. 15 is a flowchart showing repeat processing.
Figure 15A:
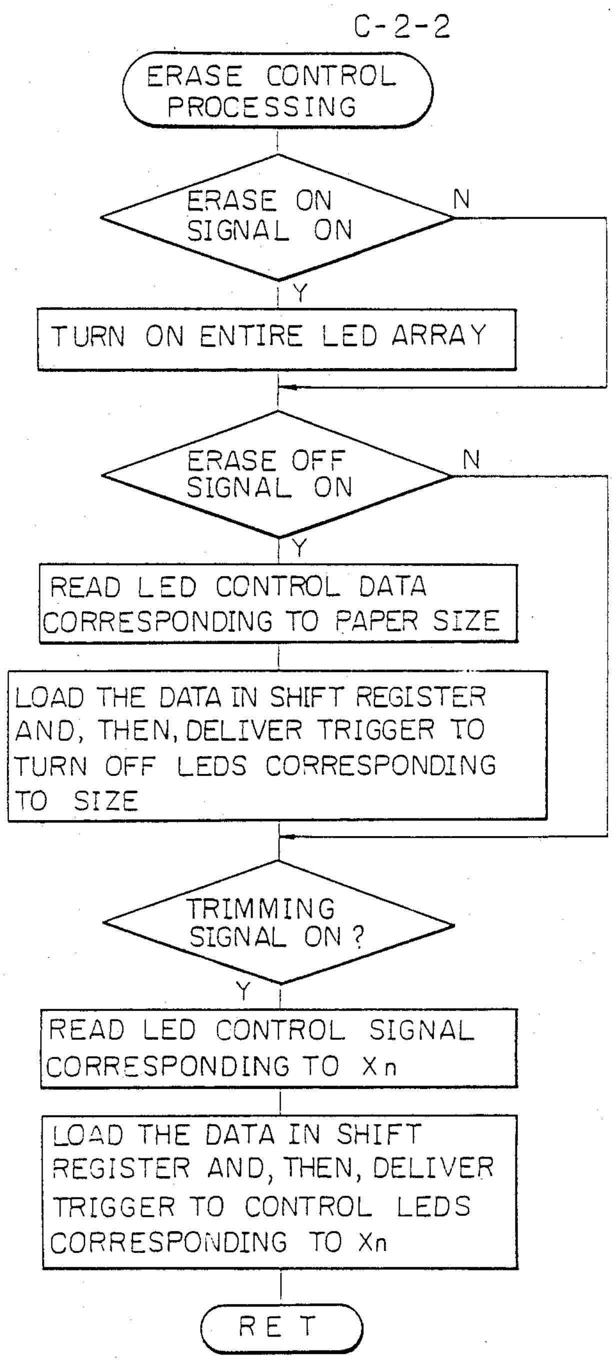
FIG. 15A is a flowchart showing erase control processing.
Figure 15B:
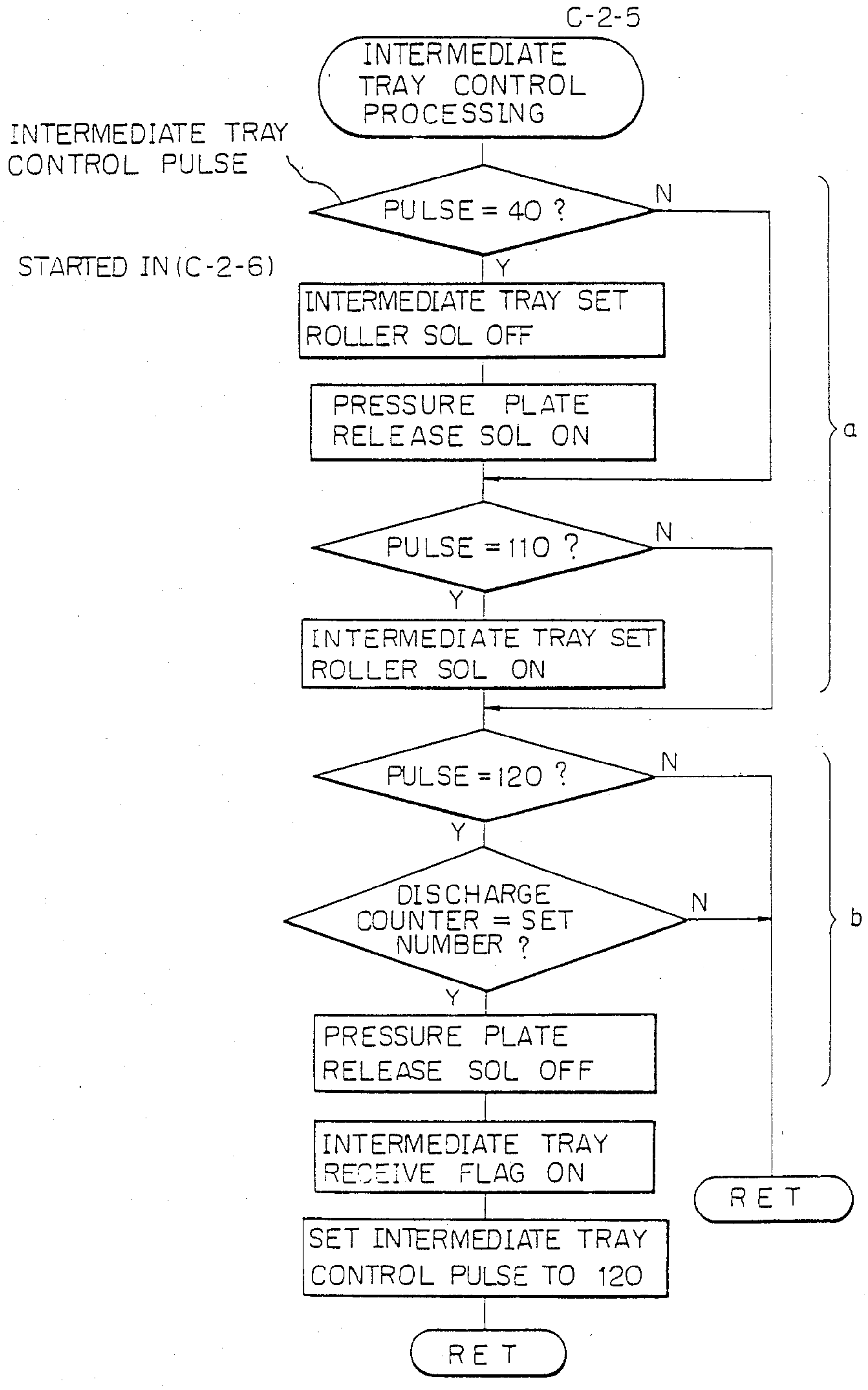
FIG. 15B is a flowchart showing intermediate tray control processing.

FIG. 15B shows erase control processing (C-2-2) included in the copy processing (C). First, when an erase ON signal becomes ON, the entire LED array is turned ON. As the erase ON signal becomes OFF, LED control data corresponding to the paper size is read out. After the LED control data has been lodged in a shift register or shift registers, a trigger is turned ON so as to turn OFF those LEDs which correspond to the paper size. Next, if a trimming signal is ON, LED control data corresponding to Xn is read out. After that data has been lodged in the shift registers, the trigger is turned ON to control those LEDs which correspond to Xn. Then, the optical system produces scanner position data based on the document size, paper size, data trimming area, and X-direction data as sent to the optical system from the body, delivering a signal representative of a position as measured from the starting point of the scanner (in terms of the number pulses produced by an encoder which is interlocked with a control motor). The procedure described above is the processing which occurs in the trim mode.

The shift mode adapted to shift or to center a trimmed image will be described in detail.

SHIFT MODE

Mode Setting (a) The shift key on the operation board is depressed to set up the image shift mode, the center mode, or the OFF mode based on the image shift setting routine (A-1-4).

(b) A mode indicator associated with the mode selected is turned ON (A-1-4).

(c) When the shift mode is set after the magnification change mode has been set, the partial magnification change mode is set up (A-1-5-4).

(d) When the shift mode is set after the combine mode or the undercolor mode has been set, the program mode is set up.

FIG. 8D demonstrates image shift set (A-1-4) which is included in the mode set processing. When the image shift key is turned on while the copier is out of operation, an image shift loop counter is incremented by 1. Then, as in the case of trimming, while the image shift key is continuously depressed, a shift of 2 millimeters is caused by one time of up-counting, and a shift of 40 millimeters is caused by forty times (0.4 second) of up-counting. When the count of the loop counter is 1, the mode indicators are selectively turned on depending upon the mode selected, i.e., center mode or image shift mode. Subsequently, an edit flag is set, and the buzzer is energized. When the image shift mode is set after the undercolor mode has been selected, the program mode is set up. Then, the recall flag is cleared.

Details of data entry under the image shift mode are as follows.

Data Entry (a) Image shift data is entered by depressing a particular one of the keys which indicates a desired direction.

(b) As the R/L key or the U/D key is depressed, data is input to X or Y while, at the same time, a direction flag is set (A-1-5-1, A-1-5-2).

(c) The corresponding direction indicator on the operation board is caused to glow by the above data and direction flag, displaying shift data.

(d) The enter key is depressed every time the data is inputted, whereby the data is stored in a memory.

(e) When the enter key is depressed with no data keyed in, data existing in the memory is maintained.

(f) If the other modes are not set, the enter key is depressed to set a data set end flag to finish data entry.

(g) In the center mode, the entry of data is needless.

Next, the data conversion in the image shift mode will be described in detail.

Data Conversion (a) When the shift mode is combined with a magnification change, shift data is multiplied by a desired magnification (A-1-5-11).

FIG. 8E-11 shows shift data convert (A-1-5-11) included in the edit data processing. If edit data set is ON, if shift image is ON and, yet, if none of the save, delete, partial conversion, and shift data set is ON, shift data is multiplied by a magnification. Then, shift data set is turned ON.

Centering which is included in the image shift mode is as follows.

CENTER PROCESSING (a) In the centering data convert (A-1-5-10), a difference (amount of shift) between the center of a trimming area and that of a paper size is determined (XS, YS).

(b) In the trimming data convert (A-1-5-7), the data (XS, YS) is added to or subtracted from the trimming data. This provides trimming data which is centered at 1 magnification.

(c) The data is multiplied by a magnification to complete the data convert (A-1-5-6).

Figure 21A:
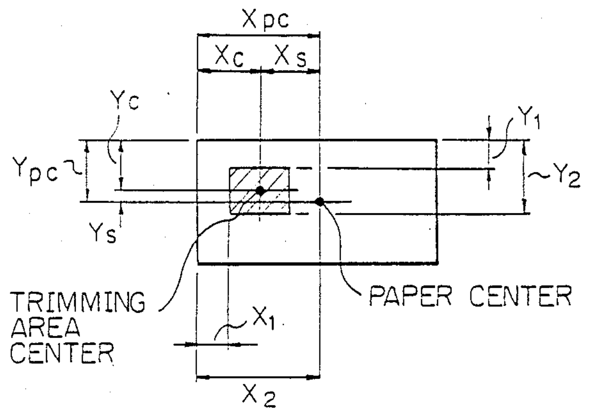
FIGS. 21A to 21C are are diagrams explanatory of data conversion for centering.
Figure 21B:
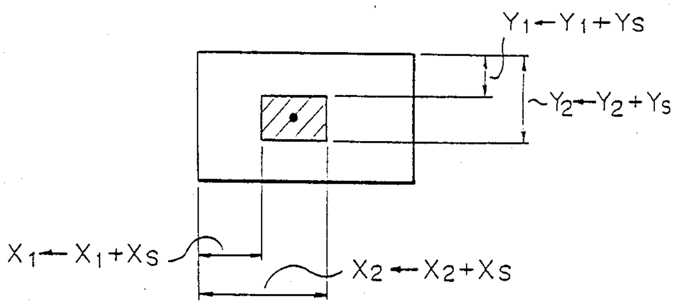
Figure 21C:
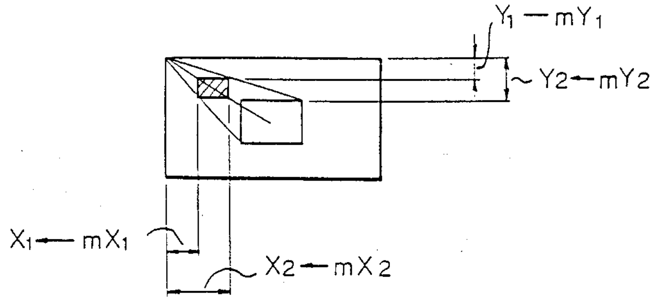

FIGS. 21A to 21C show how data is converted in the center mode. First, as shown in FIG. 21A, the distances XC and YC from the individual reference points to the center of a trimming area and the distances XPC and YPC from the individual reference points to the center of a paper are determined. Based on the difference between those distances, XS and YS are obtained, as shown in FIG. 21B. Then, the trimming area is centered. The area shown in FIG. 21C (hatched) is produced by multiplying X1 and Y1 by a coefficient m of magnification change when a change of magnification is entered.

FIG. 8E-10 demonstrates centering data conversion (A-1-5-10) which is included in the edit data setting processing. If edit data set is ON, if centering data set is OFF, if trimming data is present and, yet, if partial magnification change is specified, the trimming data is multiplied by a magnification. If partial magnification change is not specified, X-direction shift data of the center of a trimming area to the center of a paper size is determined and, then, the right shift flag is set. If YPC is greater than YC, Y-direction shift data of the center of the trimming area to the center of the paper size is determined. In this condition, the down shift flag is set while, at the same time, centering data is made ON. When XPC is smaller than YC, none of the right shift flag and down shift flag is set. When trimming data is absent, the X-direction shift data of the center of the document size to the center of the paper size is determined and, then, the Y-direction shift data of the center of the document size to the center of the paper size is determined. Then, the right shift flag and the down shift flag are set (only when XPC is greater than XOC and YPC is greater than YOC). The copying operation will be described in detail.

Copying Operation (a) The shift of Y axis is effected by feeding shift data to the optical system so as to move the lens.

(b) The shift of X axis is effected by changing the relative position of an image on the drum and a paper, in any of the following four different modes.

(i) When the shift is to the left and if the amount of shift is smaller than $(l_3+l_4)-l_4$, i.e., (distance between the center of a slit and the transfer) - (distance between transfer and register rollers), (i)-1: the period of time as counted from the instant of arrival of the scanner at the slit section is shortened by the amount of shift (C-2-3);

(i)-2: the copy start is delayed relative to a usual one by the amount of shift (B-2-3).

(ii) When the shift is to the left and if the amount of shift is smaller than $l_3+l_2$ and greater than $l_3$, where $l_2$ is the distance between lamp ON and slit center (see (B-2-3)), (ii)-1: after a register sensor has become ON, the lamp is turned ON at a transport section stop timing plus α (B-2-4)

(ii)-2: after the lamp has been turned ON, the register rollers are started at $(l_2+l_3)$ − (amount of shift) (B-2-5, B-2-6).

(iii) When the shift is to the left and if the amount of shift is greater than $l_3+l_2$, (iii)-1: After a register sensor has been turned ON, the register rollers are started at the transport stop timing plus α (B-2-4);

(iii)-2: After the start of the register rollers, the lamp is turned ON at (amount of shift $-(l_2+l_3)$ (B-2-5, B-2-6).

(iv) When the shift is to the right, the register rollers are started when a value produced by adding the amount of shift to the period of time since the arrival of the scanner at the slit section is reached, whatever the amount of shift may be.

The procedure described so far pertains to the shift mode.

Hereinafter, the combine mode will be described in detail. The combine mode is adapted to reproduce the first document on a paper and, then, the second document on the same surface of the paper, and it may be effected in combination with trimming, image shift, color, etc.

COMBINE MODE

Mode Setting (a) In combine mode setting (A-1-2), the combine mode/undercolor mode or the OFF mode is selected. This causes a corresponding mode indicator on the operation board to glow.

(b) After the combine mode or the undercolor mode has been selected, there may be selected another mode such as the color mode, magnification change mode, copy number mode, etc.

(c) When the trim mode or the image shift mode is selected after the combine mode or the undercolor mode, the program mode is set up (A-1-3, A-1-4).

FIG. 8B demonstrates combine mode setting (A-1-2) included in the mode set processing. After that the copier is out of operation has been confirmed (an in-copy flag is set upon print ON initialization and cleared by the copy end processing), a combine key loop counter is incremented by 1 when the in-copy flag is set while a combine key ON signal from the operation board is input. This counter is incremented by 1 every time the combine mode setting flow is executed. If the count of the counter is greater than 1 and smaller than 40, meaning that the key is continuously depressed, processing for changing over the mode at a predetermined intervals is performed. Depending upon the mode, i.e., undercolor mode or combine mode, a corresponding mode flag is set with a corresponding mode indicator on the operation board turned on. Next, a first-time flag is set while, at the same time, a first-time indicator on the operation board is turned on. After the combine mode has been executed with the buzzer energized, a program flag is cleared. The program flag is a flag which is set when the trim mode or the image shift mode has been set after the combine mode.

Hereinafter will be described the copying operation for simple combination.

Copying Operation (a) The sequence of steps from print ON to fixing are the same as the usual copying sequence.

(b) On the path along which a fixed paper is fed out, when the paper has reached a position just before the inlet of an intermediate tray gate, an intermediate tray gate pawl SOL is turned ON by a count of a register counter which has been started at the time of register ON, whereby the paper is led to an intermediate tray (C-2-4).

(c) When the leading end of the paper moves past the intermediate tray sensor, an intermediate tray set SOL is turned ON to lift up intermediate tray set rollers (C-2-6).

(d) As the trailing end of the paper moves past the previously mentioned sensor, a discharge counter is incremented by 1 while, at the same time, an intermediate tray control pulse is started (C-2-6).

(e) In response to the intermediate tray control pulse, the set SOL is turned OFF, then the intermediate tray set rollers are lowered, then the paper is laid on the intermediate tray, an then the rollers are lifted up again (C-2-5-a).

(f) By the end operation processing (D-2) which is included in the copy end processing, intermediate tray control is executed to press the presser plate against the final repeated paper so as to prepare for the second feed (C-2-5-b).

(g) The second feed of papers, or copies, is effected by coupling a feed clutch which is associated with the intermediate tray (B-1, B-2, B-3, B-2-2-1).

(h) When the leading end of the paper reaches a position just before a combine tray gate pawl, the gate pawl is opened so that the paper is turned over and then fed to a combine tray (B-2-2-1-2).

(i) As the trailing end of the paper moves past a combine sensor, a combine feed control pulse is started (B-2-2-2).

(j) By the above pulse control, the paper is fed to a body paper transport path in such a direction that the trailing end of the paper becomes the leading end.

(k) At a timing when the leading end of the paper reaches a certain distance before the register rollers (see B-2-3), a copy start flag 1 is set.

(l) When the copy start flag 1 is set, if shift data is absent, the program advances to the copy routine provided the other conditions are satisfied.

(m) By the procedure described above, the second copy is provided on the same surface of the paper as the first copy to complete a combined copy.

Figure 14:
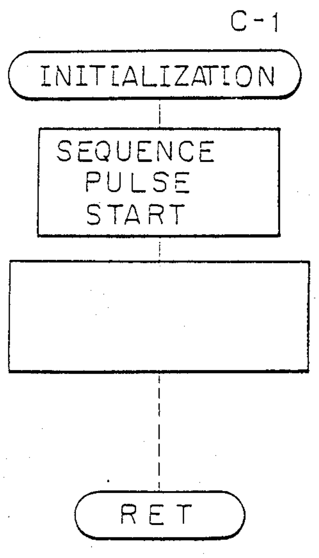
FIG. 14 is a flowchart showing initialization.

FIGS. 14 and 15 demonstrate, respectively, an initialize procedure (C-1) and a repeat procedure (C-2) which are included in the copy processing. In the initialize procedure, sequence pulses are produced to advance the sequence. In the repeat sequence, on the other hand, there are executed sequence control processing (C-2-1), erase control processing (C-2-2), register clutch control processing (C-2-3), sequence control processing 2 (C-2-4), intermediate tray control processing (C-2-5), sensor check (C-2-6), register sensor check (B-2-4), shift counter set (B-2-5), copy start check (B-2-6), etc.

Figure 15C:
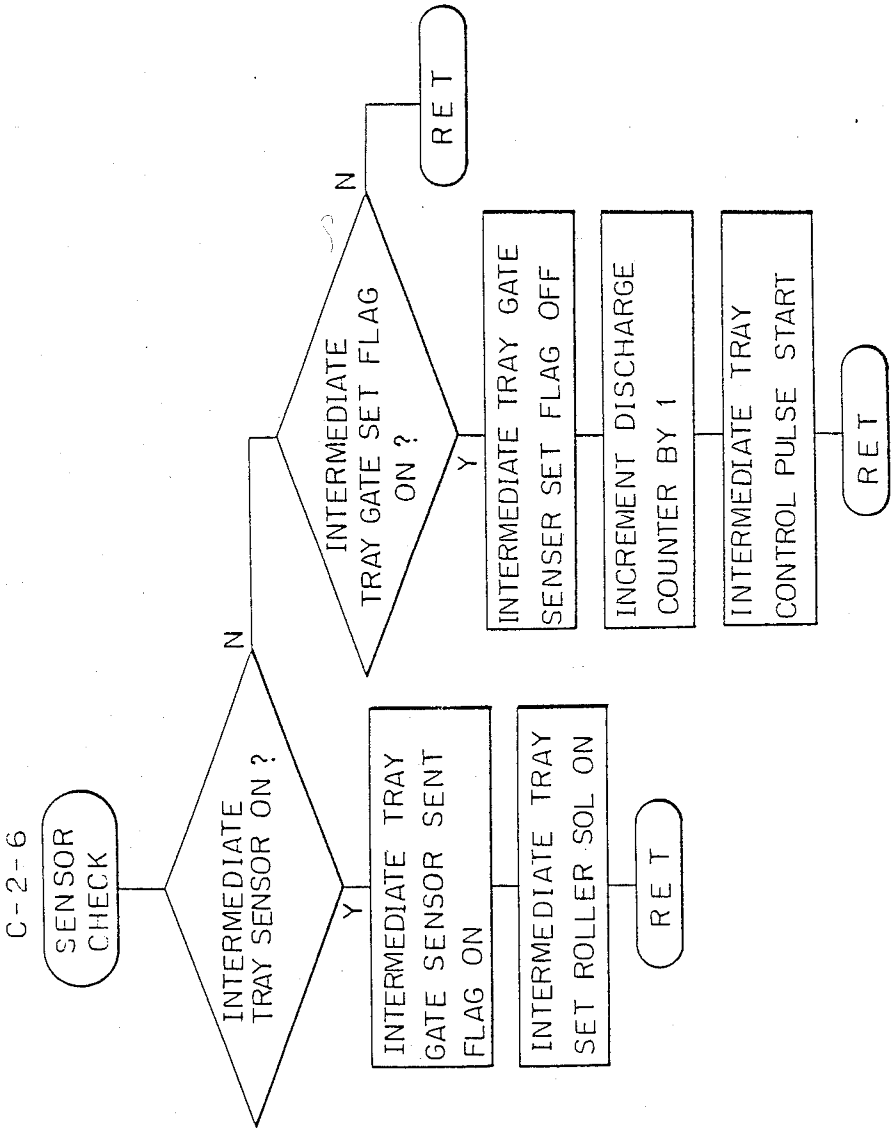
FIG. 15C is a flowchart showing sensor check.

FIG. 15C shows the sensor check (C-2-6) mentioned above. In this procedure, after intermediate tray sensor ON has been confirmed, an intermediate tray gate sensor set flag is set and, then, an intermediate tray set roller SOL is turned ON. If the intermediate tray sensor is not ON, whether an intermediate tray gate set flag is ON is decided and, if it is ON, the intermediate tray gate sensor set flat is cleared, the discharge counter is incremented by 1, and then an intermediate tray control pulse is started.

FIG. 15B shows the intermediate tray control procedure (C-2-5) included in the repeat processing. The former half of the procedure corresponds to C-2-5-a and the latter half, to C-2-5-b. Whether the number of intermediate tray control pulses C-2-6 as started in C-2-6 has reached 40 is decided and, if it has reached 40, the intermediate tray set roller SOL is turned OFF and, instead, a presser plate release SOL is turned ON (the set rollers are lifted at the instant when a paper is received in the tray). Then, as the count of pulses reaches 120, whether the discharge counter has reached the set number of copies is determined (if the paper is the last copy, the presser plate is pressed thereagainst so as to prepare for the next copying). If the number of pulses is equal to the set number of copies, the presser plate release SOL is turned OFF and, instead, an intermediate tray receive flag is turned ON, and then the intermediate tray control pulse is set to 120.

FIGS. 11 and 12 demonstrate, respectively, the print ON initialization (B-1) and pre-copy operation processing (B-2) which are included in the pre-copy processing. In the print ON initialization, the main motor is turned ON, the in-copy flag is set, the copy counter is cleared, the pulse counter is cleared, the READY display is turned OFF, the pump motor is turned ON, and the pump timer is cleared. Thereafter, in the case of ADF mode, ADF feed is turned ON, then feed pulse ON is started, and then feed pulse start is set up. In the pre-copy operation processing, after developer buildup processing (B-2-1), paper feed processing (B-2-2), copy start check (B-2-3), register sensor check (B-2-4), shift counter setting (B-2-5), and copy start check 2 (B-2-6), the end of pre-copy operation is checked on condition that the ADF document setting has been completed, that the developer has fully built up, and that the copy start flag has been set.

Figure 12:
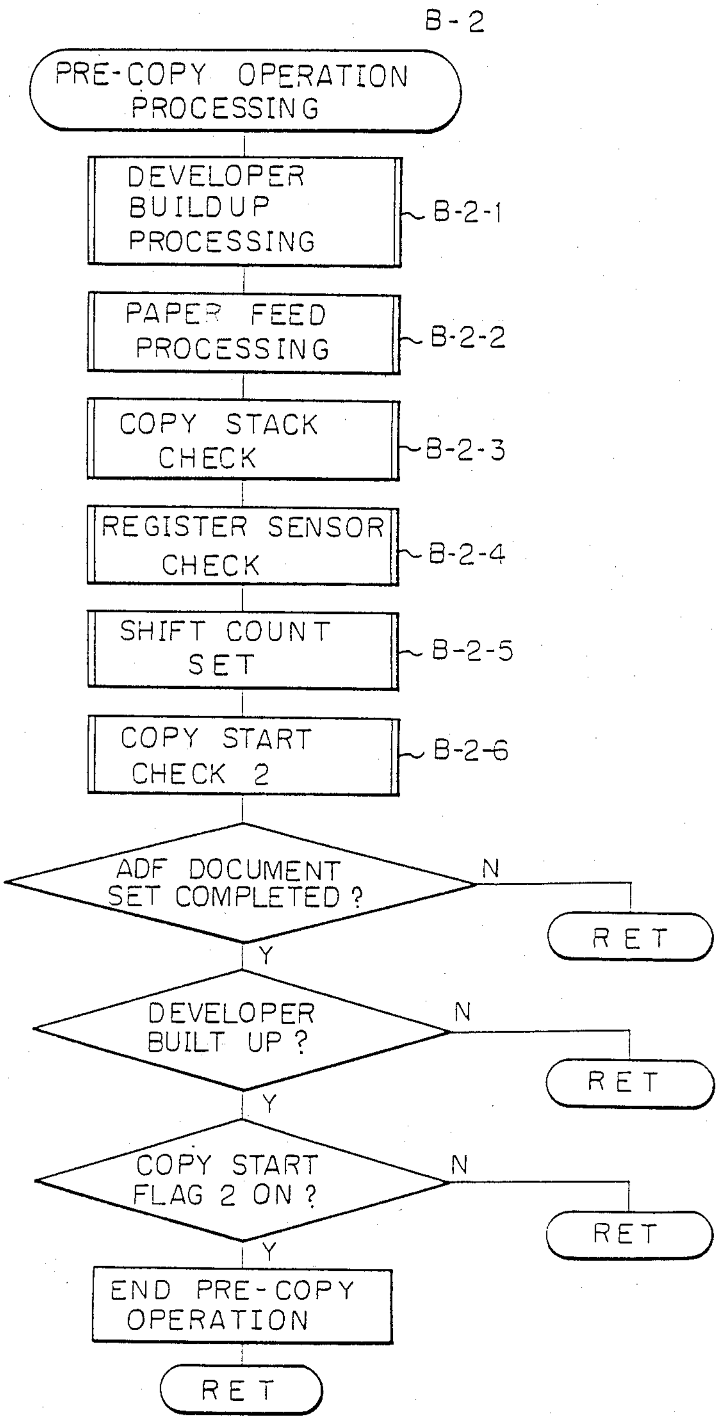
Figure 12A:
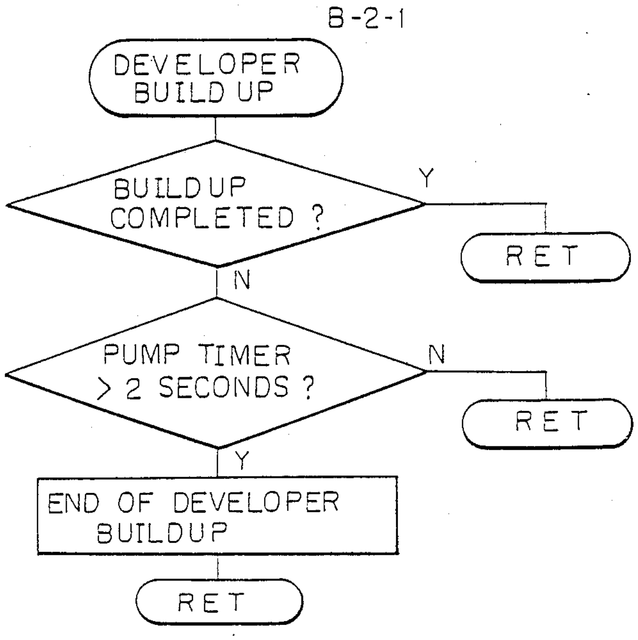
FIG. 12A is a flowchart showing developer buildup.
Figure 12B:
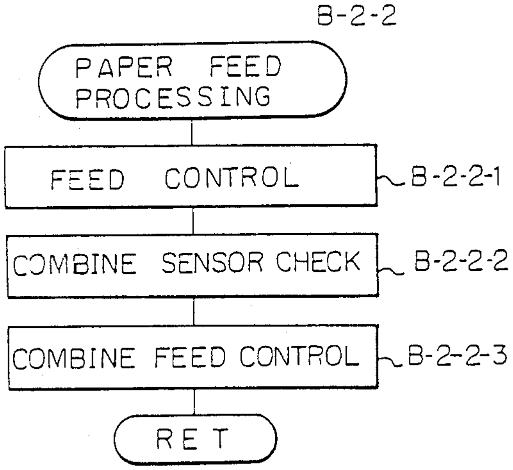
FIG. 12B is a flowchart showing paper feed processing.
Figures 1A, 12B:
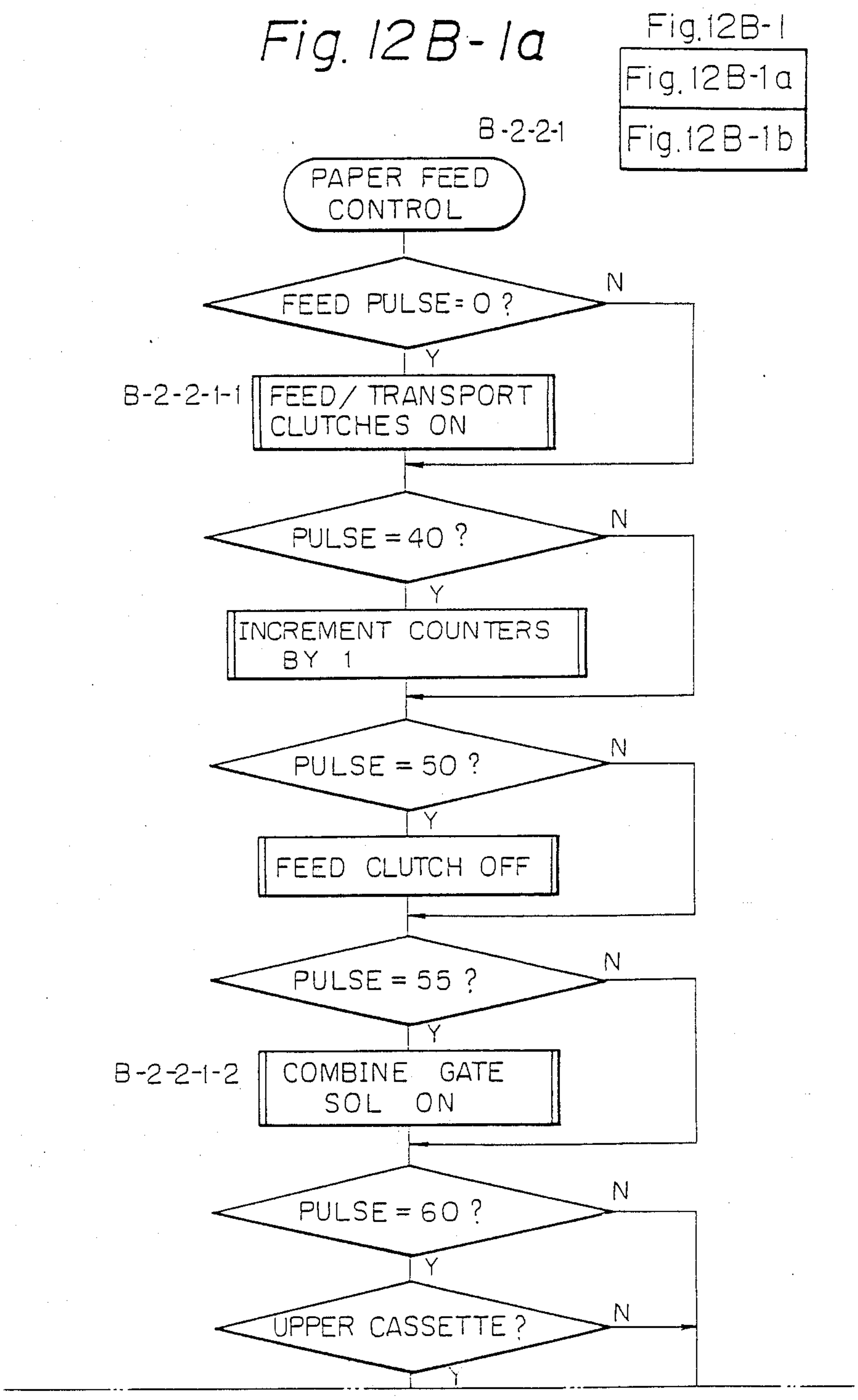
Figures 1B, 12B:
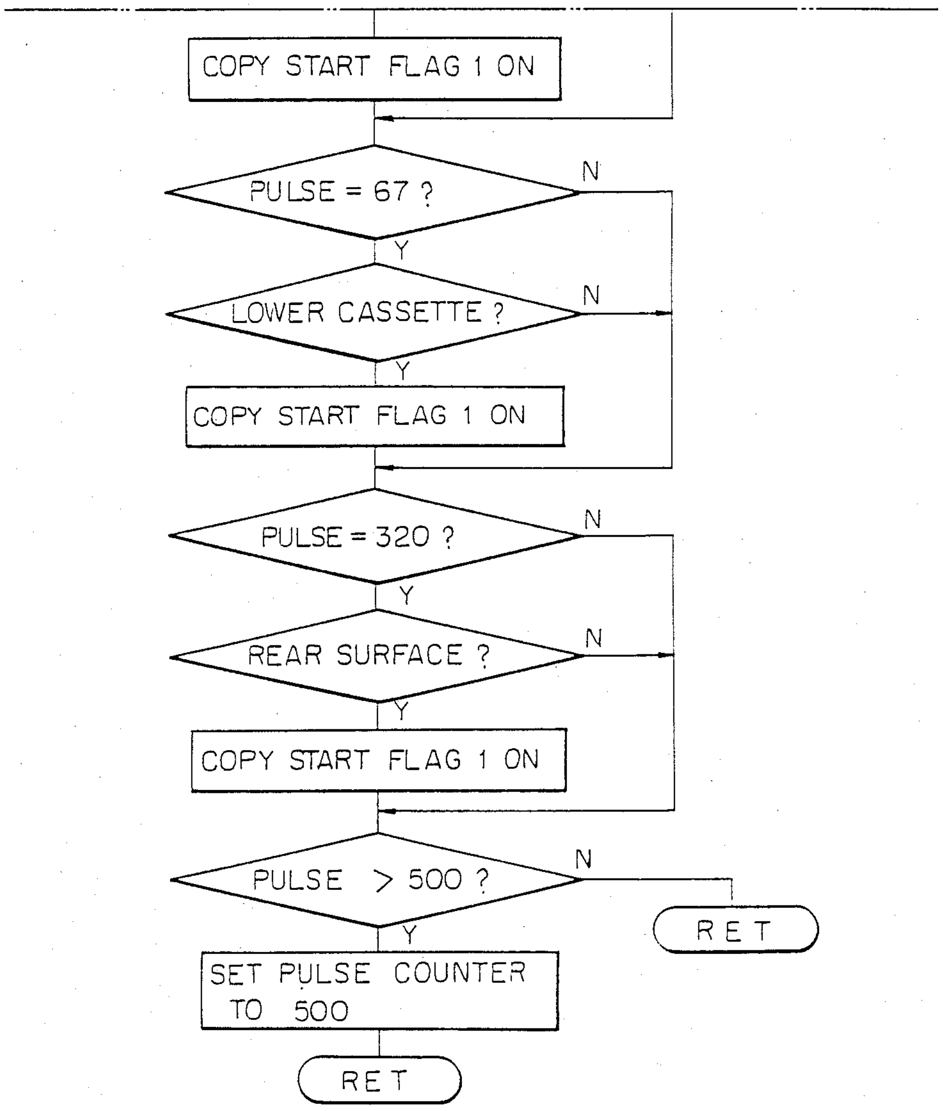
Figures 1, 12B:
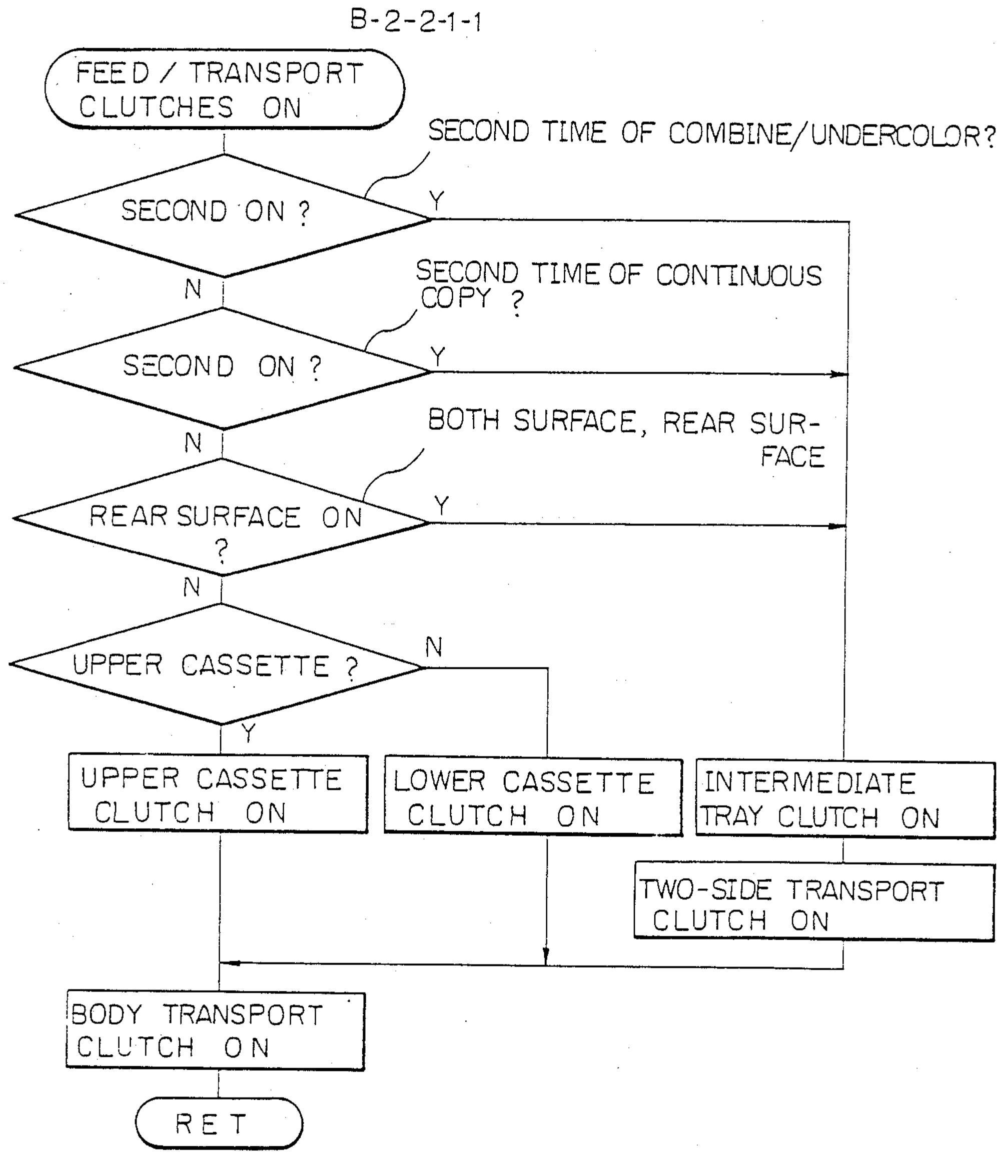
Figures 1, 2, 12B:
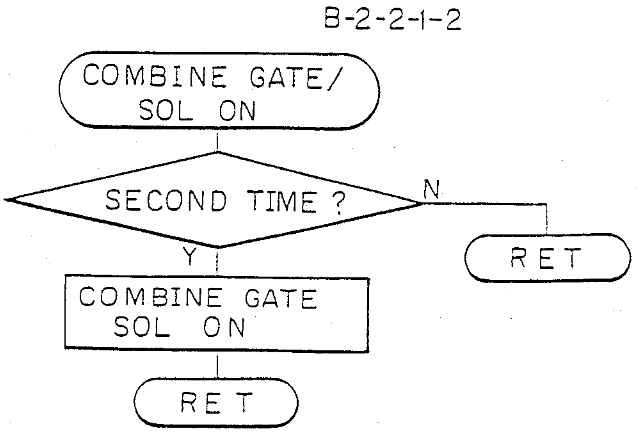
Figures 2, 12B:
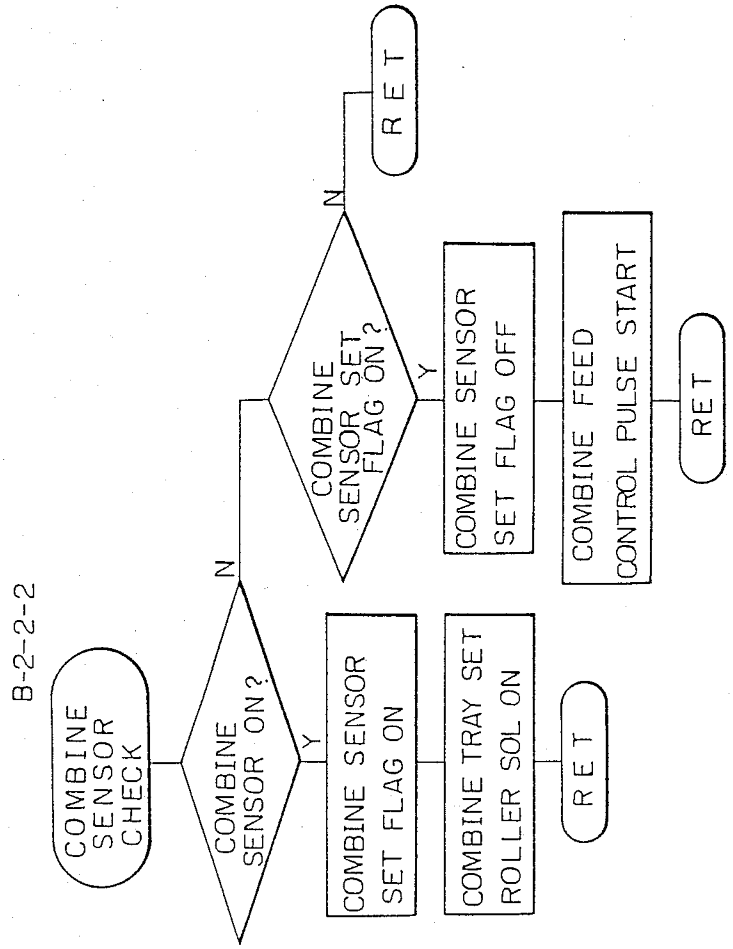
Figures 3, 12B:
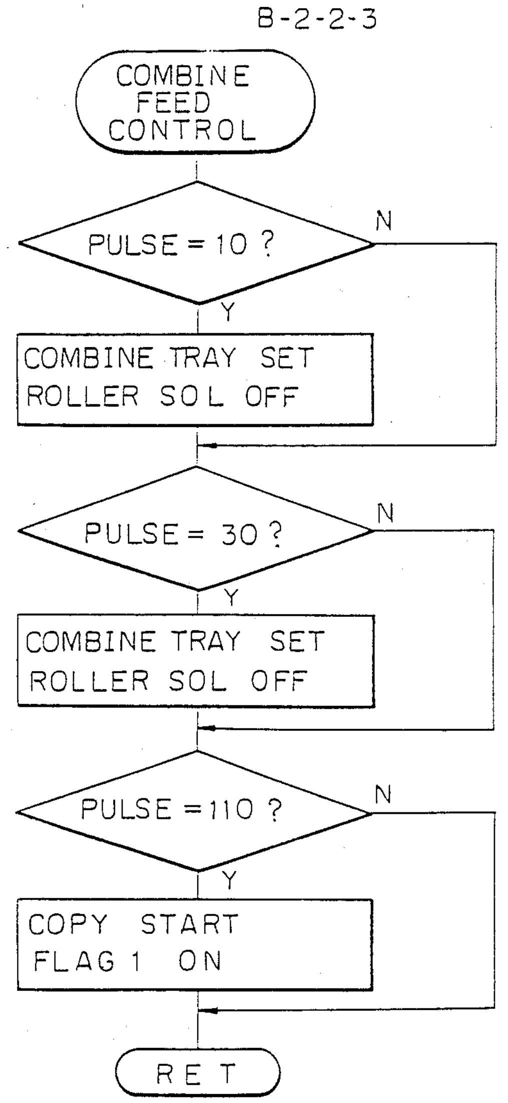
Figure 13:
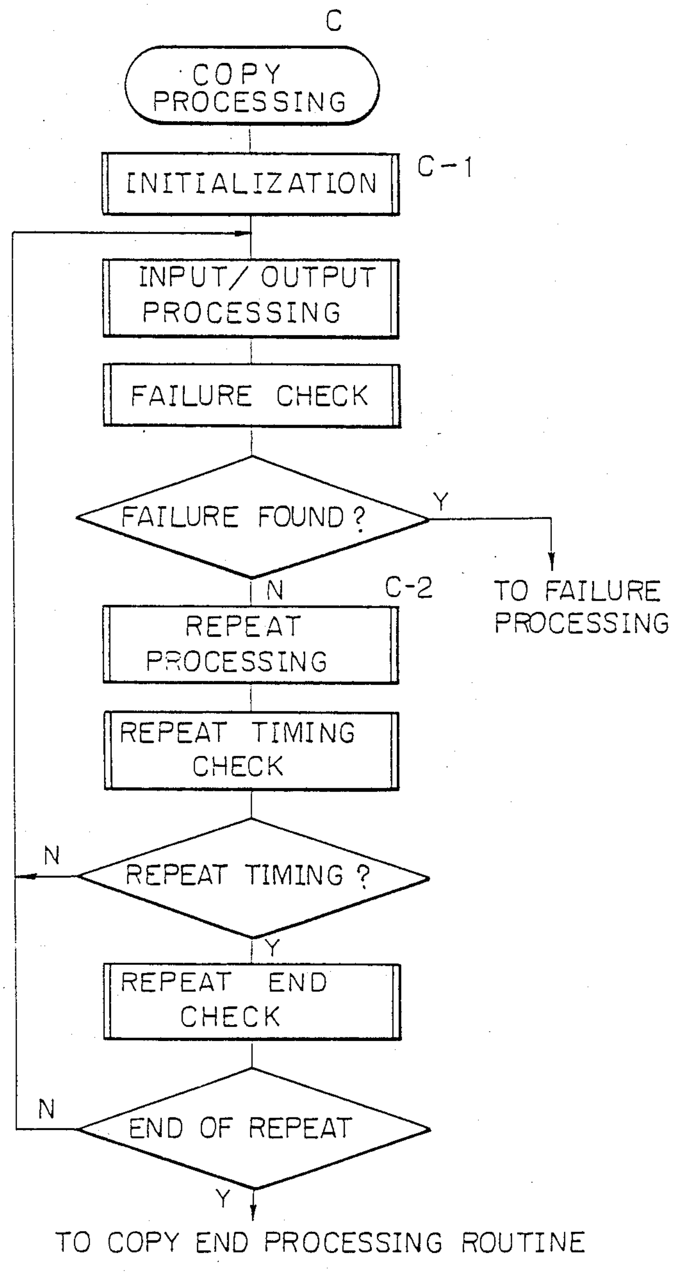

FIGS. 12A and 12B show, respectively, the developer buildup processing (B-2-1) and the paper feed processing (B-2-2) which are included in the pre-copy operation processing. In the developer buildup processing, that the pump timer is loaded with more than 2 seconds is confirmed and, then, the buildup of developer is finished. Executed in the paper feed processing are paper feed control (B-2-2-1), combine sensor check (B-2-2-2), and combine paper feed control (B-2-2-3).

FIGS. 12B-1-1 and 12B-1-2 show, respectively, paper feed/transport clutch ON procedure (B-2-2-1-1) and a combine gate SOL ON procedure (B-2-2-1-2) which are included in the paper feed control. In the case of the second copying of the combine/undercolor mode operation or that of the continuous print mode operation or the rear copying of the two-side copy mode operation, the intermediate tray clutch and plane transport clutch are coupled. If papers are to be fed from the upper cassette, an upper cassette feed clutch is coupled and, if they are not to be fed from it, a lower cassette feed clutch is coupled. In this manner, particular clutches are turned on for a desired mode. Finally, the transport clutch of the body is coupled. In the combine gate SOL ON procedure, in the case of the second copying of the combine/undercolor mode operation, the combine gate SOL is turned ON.

FIGS. 12B-2 and 12B-3 demonstrate, respectively, the combine sensor check (B-2-2-2) and the combine paper feed control (B-2-2-3) which are included in the paper feed control. In the combine sensor check, when a combine sensor is ON, a combine sensor set flag is set and a combine tray set roller SOL is turned ON. If the combine sensor set flag is set while the combine sensor is OFF, the combine sensor set flag is cleared to start a combine feed control pulse. In the combine paper feed control, as the number of pulses reaches 10, the combine tray sensor roller SOL is turned OFF. As the number of pulses is increased to 30, the combine tray set roller SOL is turned OFF. Further, as the number of pulses reaches 110, the copy start flag 1 is set.

FIG. 13B-1 is a flowchart demonstrating the paper feed control (B-2-2-1) included in the paper feed processing. When the number of paper feed pulses is zero, the paper feed/transport clutch is coupled (B-2-2-1-1). As the number of pulses reaches 40, counters (total counter, rental counter, paper feed counter, etc.) are incremented by 1 each. Upon the increase of the number of pulses to 50, the paper feed clutch is uncoupled. As the number of pulses reaches 55, the combine gate SOL is turned ON (B-2-2-1-2) (i.e. the gate SOL is turned ON at a timing when the leading end of a paper reaches a position just before the combine tray gate pawl). When the number of pulses reaches 60, if papers are fed from the upper cassette, the copy start flag 1 is set. When the number of pulses reaches 67, if papers are fed from the lower cassette, the copy start flag 2 is set. Upon the increase of the number of pulses to 320, if an image is to be reproduced on the rear surface of a paper, the copy start flag 1 is set; as the pulse number exceeds 500, the pulse counter is set to 500.

The procedure described so far pertains to the combine mode.

A program combine mode which is related to this embodiment will be described in detail.

PROGRAM COMBINE MODE

In this mode operation, the first copy and the second copy mode are programmed beforehand in the combine mode or the undercolor mode. After the last mode has been set, the first mode is set and, then, the first copying is effected in response to print ON. Upon completion of the first copying, the second mode is automatically set up and, in response to another print ON, the second copying is performed.

Mode Setting (a) Since the trim mode or the shift mode is set after the combine mode or the undercolor mode has been set, the program mode is set up (A-1-3, A-1-4).

(b) While in the program mode only the indicators are changed in the event of magnification change and color selection, actual movement of the lens and various operations for color changeover such as the supply of a color developer, changeover of a nozzle and cleaning of the developing section are not performed (A-1-1-3, example of magnification change).

(c) When the enter key is depressed after trim mode data or shift mode data has been set, the program advances to the second mode setting so as to specify the second mode (A-1-5-3).

(d) The indicators turned on first are turned OFF and, instead, the indicators for the second mode are turned on.

(e) When the enter key is depressed after the second mode and data setting, the data set end flag is set to finish data setting (A-1-5-3).

(f) When the data set end flag is set as stated above, the first mode setting is executed (A-1-6).

As shown in FIG. 8C, (A-1-3) has program mode set processing which is included in trim mode set processing. Specifically, when combination or undercolor is ON and this is the first ON, the program mode becomes ON; if it is the second ON, the recall flag is reset.

As shown in FIG. 8D, (A-1-4) is such that when image shift is ON, the same flow as the one shown in FIG. 8C is inserted to set up the program mode.

As shown in FIG. 8E-3, (A-1-5-3) shows enter key processing. Specifically, when the program mode is ON and this is the first ON, first time is made OFF while, at the same time, second time is made ON, whereafter the second mode data area is designated. On the other hand, if it is the second ON, first time is turned ON and second time OFF, followed by cancelling the designation of the second mode area.

Figure 8F:
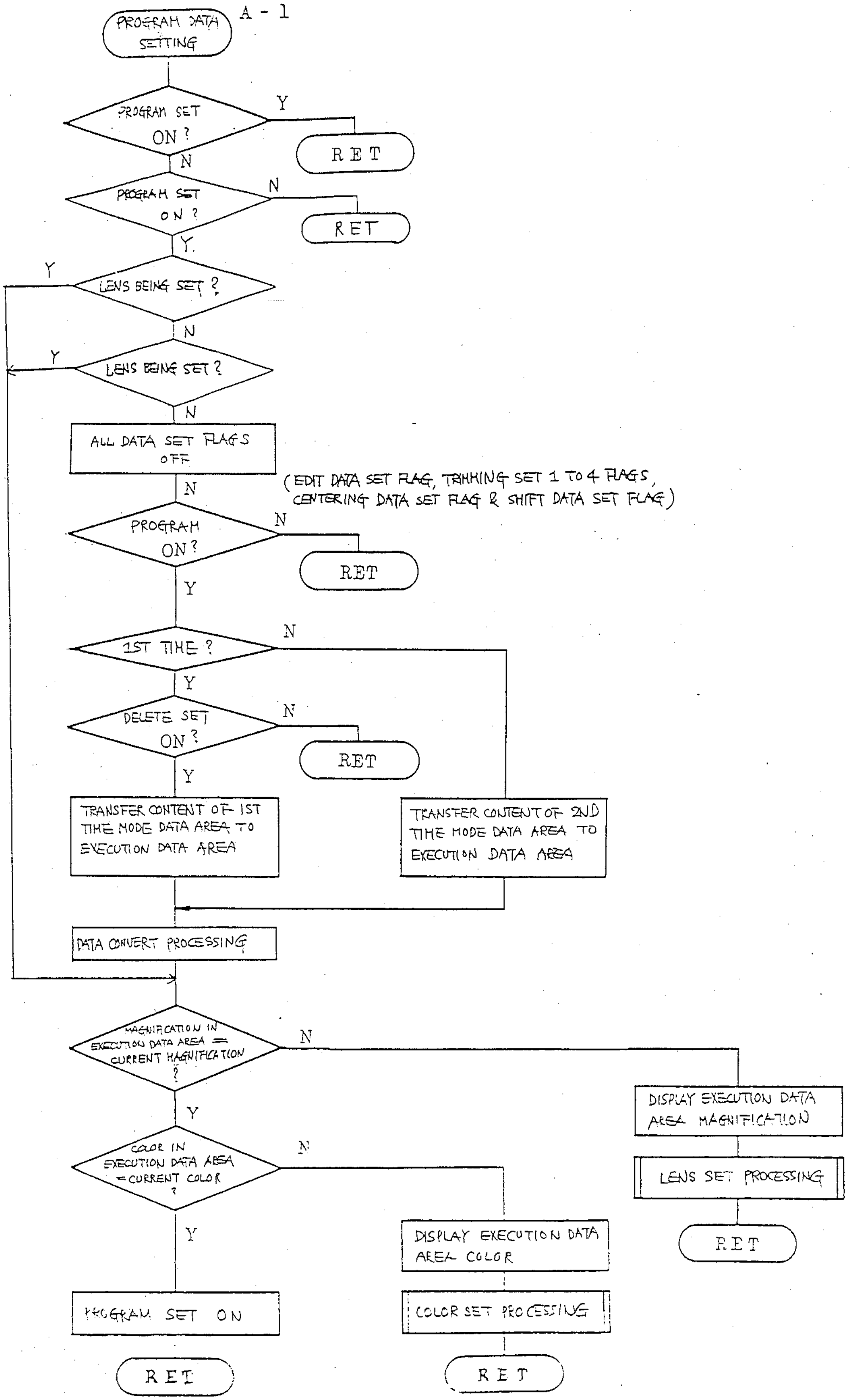

FIG. 8F shows a processing flowchart for program data setting (A-1-6). In the program mode, contents programed beforehand are read out so that processing for setting up that mode is performed. The routine shown in FIG. 8F is executed for the first time at a time when the last mode is set (i.e. when the data set flag is set). Specifically, when the program mode is not ON, program ON is set up. If it is the first time and data set ON is set up, the content stored in the mode data area of the first time is transferred to the executing area. If it is the second time, the content stored in the second time mode data area is transferred to the executing area. If the magnification in the executing area is the current magnification and the color in the same area is the current color, program set ON is set up. If the magnification in that area is different from the current one, it is displayed while, at the same time, lens set processing is performed. If the color in that area is different from the current color, it is displayed while, at the same time, color set processing is performed.

Copying Operation (a) The procedure from print ON to the end of the first copying is the same as the previously stated combining procedure.

(b) In the copy end processing, when papers are fully received in the intermediate tray as determined by the copy end check 1 (D-3), the program set flag is cleared.

(c) Subsequently, the program data setting (A-1-6) is executed in the end operation processing (D-2) to perform the second data setting to thereby prepare for the second copying.

(d) After the second copying operation has been performed in the same manner, the mode is returned to the first one. This completes all the copying steps.

Figure 8G:
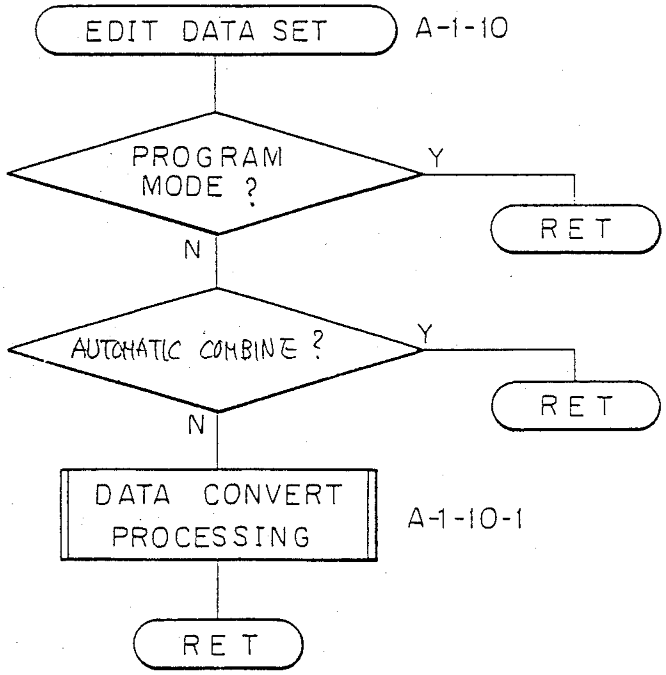
FIGS. 8G and 8G' are flowcharts showing edit data set processing.
Figure 8G:
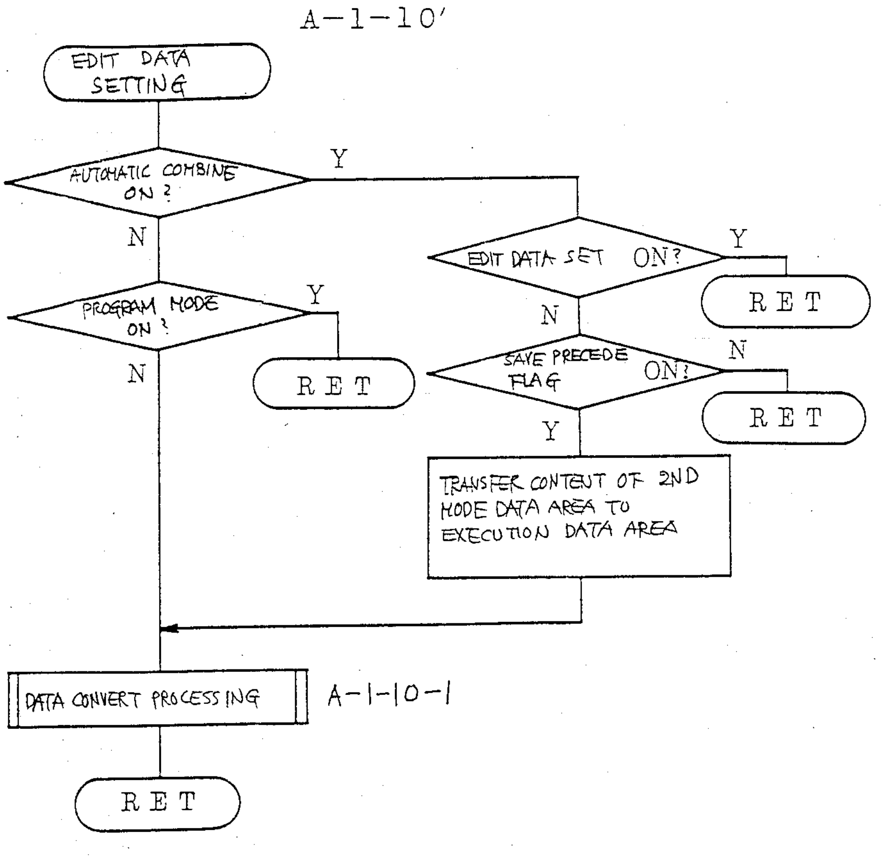
Figures 1, 8G:
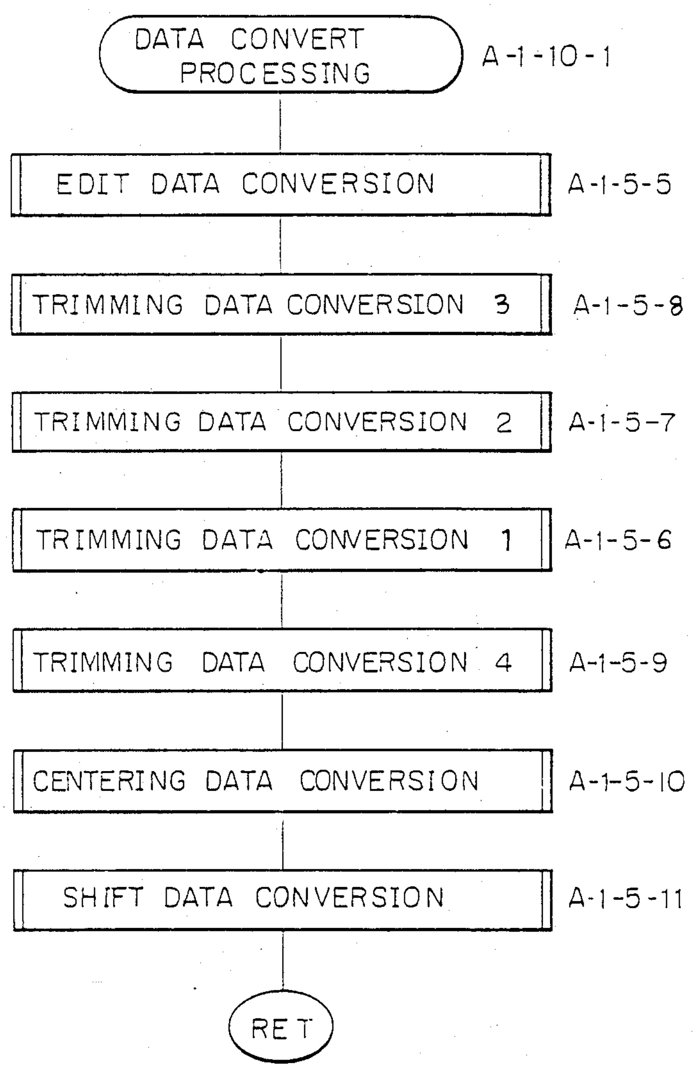
Figure 9A:
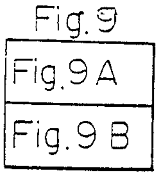
Figure 9A:
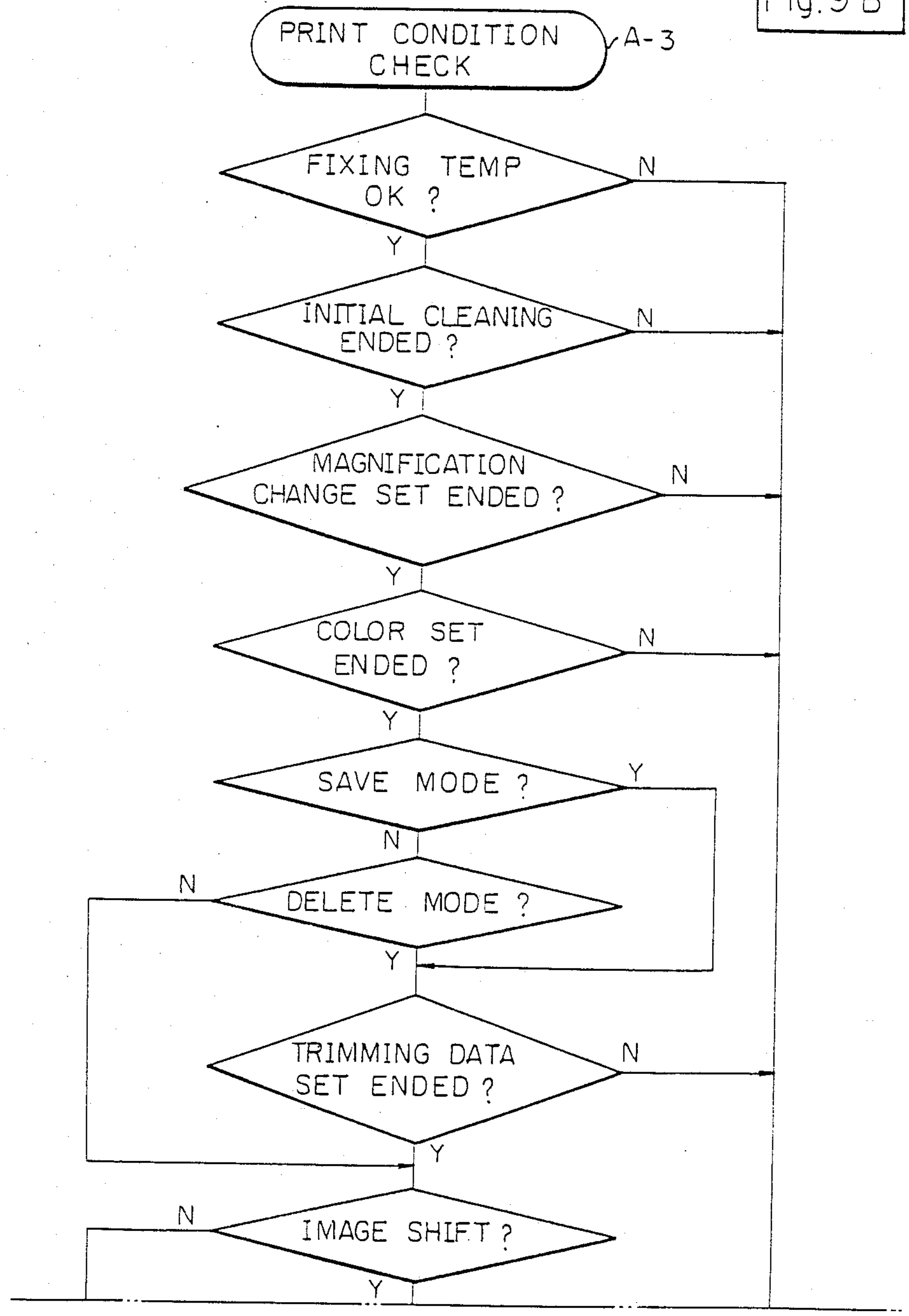
Figure 9B:
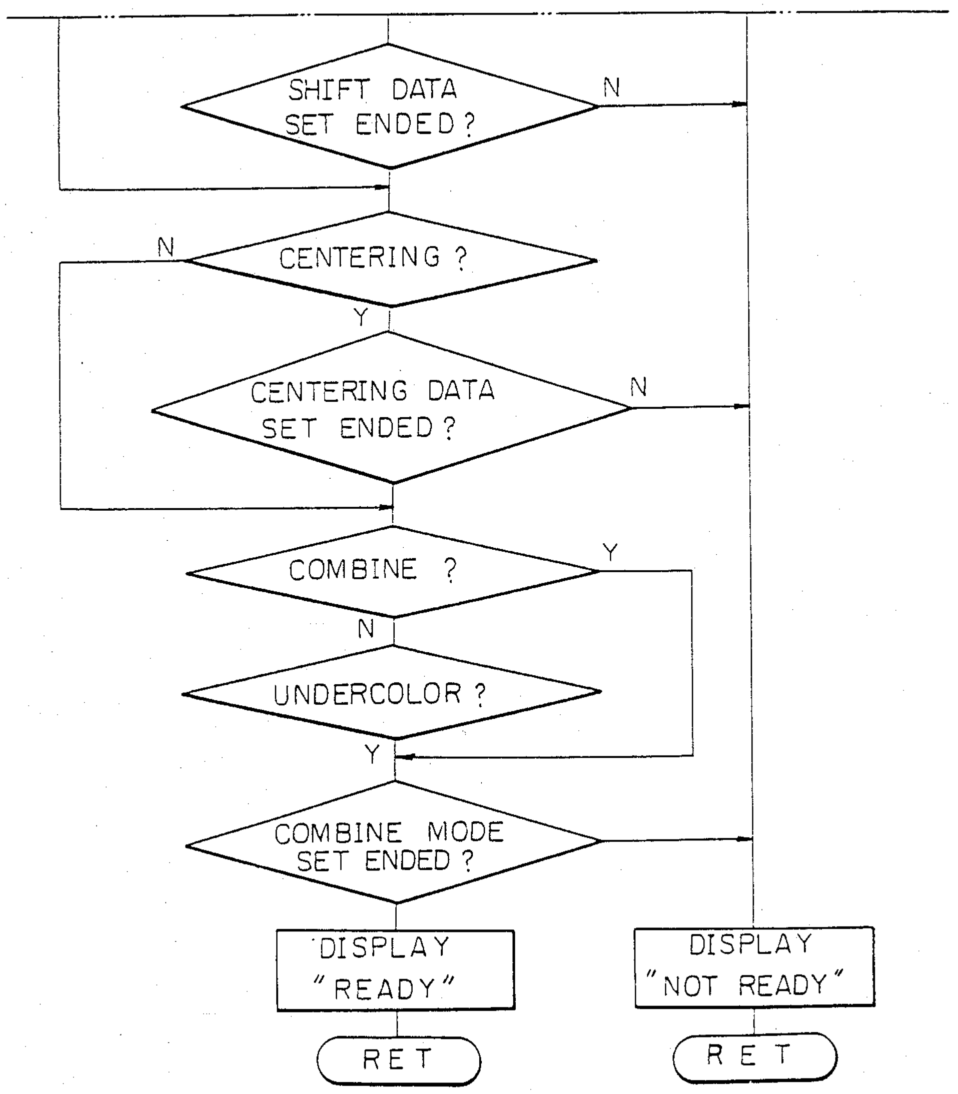
Figure 10:
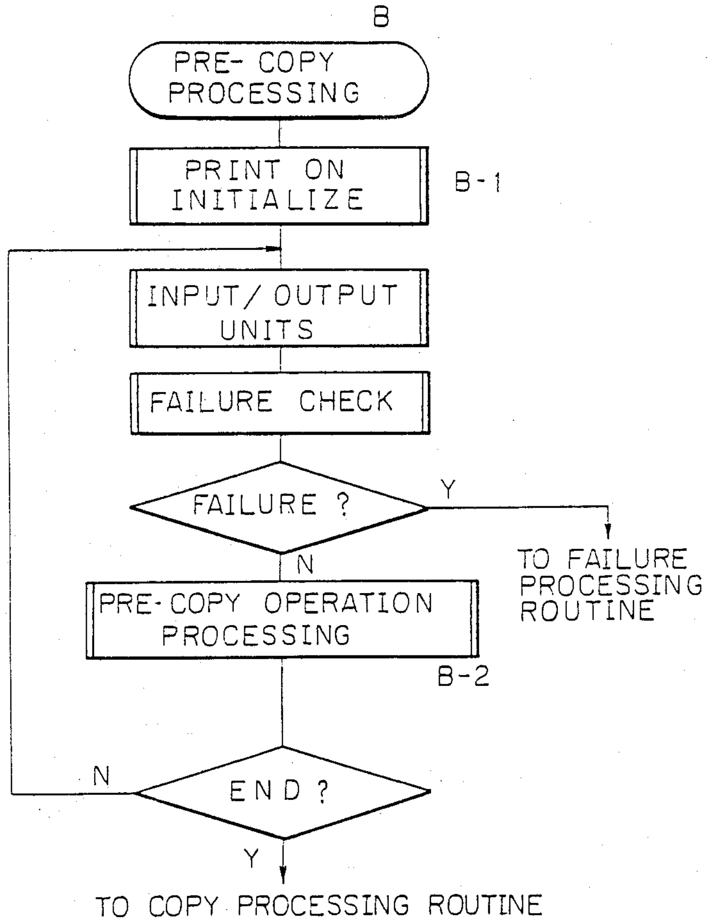
Figure 11:
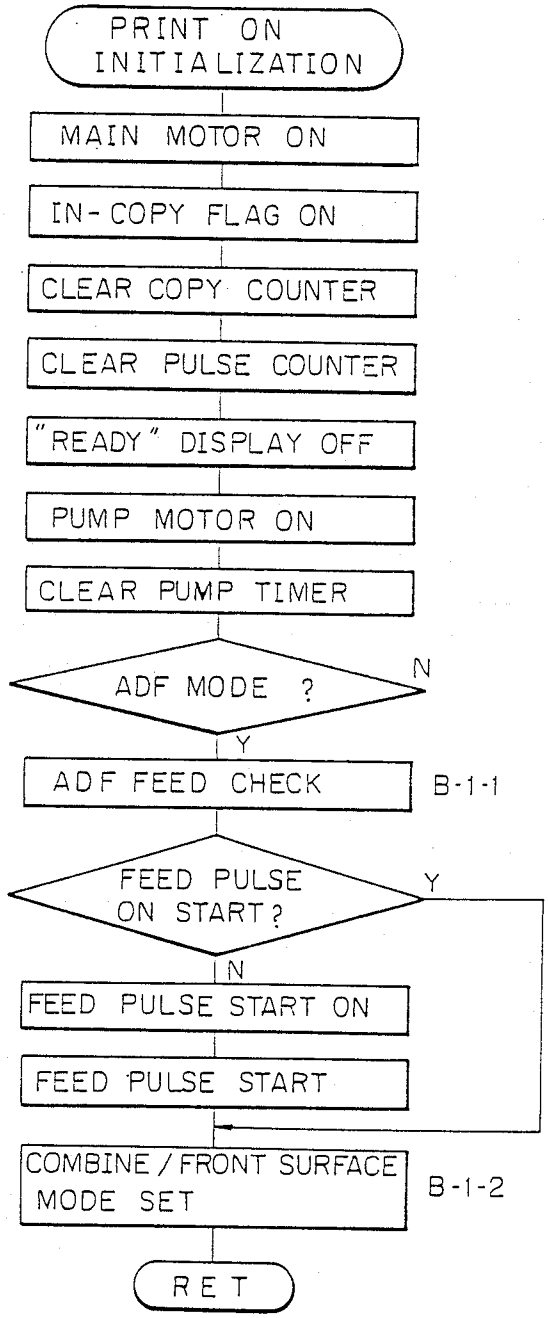

FIG. 8G is a flowchart showing the edit data set (A-1-10). As shown, this flow is such that in any mode other than the program mode the data convert processing (A-1-10-1) shown in FIG. 8G-1 is executed. Specifically, when the edit data set is executed, whether the mode is the program mode or the automatic combine mode is determined and, if it is neither one of them, the data convert processing is performed. This is followed by the program data set (A-1-6). In the case of the program mode, if it is the first program mode and if data set is ON, the content stored in the mode data area for the first time is transferred to the execution data area and, then, the data convert processing (A-1-10-1) is executed to set magnification, color and others.

FIG. 8G-1 demonstrates the data convert processing (A-1-10-1). In this processing, there are executed edit data convert (A-1-5-5), trimming data convert 1 (A-1-5-6), trimming data convert 2 (A-1-5-7), trimming data convert 3 (A-1-5-8), trimming data convert 4 (A-1-5-9), centering data convert (A-1-5-10), shift data convert (A-1-5-11). Thereafter, the program returns (RET).

AUTOMATIC COMBINE MODE

The automatic combine mode in accordance with the present invention will be described in detail.

FIG. 8E-12 demonstrates the automatic combine mode which is included in the edit data setting (A-1-5′) as shown in FIG. 8E′. Specifically, when the automatic combine routine is executed while the enter key processing (A-1-5-3) of the edit data setting flow (A-1-5′) is under way with the program mode set up and after the second data entry has been completed with data set turned ON, an automatic combine mode flag is set on condition that:

(i) the first mode is the save mode and the second mode, the delete mode; or (ii) the first mode is the delete mode and the second mode, the save mode;

(iii) in any case, the second mode is not the shift mode.

Specifically, in a FIRST SAVE ON step shown in FIG. 8E-12, whether a save mode flag exists in the first data area is checked and, if it does, whether the second mode is the delete mode is checked. If it is not the delete mode, whether a delete mode flag exists in the first data area is determined and, if it does, whether the second mode is the save mode is checked. When the first mode is the save mode and the second mode is the delete mode or vice versa as determined by the above procedure, an automatic combine flag is set after confirming that the second mode is not the shift mode and centering is not ON.

Data Conversion

The first data conversion is performed after transferring the first data to the execution data area at A-1-6 and, then, performing the data convert processing (A-1-10-1) as shown in FIG. 8G-1. In this embodiment, this processing (A-1-10-1) proceeds as follows.

(a) If the automatic combine mode is ON in the trimming data convert 1 (A-1-5-6), the program returns (RET).

(b) If the automatic combine mode is set up and set up for the first time in the trimming data convert 2 (A-1-5-7), final data computed (center coordinate data of a trimming or a masking area) is written in a buffer $X_{c1}$.

The second data conversion is performed by executing the program data set (A-1-6, more specifically A-1-10-1) at the end of the first copying (D-2, or end operation processing).

(i) In the trimming data convert 3 (FIGS. 8E-8-2-A to 8E-8-2-C), if the second automatic combine mode has been set up, a difference between the second area center coordinates ($X_c'$, $Y_c'$) and the first area center coordinates ($X_{c1}$, $Y_{c1}$) is determined and, then, the amount and direction of shift of the second area center which causes the second area center to align with the first area center are calculated.

(ii) In the trimming convert 2 (A-1-5-7′ of FIG. 8E-7-1), the amount of shift calculated as stated above is added to or subtracted from the trimming area data to produce final data.

As described above, only if the specified area of the first document is set in a specified position, the second document can be automatically shifted to the specified position of the first document by simply setting a specified area thereof.

FIGS. 8E-8-2-A and onward demonstrate a modification to the above-stated automatic combine mode. In this particular modification, a save area (trimming area) is inlaid in a delete area (masking area).

In detail, in the trimming data convert 3, if trimming data set 3 is not ON while edit data set is ON and automatic combine is ON, procedures (a), (b) and (c) are executed. In the procedure (a), trimming data is multiplied by a magnification. If the automatic combine flag is ON and the mode is not the save mode, the procedure (b) is performed. In the procedure (b), processing associated with the left-hand side is executed if $X_c'$ is greater than $X_c$, and processing associated with the right-hand side is executed if $X_c'$ is smaller than $X_c$. In both of such processings, after X-direction return data for the trimming area center due to the magnification has been determined, as regards the right-hand side processing, a right return flag is set and, then, Y-direction return data of the trimming area center due to the magnification is determined depending upon the relationship between $Y_c'$ and $Y_c$ as stated above. Subsequently, a down flag is set and, then, the data undergone a magnification change are stored as trimming data. This is followed by the procedure (c) in which right return is turned ON, then Y shift data is corrected, and then trimming data set 3 is turned ON.

On the other hand, if automatic combine flag is ON and the mode is the save mode, the processing shown in FIG. 8E-8-2-D is executed to determine an amount of shift in the X direction for bringing the save area center into register with the delete area center. Then, an amount of shift in the Y direction for aligning the save area center with the delete area center is determined. Thereafter, the program returns after turning trimming data set 3 ON.

FIG. 8E-13 shows a modification to the automatic combine mode set (A-1-5-12). As shown in the figure, when the first mode is the save (trimming) mode and the second mode is the delete (masking) mode, a save precede flag is set and, then, the automatic combine flag is set.

FIG. 8G′ shows a modification to the edit data set (A-1-10). In the figure, if the mode is the automatic combine mode and the save precede flag is set, the content of the second mode data area is transferred to the execution data area, then the data convert (A-1-10-1) is performed to store the center coordinates of the delete area in the buffer $X_{c1}$, and then the program data set (A-1-6) is executed to transfer the first data to the execution data area, followed by the data convert (A-1-10-1).

Further, FIG. 8E-8-2-D shows a modification to the trimming data convert 3 (A-1-5-8). As shown, if the automatic combine mode has been set up with the save mode turned ON, a difference between the center coordinates ($X_c'$, $Y_c'$) of the save area and those ($X_{c1}$, $Y_{c1}$) of the delete area is determined. Then, an amount and a direction of shift of the save area center which cause the save area center to become aligned with the delete area center are calculated.

By the trimming area convert 2 (A-1-5-7), the amount of shift determined as stated above is added to or subtracted from the trimming area data to produce final data.

As described above, when the first mode is the delete mode and the second mode is the save mode or when the first mode is the save mode and the second mode is the delete mode, the center of a save area is shifted into alignment with that of a delete area without fail.

Figure 16:
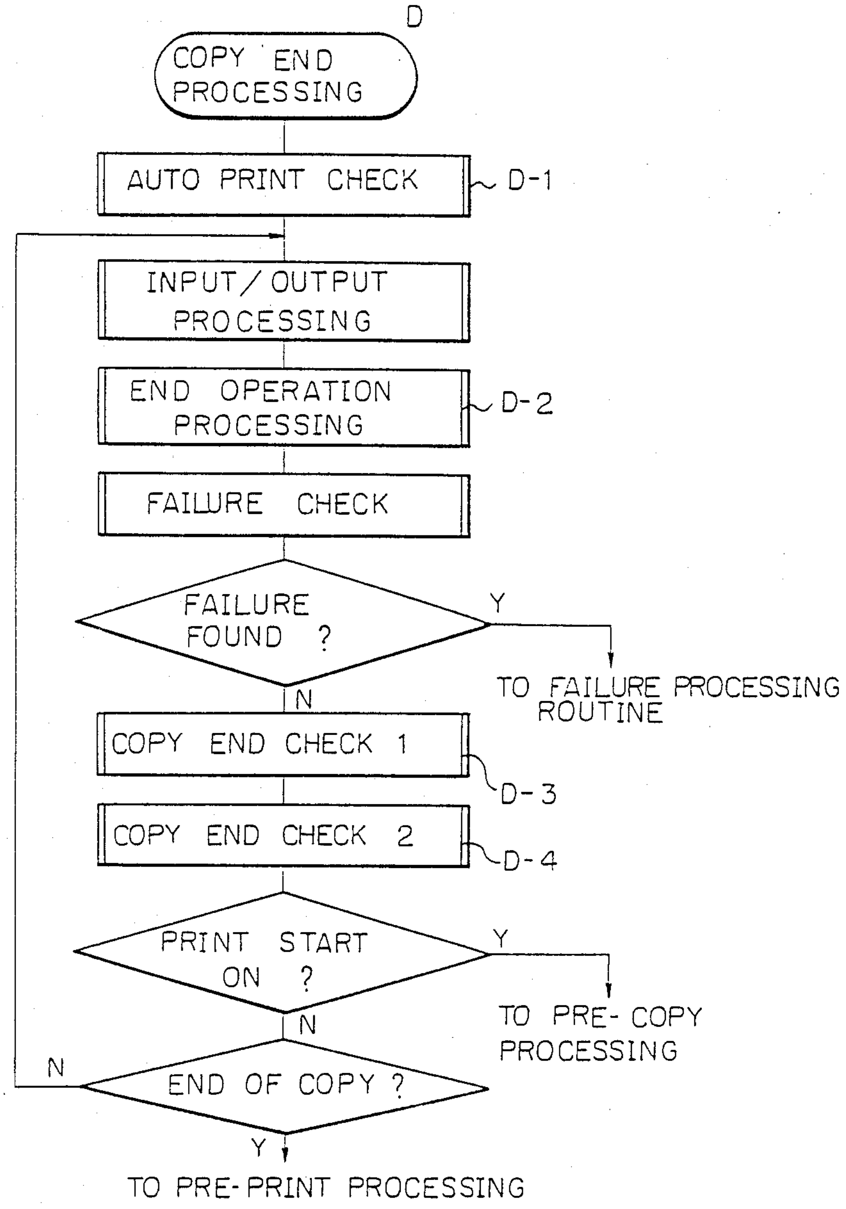
FIG. 16 is a flowcharting showing copy end processing.
Figure 18:
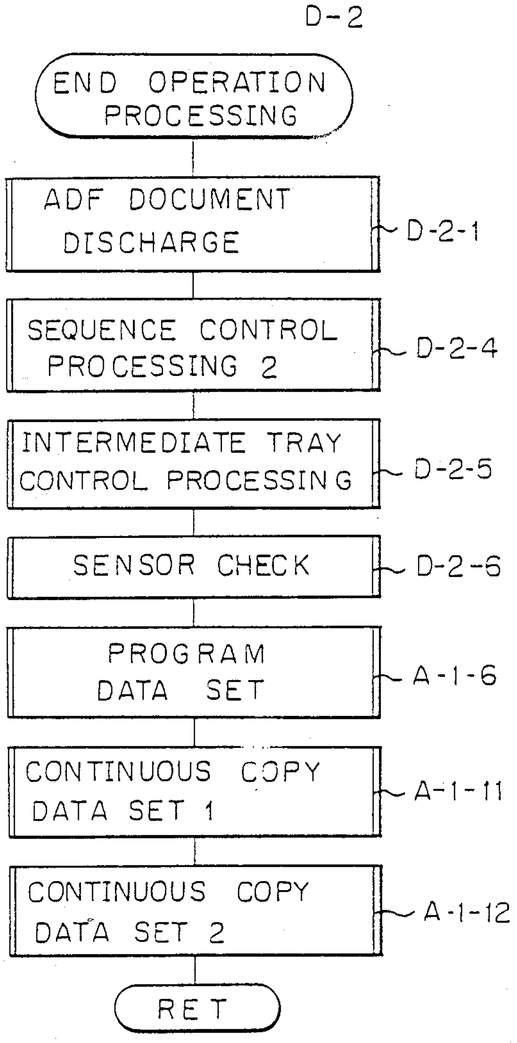
FIGS. 18 and 18' are flowcharts showing end operation processing.
Figure 18:
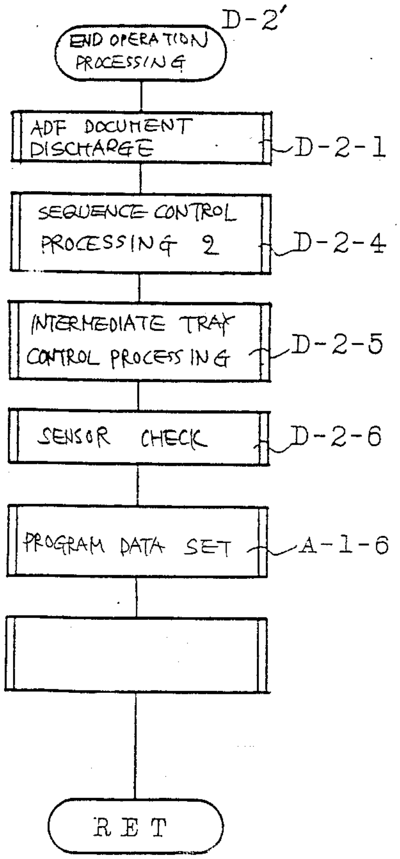
Figure 18A:
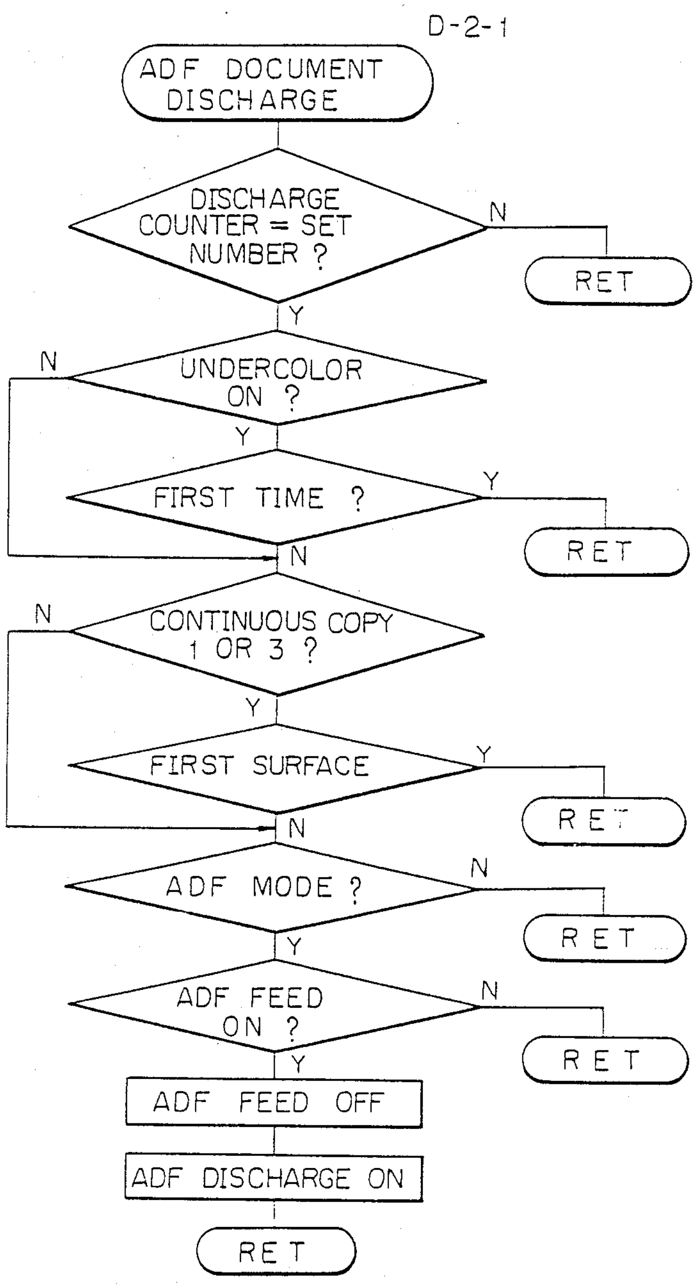
FIG. 18A is a flowchart showing ADF discharge processing.

FIGS. 16, 18 and 18A show, respectively, the copy end processing (D), end operation processing (D-2) included in the processing (D), and ADF document discharge processing (D-2-1).

In the copy end processing of FIG. 16, auto-print check (D-1), input/output processing, end operation processing (D-2), and failure check are performed. If any failure is found, the program is transferred to the failure processing routine (D-3). If no failure is found, copy end check 1 (D-3) and copy end check (D-4) are executed. If print start ON is set up, the program advances to the pre-copy processing routine. When print start ON is not set up, the program returns to the previous step if copying has been ended or advances to the pre-print processing if copying has not been ended.

In the end operation processing of FIG. 18, there are performed ADF document discharge (D-2-1), sequence control processing 2 (C-2-4), intermediate tray control processing (C-2-5), sensor check (C-2-6), and program data setting (A-1-6).

In the ADF document discharge (D-2-1) of FIG. 18A, if a set number of copies is loaded in the discharge counter, ADF discharge is made ON at the time of first copying under an undercolor ON condition, at the time of second copying under a continuous copy 1 and 3 condition, and after ADF feed OFF under an ADF mode ON and ADF feed ON condition.

Figures 19, 19A:
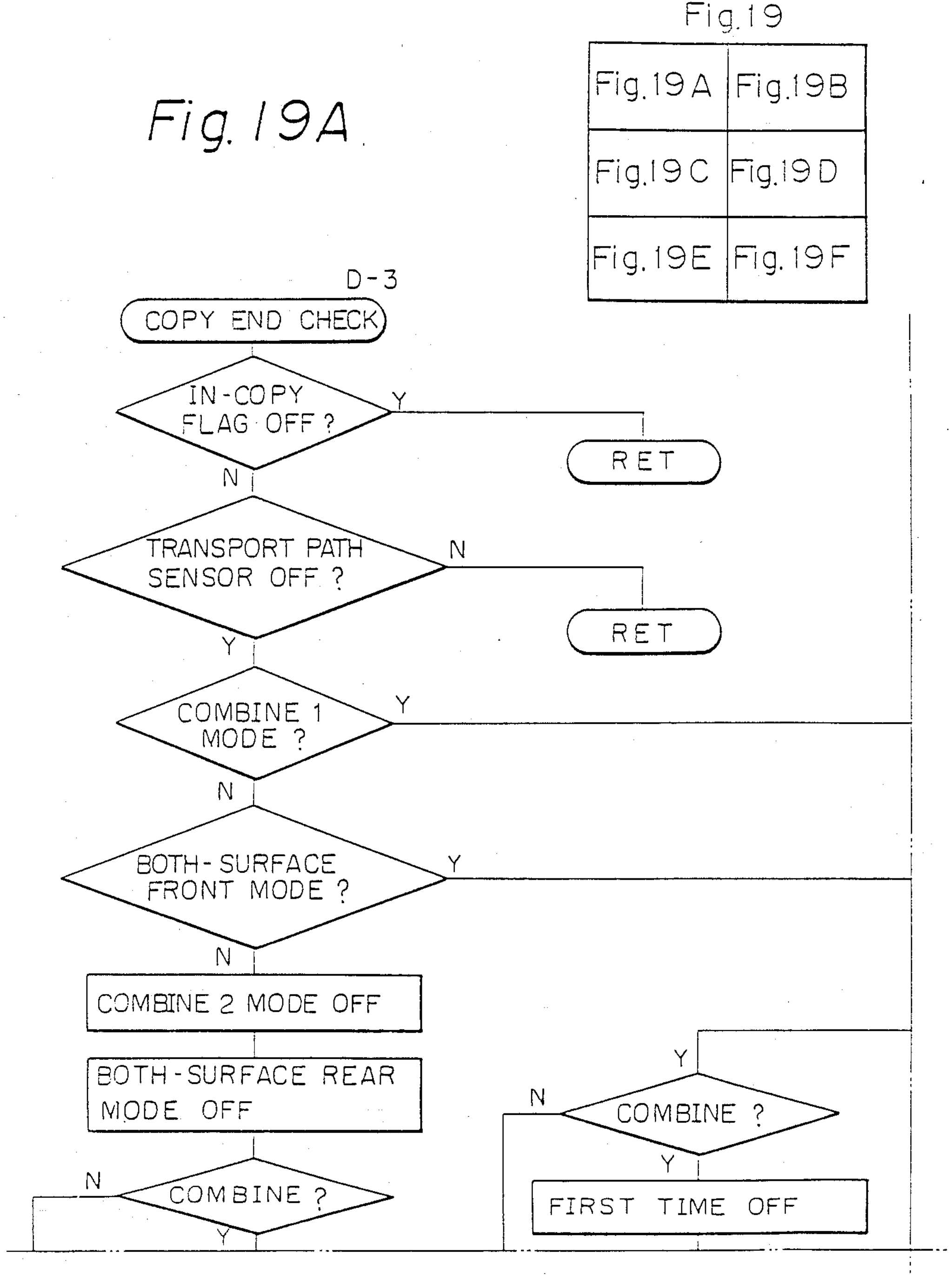
FIGS. 19 and 19A are flowcharts showing copy end check 1.
Figure 19B:
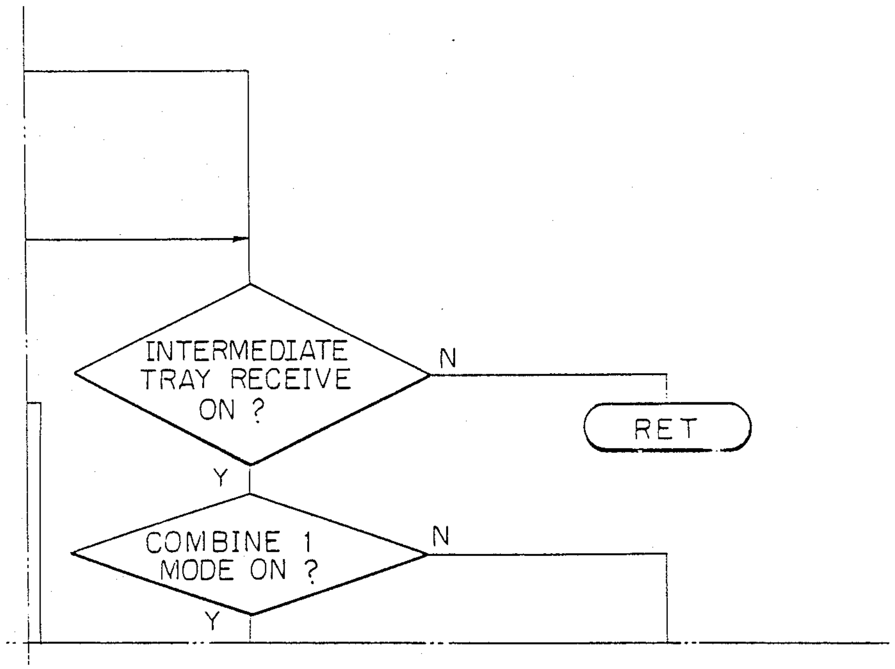
Figure 19C:
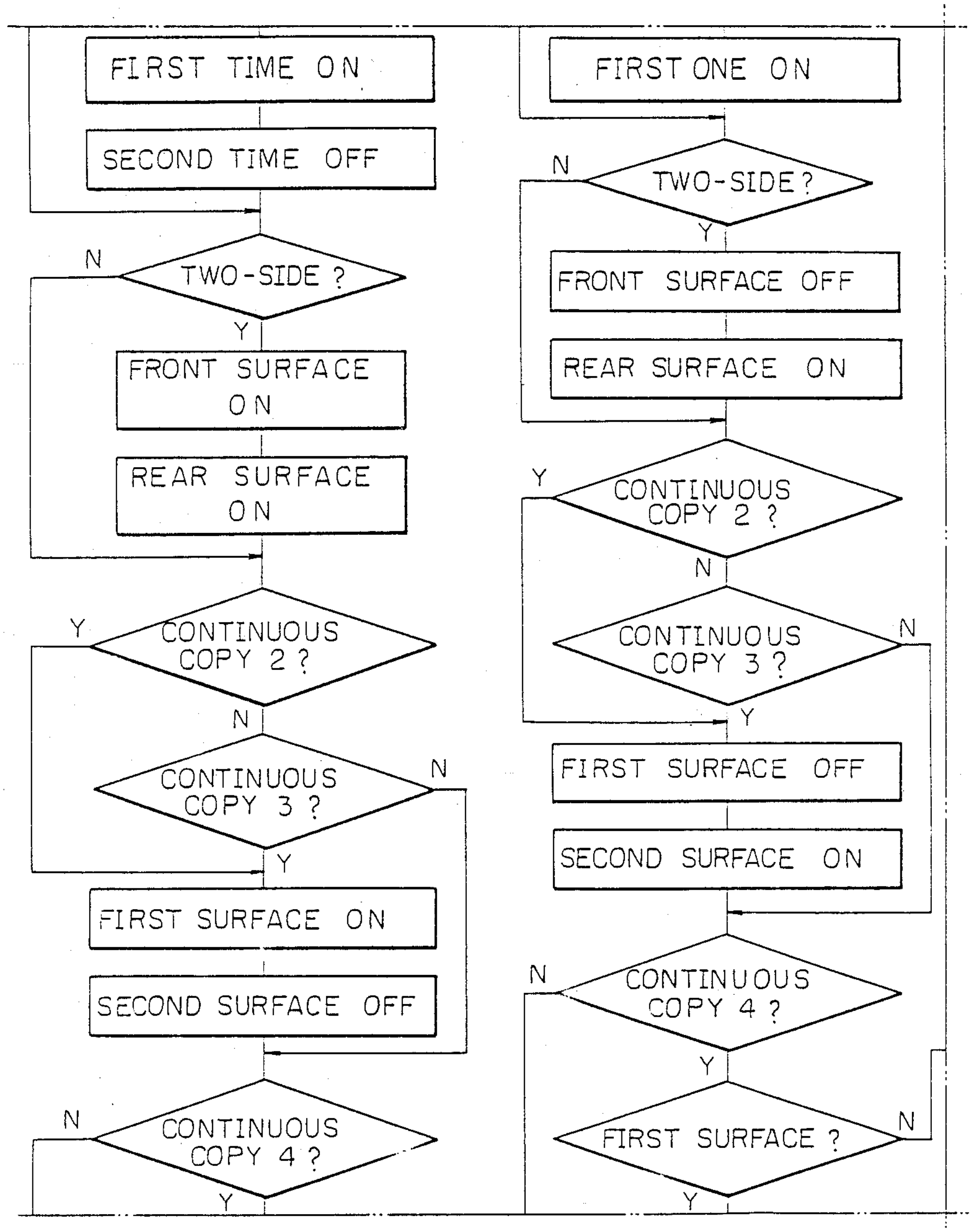
Figure 19D:
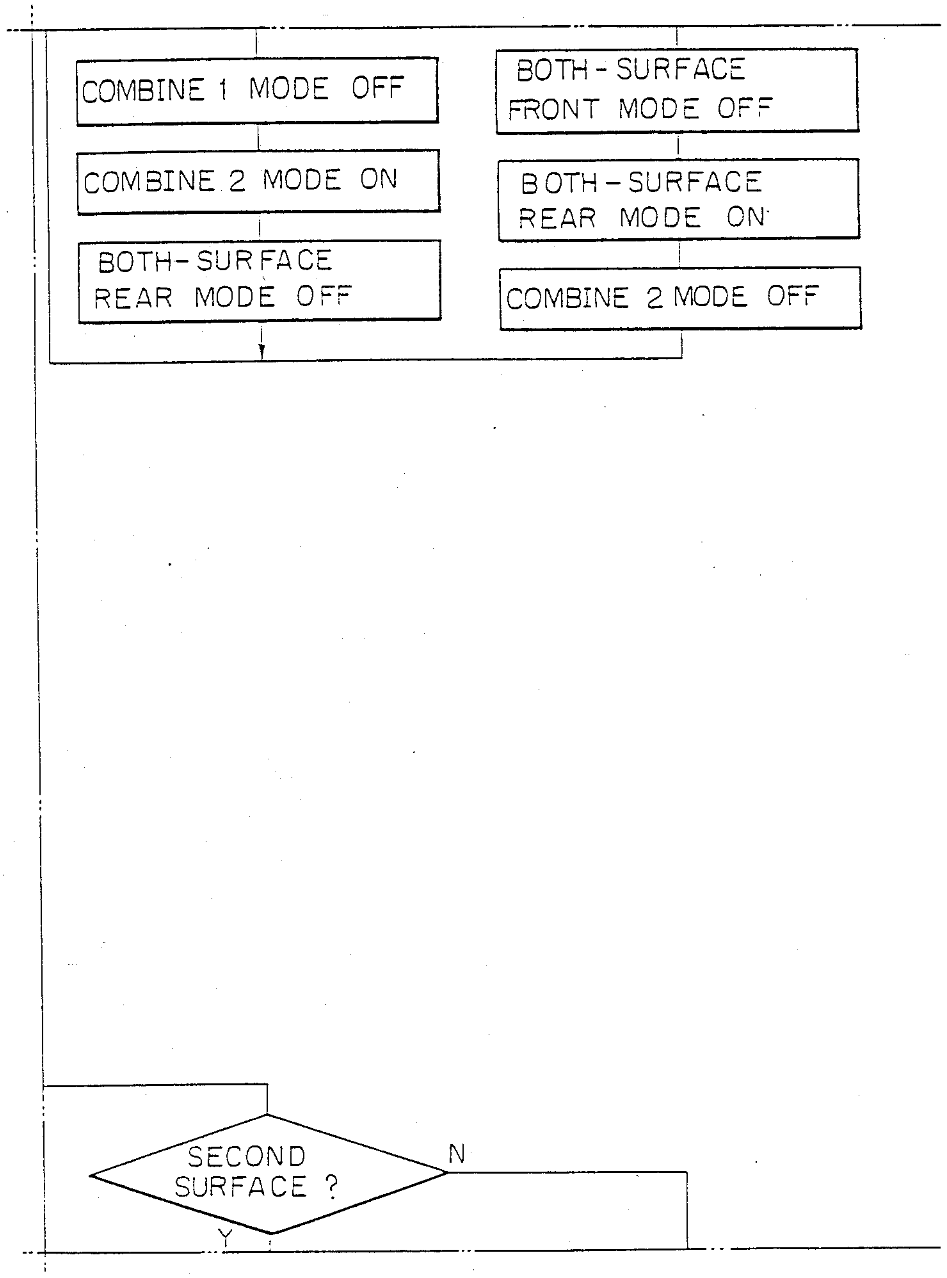
Figure 19E:
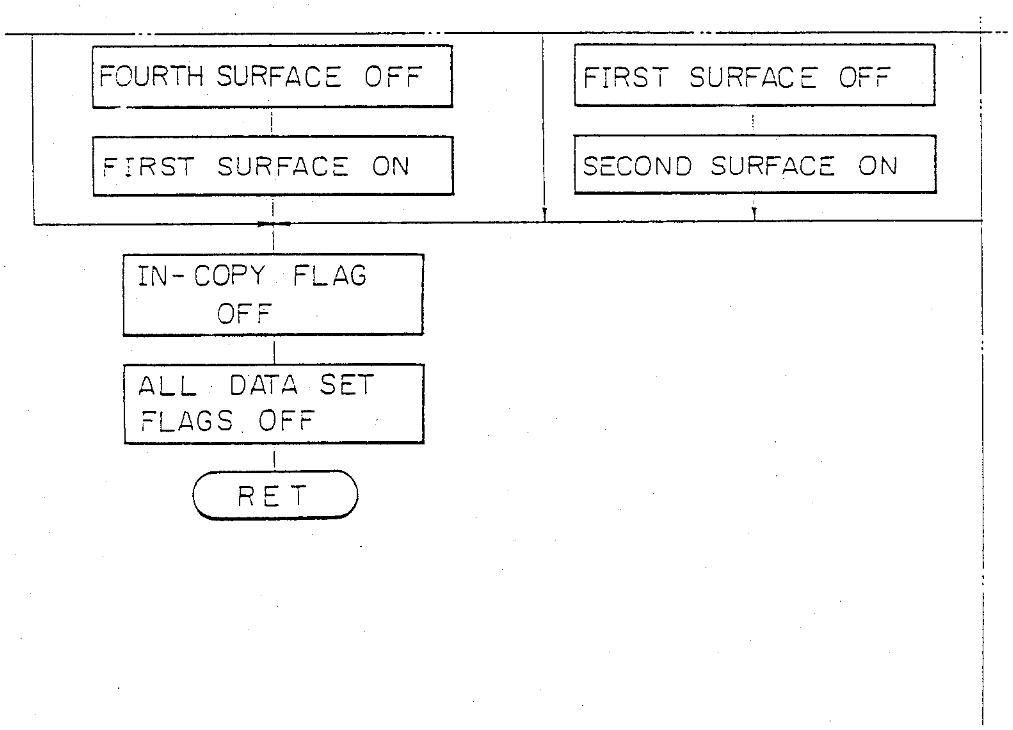
Figure 19F:
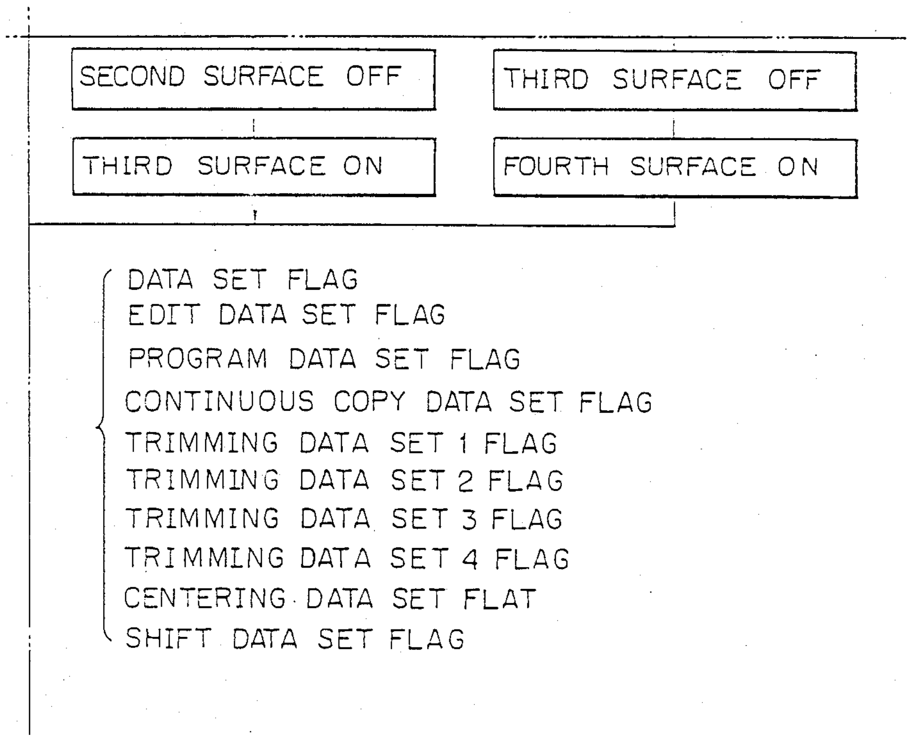
Figure 19A:
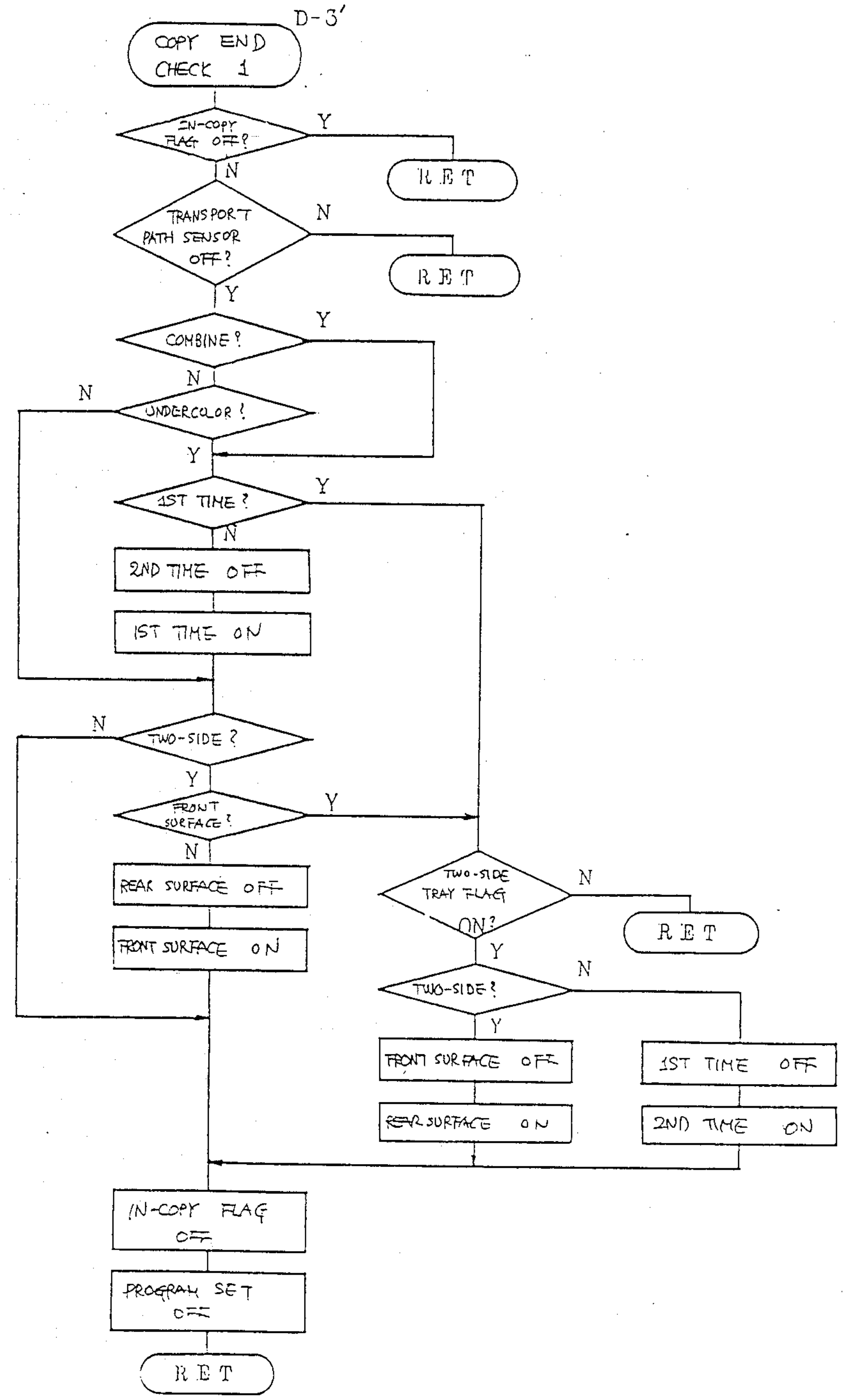

FIG. 19 shows the copy end check 1 (D-3) included in the copy end processing. On condition that the in-copy flag is ON, that all the transport path sensors are OFF, and that the first copying under the combine mode or the undercolor mode is finished or the front surface is finished under the two-side copy mode, front surface is turned OFF and rear surface ON under a two-side tray flag ON condition. When only the front surface is finished, first copying is made OFF and second copying ON. Further, when the first copying is not finished, second copying is made OFF and first copying ON; when only the front surface is finished, rear surface is made OFF and front surface ON. Subsequently, the in-copy flag is cleared and, then, program set is turned OFF.

Figure 20A:
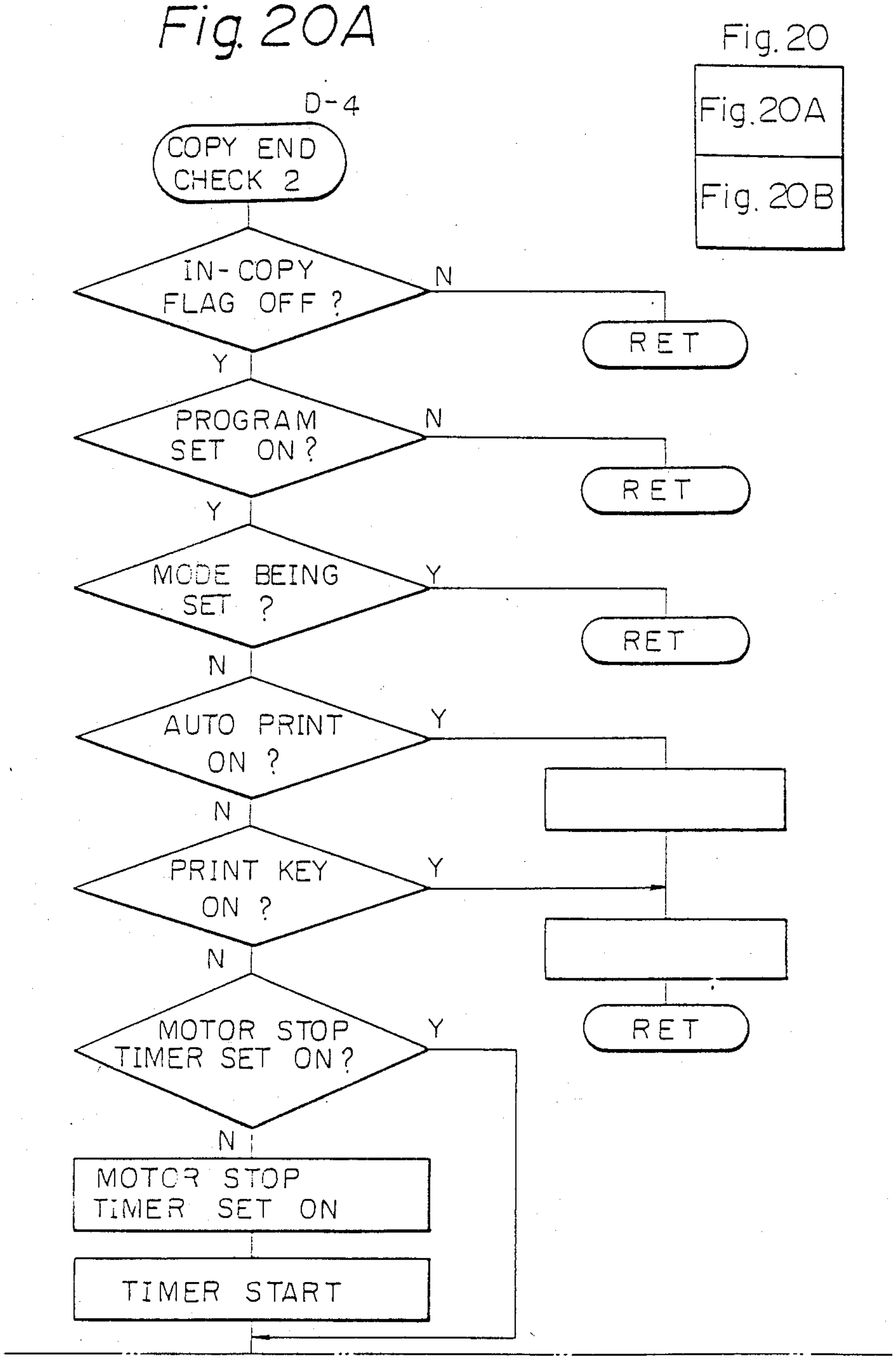
FIG. 20 is a flowchart showing copy end check 2.
Figure 20B:
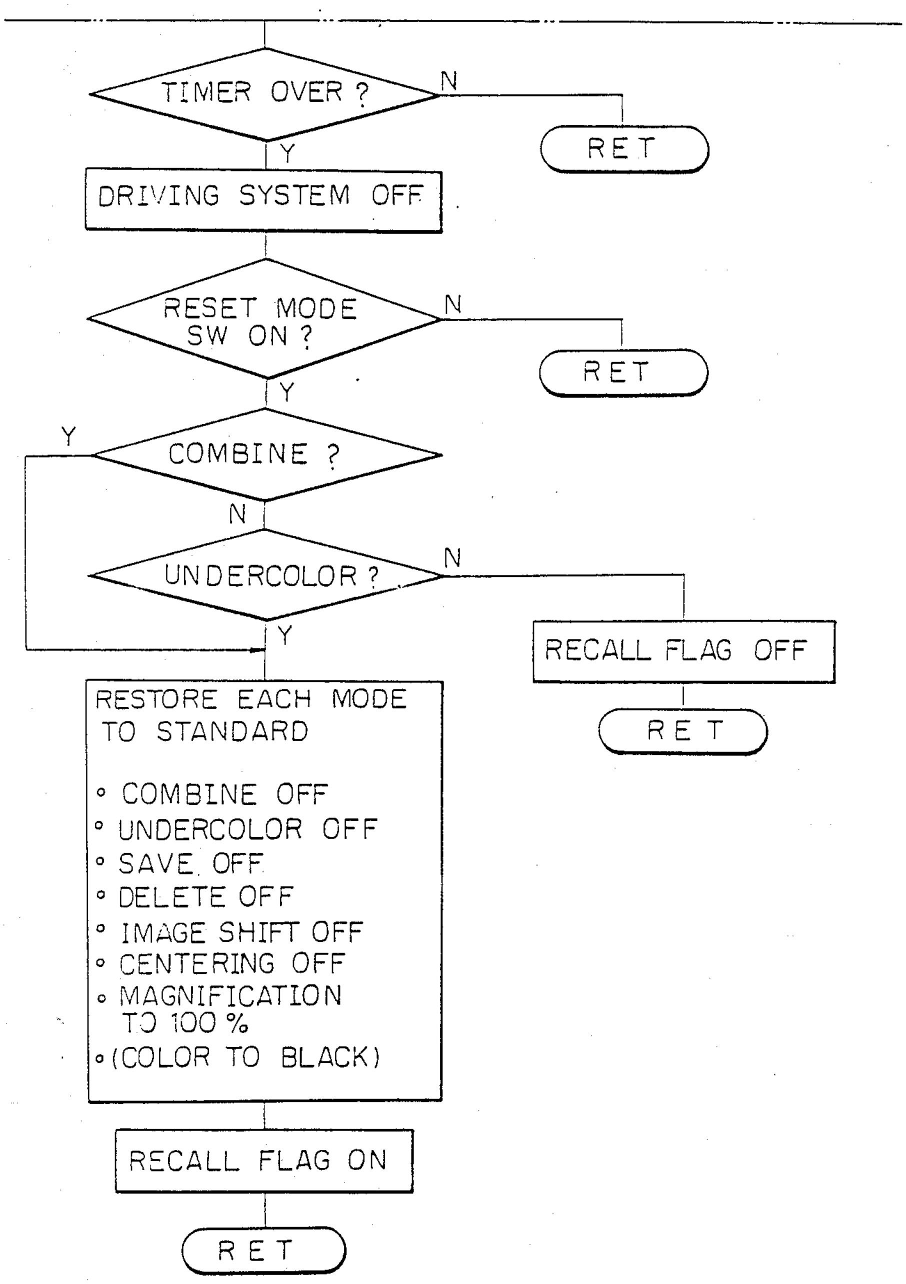

FIG. 20 shows the copy end check 2 (D-4) included in the copy end processing. A motor stop timer set ON condition is set up to start a motor stop timer on condition that the in-copy flag is cleared, that program set is ON, that no mode is set (magnification, color and other mode set flags are cleared), that auto-print is not ON, that print key is not ON, and that motor stop timer set is not ON. If timer set is ON, the drive system is turned OFF when the timer is over. When the reset mode switch is ON and either the combine mode or the undercolor mode is selected, each mode is restored to standard.

Figure 17:
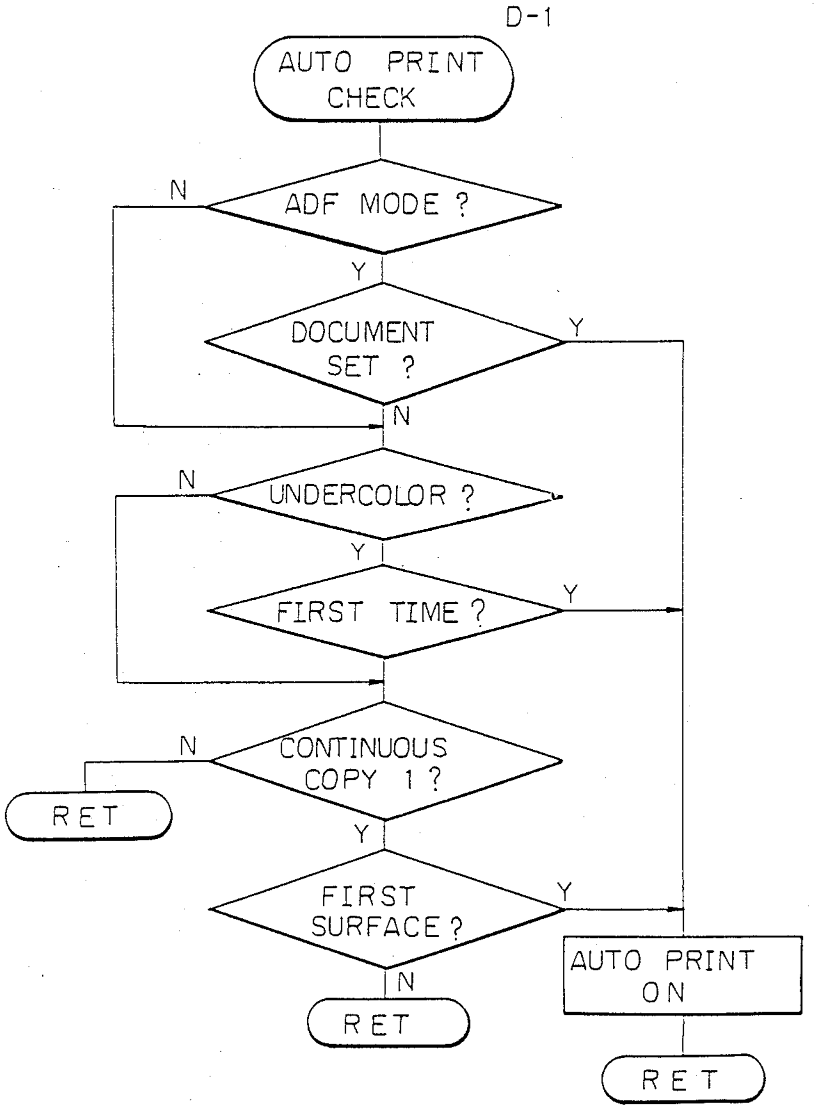
FIG. 17 is a flowchart showing auto-print check

FIG. 17 shows the auto-print check (D-1) included in the copy end processing. If the ADF mode is selected and documents are loaded, auto-print is made ON. When no document is loaded, the auto-print ON condition is set up even at the first copying in the undercolor mode. Also, the auto-print ON condition is set up even for the first surface of continuous copy 1.

Figure 22A:
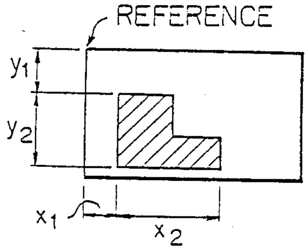
FIGS. 22A to 22D are diagrams showing how an image is shifted in a usual magnification change mode.
Figure 22B:
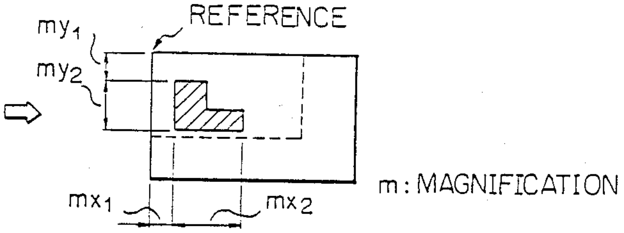
Figure 22C:
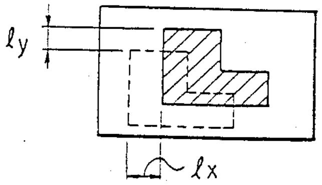
Figure 22D:
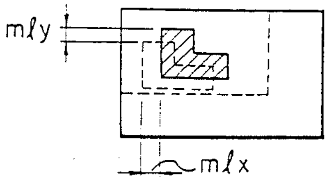

Referring to FIG. 22A, there is shown an image which is printed in a document. The image is dimensioned $y_c$ as measured from a reference point to the upper end of the image, $y_c$ as measured in the lateral direction, $x_c$ as measured from a reference point on the X axis to the leftmost end of the image, and $X_c$ along its lower end. When the magnification of such an image is changed to m, as shown in FIG. 22B, the dimensions $y_1$, $y_2$, $x_1$ and $x_2$ are changed to $my_1$, $my_2$, $mx_1$ and $mx_2$, respectively. Further, when it is desired to shift a document image shown in FIG. 22C from a dotted-line position to the center as indicated by hatching by a distance of ly in the Y direction and lx in the X direction, the magnification-changed image is unavoidably shifted by mly in the Y direction and mlx in the X direction, as shown in FIG. 22D. That is, the resulting image is not always in register with the center coordinates.

Hereinafter will be described the partial magnification change mode in accordance with the present invention.

FIGS. 8E-4 and 8E-4-1 are flowcharts demonstrating the edit data setting (A-1-5-4 and A-1-5-4') of the present invention, specifically a sequence of steps for setting the partial magnification change mode.

As shown in FIG. 8E-4, when the zoom magnification change mode is selected under the save or delete mode, a partial magnification change mode flag is set. When the zoom magnification change mode is cancelled, a partial magnification change mode flag is reset. Specifically, when the zoom magnification change mode is selected while the save mode is ON or while the save mode is OFF and the delete mode is ON, the partial magnification change mode flag becomes ON; as the delete mode or the zoom magnification change mode becomes OFF, the partial magnification change mode flag is reset.

FIG. 8E-4-1 is a flowchart showing how the partial magnification change mode is set up through the partial magnification change key. When the save or the delete mode is set up and the partial magnification change key is ON (the key remains ON while being depressed), the partial magnification change mode is set up. When the key is turned ON in the partial magnification mode, the partial magnification mode flag is reset. Specifically, in the flow (b), processing associated with the partial magnification change key is inserted between delete mode ON and zoom magnification change mode ON as shown in the flow (a). When the key is turned ON while the save mode or the delete mode is ON, a key set flag is set only if it has been cleared and the partial magnification change flag is set only if it has been cleared. When the partial magnification change key is OFF, the key set flag is cleared. Further, when the key set flag has already been set, the program returns (RET). When the delete mode is OFF or when the partial magnification mode has already become ON, the partial magnification change flag is cleared.

Data Conversion

Data Conversion is as follows.

Figure 23A:
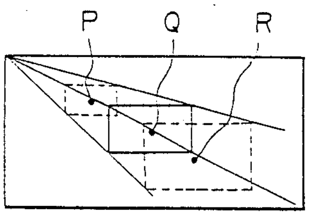
FIGS. 23A to 23B are diagrams explanatory of the shift of an image which occurs during usual magnification change.
Figure 23B:
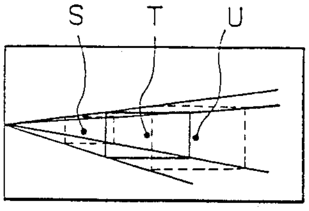
Figure 24A:
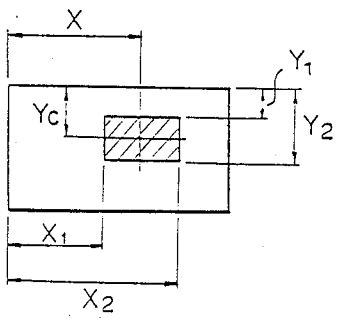
FIGS. 24A to 24C are diagrams showing data conversion which is effected in a partial magnification change mode in accordance with the present invention.
Figure 24B:
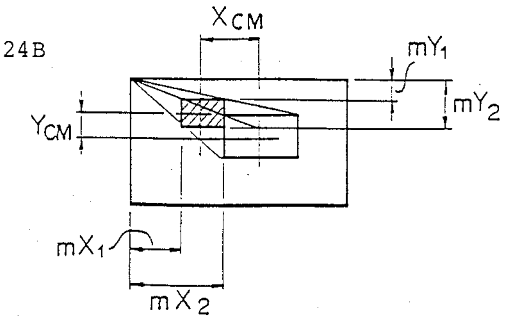
Figure 24C:
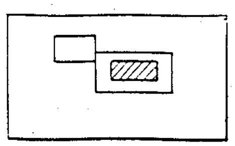
Figure 25A:
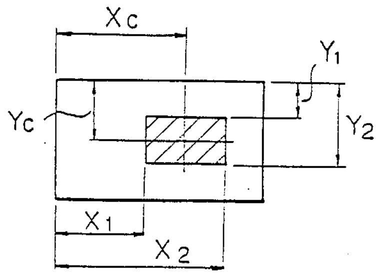
FIGS. 25A to 25C are diagrams showing data conversion for centering in the partial magnification change mode in accordance with the present invention.
Figure 25B:
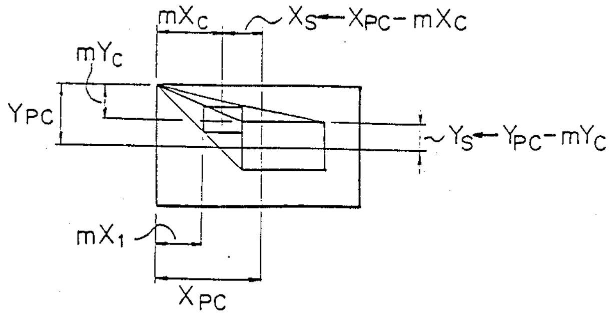
Figure 25C:
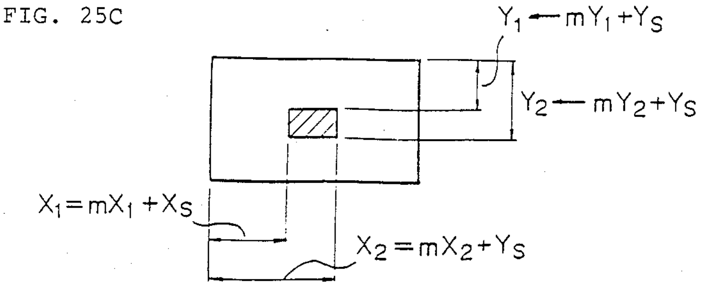

FIGS. 23A and 23B show the shift of the center in the usual magnification change mode. FIGS. 24A to 24C are explanatory of data conversion for trimming in the partial magnification change mode. FIGS. 25A to 25C demonstrate data conversion for centering in the partial magnification change mode. Generally, a change of magnification causes the center of an image to be shifted with respect to a reference. As shown in FIG. 23A, in the case that the reference is defined by one side, when an image indicated by a broken line and having a center P is changed in magnification to become a hatched image, the center P is shifted to a position Q because the distance measured with the top left as a reference is changed also. When the image is enlarged as indicated by a broken line, the center is shifted to a position R. Likewise, when the reference is defined by the center, the center S shown in FIG. 23B is shifted to T and U sequentially.

The data conversion for trimming (plus shift) as shown in FIGS. 24A to 24C is as follows.

(1-1) Trimming data is multiplied by a magnification (A-1-5-8-a).

(1-2) Amounts of shift of the center of area caused by the magnification (return data in the X and Y directions) are determined (b).

(1-3) When any image shift is to occur, the shift data (return data itself it no image shift is to occur) is adjusted and set as shift data (c).

(1-4) Trimming data is increased or decreased by a fragment corresponding to the shift data by trimming data convert (A-1-5-7), thereby completing data conversion.

Specifically, when a partial area indicated by hatching in FIG. 24A is reduced by magnification change, it appears as indicated by hatching in FIG. 24B with its distance from the reference point shifted. Hence, return data is determined as stated above in order to return the resulting image to the original position, as shown in FIG. 24C.

Data conversion for centering is effected as follows.

(2-1) Trimming data is multiplied by a magnification (A-1-5-10-a).

(2-2) A difference between the center of an area and that of a paper is determined and set in shift data (A-1-5-10-b).

(2-3) In the above condition, if no trimming data is present, a difference between the center of a document and that of a paper is set in the shift data (A-1-5-10-c).

(2-4) Such data is added to or subtracted from the trimming data complete data conversion (A-1-5-7).

Specifically, when the hatched partial area of FIG. 25A is reduced by partial magnification change, what occurs first is the shift of the distance measured from the reference, as indicated by hatching in FIG. 25B. Hence, a difference between the center of a document and that of a paper is calculated to shift the image by an amount as represented by the difference data, as shown in FIG. 25C.

As shown in FIG. 8A-3, to set up the magnification change mode, the magnification change mode key is depressed. At this instant, if the set flag has been cleared to cancel fixed display, zoom display is turned OFF and, instead, fixed magnification change display is set, the buzzer is turned ON, and the set flag is set. While fixed display is set up, zoom display is made ON, fixed magnification change display is made OFF, the buzzer is made ON, and the set flag is set.

In the zoom magnification set mode, as shown in FIG. 8A-4, when zoom display is ON, continuous depression of the U or D key causes a magnification key loop counter to increment by 1 at a time. When the count of the counter is 1 and the U key is depressed, the magnification is set to 1% (provided there is not upper limit). When the D key is depressed, the magnification is set to −1% (provided there is no lower limit).

In the magnification set 2, as shown in FIG. 8A-5, processing is executed for preventing the lens from being moved while the magnification change key is depressed. Specifically, while the magnification change key is ON, delay timer set is turned OFF; while the key is OFF, the magnification change set 1 is ON, and delay timer set is OFF, delay timer set is turned ON to set the timer to 0.5 second. Upon the lapse of 0.5 second, the magnification change set 1 is turned OFF and, then, the magnification change set 2 is turned ON.

As shown in FIG. 8A-6, the magnification change set 3 is representative of processing which is associated with the movement of the lens. As shown, while the magnification change set 2 is ON and the program is OFF, the magnification change set 2 is turned OFF if the lens position is coincident with a magnification selected or, alternatively, lens set processing is executed if the former is not coincident with the latter. In the program mode, i.e., in a program ON condition, the first mode setting is performed after all the data have been programed and, then, the lens move processing is executed.

FIGS. 8E-8-1-A and 8E-8-1-B are representative of the trimming data convert 3 processing (A-1-5-8(1) to A-1-5-8(2)). As previously stated, on condition that centering is OFF, that edit data set is ON, that partial magnification change is ON, and that trimming data set 3 is OFF, trimming data are multiplied by a magnification. The left return or the right return is determined based on $X_c'$) $X_c$ so as to obtain X-direction return data of the center of a trimming area due to magnification. Further, the upward return or the downward return is determined based on $Y_c' > Y_c$ so as to obtain Y-direction return data of the center of the trimming area. Then, the data undergone the magnification change are stored as trimming data (b). If any image shift is to occur, processing (c) is performed to adjust the shift data accordingly.

FIGS. 16 and 18' are flowcharts showing the copy end processing (D), end operation processing (D-2'), and ADF document discharge processing (D-2-1). In the copy end processing, after the auto-print check (D-1), input/output processing and end operation processing (D-2) have been executed, the failure check is performed and, if any failure is found, the program advances to the failure processing routine. If no failure is found, the copy end check 1 (D-3) and copy end check 2 (D-4) are performed, and the program is transferred to the pre-copy processing if print start is ON. If print start is OFF, the program returns or advances to the pre-print processing to end the operation, depending upon whether copying has been completed or not.

In the end operation processing, there are performed the ADF document discharge (D-2-1), sequence control process 2 (C-2-4), intermediate tray control process (C-2-5), sensor check (C-2-6), and program data set (A-1-6).

In the ADF document discharge (D-2-1) shown in FIG. 18A, if the discharge counter has been loaded with a set number of copies, ADF discharge is turned ON after ADF feed has been turned OFF at the first time of copying in the undercolor ON condition, at the first surface in the continuous copy 1 and 3 condition and on condition that the ADF mode has been ON and ADF feed has been ON.

FIG. 19A shows copy end check (D-3') which is included in the copy end processing. In the copy end check 1, on condition that the in-copy flag is ON, that all the transport path sensors are OFF, and that the first time of copying in the combine or the undercolor mode has been finished or the front surface has been finished in the two-side copy mode, the two-side tray flag is set, front surface is turned OFF, and rear surface is turned ON. If only the front surface has been finished, first time is turned OFF and, instead, second time is turned ON. If first time has not been finished, second time is turned OFF and, instead, first time is turned ON; if only the front surface has been finished, rear surface is turned OFF and front surface ON. Then, after the in-copy flag has been cleared, the program set is turned OFF.

FIG. 20 shows the copy end check 2 (D-4) included in the copy end processing. A motor stop timer set ON condition is set up to start the motor stop timer, on condition that the in-copy flag is cleared, that program set is ON, that no mode is set (magnification, color and other mode set flags are cleared), that auto-print is not ON, that print key is not ON, and that motor stop timer set is not ON. If timer set is ON, the drive system is turned OFF when the timer is over. When the reset mode switch is ON and either the combine mode or the undercolor mode is selected, each mode is restored to standard.

FIG. 17 shows the auto-print check (D-1) included in the copy end processing. If the ADF mode is selected and documents are loaded, auto-print is made ON.

In summary, it will be seen that the present invention provides a control system for a copier of the type having a combining, a trimming, a masking and an image shifting capability which, in the event of masking (trimming) the first document and trimming (masking) the second document so as to lay the trimmed image in the masked area, allows the center of the trimmed image to be automatically shifted to the center of a specified masking region. Such remarkably promotes easy and simple image editing operations.

The operability is further enhanced because the center of a magnification-changed image can be controlled into register with the center of an image which is printed on a document, because the amount of shift of a magnification-changed image can be controlled to a specified one, because the control can be effected with no regard to the relationship between a document and a paper with respect to the size, and because a partial and a total magnification changing function can be selectively controllable.

Various modifications will become possible for those skilled in the art after receiving the teachings of the present disclosure without departing from the scope thereof.

What is claimed is:

1. In a control system for a copier having at least a combining, a trimming, a masking and an image shifting function, the improvement wherein when a first document is to be masked or trimmed and a second document is to be trimmed or masked so as to combine said first and second documents, an amount and a direction of shift of a particular area which is defined on one of the first and second documents is calculated to cause the center of said particular area into register with a center of a particular area which is defined on the other document, the control system controlling the copier based on a result of calculation.

2. The improvement as claimed in claim 1, wherein an amount and a direction of shift of the center of the particular area of the second document is calculated to cause the center of said particular area into register with the center of the particular area of the first document.

3. The improvement as claimed in claim 1, wherein the control is such that the trimming area is shifted until the center of said trimming area becomes aligned with the center of the masked area.

4. The improvement as claimed in claim 2, wherein the control is such that the trimming area is shifted until the center of said trimming area becomes aligned with the center of the masked area.

5. In a control system for a copier having a partial copying means, an image shifting means and other editing means and a magnification changing means, the improvement wherein a selective control means is provided for selectively controlling partial magnification change for changing a magnification of a specified area for partial copying and total magnification change for changing a magnification of an image edited by the editing means.

6. The improvement as claimed in claim 5, wherein the selective control means comprises a switch.

7. The improvement as claimed in claim 5, wherein when the magnification changing means has a fixed and a zoom magnification changing function, the selective control means controls the partial magnification change when the zoom magnification changing function is selected and the total magnification change when the fixed magnification change is selected.

8. The improvement as claimed in claim 6, wherein when the magnification changing means has a fixed and a zoom magnification changing function, the selective control means controls the partial magnification change when the zoom magnification changing function is selected and the total magnification change when the fixed magnification change is selected.

9. The improvement as claimed in claim 5, wherein for the partial magnification change the selective control means controls the amount of shift with no regard to a ratio of magnification change.

10. The improvement as claimed in claim 6, wherein for the partial magnification change the selective control means controls the amount of shift with no regard to a ratio of magnification change.

11. The improvement as claimed in claim 7, wherein for the partial magnification change the selective control means controls the amount of shift with no regard to a ratio of magnification change.

* * * * *